United States Patent
Kong et al.

(10) Patent No.: US 11,849,336 B2
(45) Date of Patent: Dec. 19, 2023

(54) WIRELESS ACCESS POINT DEPLOYMENT METHOD AND APPARATUS

(71) Applicant: HUAWEI TECHNOLOGIES CO., LTD., Guangdong (CN)

(72) Inventors: Fanhua Kong, Beijing (CN); Qi Wang, Shenzhen (CN); Hongcheng Zhuang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/629,110

(22) PCT Filed: Jul. 24, 2020

(86) PCT No.: PCT/CN2020/104481
§ 371 (c)(1),
(2) Date: Jan. 21, 2022

(87) PCT Pub. No.: WO2021/013246
PCT Pub. Date: Jan. 28, 2021

(65) Prior Publication Data
US 2022/0279359 A1 Sep. 1, 2022

(30) Foreign Application Priority Data

Jul. 24, 2019 (CN) .......................... 201910673704.8
Sep. 30, 2019 (CN) .......................... 201910938928.7

(51) Int. Cl.
*H04W 16/20* (2009.01)
*H04L 41/22* (2022.01)
*H04W 88/08* (2009.01)

(52) U.S. Cl.
CPC ............. *H04W 16/20* (2013.01); *H04L 41/22* (2013.01); *H04W 88/08* (2013.01)

(58) Field of Classification Search
CPC ........ H04W 16/20; H04W 88/08; H04L 41/22
See application file for complete search history.

(56) References Cited

U.S. PATENT DOCUMENTS

| 7,933,605 | B2 | 4/2011 | Rappaport et al. |
| 11,212,681 | B1 * | 12/2021 | Balaramn ........... H04L 63/1466 |

(Continued)

FOREIGN PATENT DOCUMENTS

| CN | 106850312 A | 6/2017 |
| CN | 106850313 A | 6/2017 |

(Continued)

OTHER PUBLICATIONS

ITU-T H.264(Jun. 2019), Series H: Audiovisual and Multimedia Systems, Infrastructure of audiovisual services—Coding of moving video, Advanced video coding for generic audiovisual services, total 836 pages.

*Primary Examiner* — Shukri Taha
(74) *Attorney, Agent, or Firm* — WOMBLE BOND DICKINSON (US) LLP

(57) ABSTRACT

Embodiments of this application disclose a wireless access point deployment method and apparatus. In the method, after receiving a first operation, a terminal device displays a floor plan determining interface. Then, the terminal device receives a second operation for the floor plan determining interface, and determines a first floor plan based on the second operation. The terminal device determines an AP type recommended to be deployed currently. Next, the terminal device displays an AP deployment interface based on the first floor plan and the AP type, where the AP deployment interface is used to display a quantity of APs recommended to be deployed and locations of the APs recommended to be deployed.

20 Claims, 44 Drawing Sheets

(56) References Cited

U.S. PATENT DOCUMENTS

| | | | |
|---|---|---|---|
| 2005/0059405 A1 | 3/2005 | Thomson et al. | |
| 2009/0235354 A1* | 9/2009 | Gray .................. | H04L 63/1416 |
| | | | 709/224 |
| 2016/0323754 A1* | 11/2016 | Friday .................. | H04W 16/28 |
| 2019/0007843 A1* | 1/2019 | McGinley ........... | H04L 41/0823 |
| 2021/0014121 A1* | 1/2021 | Vadapalli ............ | H04L 63/0892 |
| 2021/0092616 A1* | 3/2021 | Desai ........................ | G01S 5/14 |

FOREIGN PATENT DOCUMENTS

| | | | |
|---|---|---|---|
| CN | 107104817 | A | 8/2017 |
| CN | 107623925 | A | 1/2018 |
| CN | 109743741 | A | 5/2019 |
| CN | 109831333 | A | 5/2019 |
| WO | 2004066077 | A2 | 8/2004 |
| WO | 2005029277 | A2 | 3/2005 |
| WO | 2008004955 | A2 | 1/2008 |

* cited by examiner

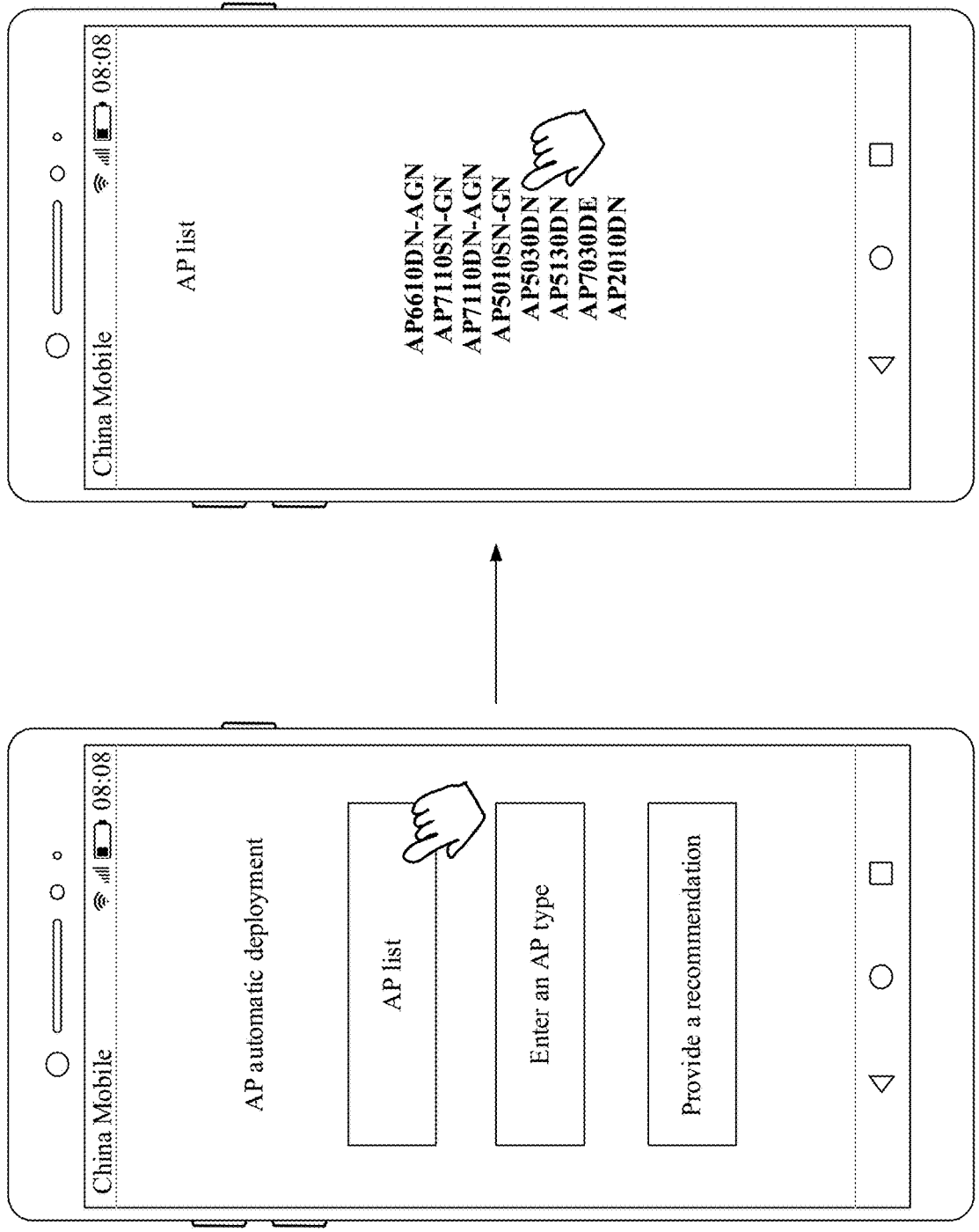

WIRELESS ACCESS POINT DEPLOYMENT METHOD AND APPARATUS

CROSS-REFERENCE TO RELATED APPLICATIONS

This application is a national stage of International Application No. PCT/CN2020/104481, filed on Jul. 24, 2020, which claims priority to Chinese Patent Application No. 201910938928.7, filed on Sep. 30, 2019 and Chinese Patent Application No. 201910673704.8, filed on Jul. 24, 2019. All of the aforementioned patent applications are hereby incorporated by reference in their entireties.

TECHNICAL FIELD

This application relates to the field of communications technologies, and specifically, to a wireless access point deployment method and apparatus.

BACKGROUND

A wireless access point (AP) is a wireless switch used in a wireless network. As a core of the wireless network, an AP may convert a wired signal into a wireless signal and transmit the wireless signal after accessing a wired network. A terminal device (for example, a smartphone, a tablet computer, or a computer) may access the wireless network by receiving the wireless signal transmitted by the AP. Therefore, to ensure normal working of the terminal device, an AP usually needs to be deployed in an area in which the terminal device is located. For example, a user usually deploys an AP in user's room.

However, the user currently deploys the AP mainly based on experience and intuition, and cannot determine an appropriate quantity of to-be-deployed APs and locations of the APs. Transmit power of an AP is limited, and therefore a coverage range of a wireless signal transmitted by the AP is also limited. If a small quantity of APs are deployed, wireless signals transmitted by the APs can cover only some areas, and cannot cover actually required areas. Consequently, wireless signals in some areas are weak, and internet access quality is poor. In addition, if a sufficient quantity of APs are deployed, but the APs are deployed at inappropriate locations, some areas cannot be covered by wireless signals. If an excessively large quantity of APs are deployed, resources are wasted, APs interfere with each other, and wireless signal quality is degraded.

In other words, when APs are deployed according to the conventional technology, a quantity of APs and locations of the APs are usually not ideal, and an internet access requirement of a user cannot be met.

SUMMARY

When a user deploys an AP based on experience and intuition, a quantity of to-be-deployed APs and locations of the APs are often not ideal. To resolve this technical problem, this application discloses a wireless access point deployment method and apparatus by using the following embodiments, to provide an appropriate AP deployment solution.

According to a first aspect, an embodiment of this application discloses a wireless access point deployment method. A terminal device receives a first operation, where the first operation is used to start wireless AP deployment. The terminal device displays a floor plan determining interface in response to the first operation. The terminal device receives a second operation for the floor plan determining interface, and determines a first floor plan based on the second operation. The terminal device determines an AP type recommended to be deployed currently. The terminal device displays an AP deployment interface based on the first floor plan and the AP type, where the AP deployment interface is used to display a quantity of APs recommended to be deployed and locations of the APs recommended to be deployed.

In the foregoing operations, deployment personnel can determine a quantity of APs recommended to be deployed currently and locations of the APs, to resolve a problem in the conventional technology that a quantity of to-be-deployed APs and locations of the APs are often not ideal when a user deploys an AP based on experience and intuition.

In an embodiment, the terminal device displays at least one prestored floor plan. The terminal device receives a third operation. The terminal device determines the first floor plan in response to the third operation, where the first floor plan is the prestored floor plan.

In the foregoing operations, the terminal device can determine the first floor plan based on the prestored floor plan and the indication of the third operation. In this case, the third operation is performed by deployment personnel, and the first floor plan is determined by using the third operation. Therefore, the first floor plan can be specified by the deployment personnel.

In an embodiment, the terminal device displays a floor plan generation method interface in response to the second operation. The terminal device receives first data. The terminal device generates the first floor plan based on the first data.

In the Foregoing Operations, the Terminal Device can Generate the First Floor Plan Based on the Received First Data.

In an embodiment, the terminal device displays an AP determining interface. The terminal device receives a fourth operation for the AP determining interface, and determines the AP type by using the fourth operation.

In the foregoing operations, the terminal device can determine the AP type based on the received fourth operation. In this case, the fourth operation is performed by deployment personnel, and the AP type is determined by using the fourth operation. Therefore, the AP type can be specified by the deployment personnel.

In an, the terminal device displays an AP determining interface. The terminal device receives a fifth operation for the AP determining interface. The terminal device determines the AP type in response to the fifth operation based on the first floor plan.

In the foregoing operations, the terminal device can determine the AP type based on the first floor plan, to improve efficiency of determining the AP type.

In an embodiment, the terminal device determines the AP type based on the first floor plan.

In the foregoing operations, the terminal device can directly determine the AP type based on the first floor plan, to improve efficiency of determining the AP type.

In an embodiment, the AP deployment interface includes a second floor plan, and the second floor plan displays, by using a preset symbol mark, a location at which the AP is recommended to be deployed.

The AP deployment interface enables deployment personnel to determine a quantity of APs recommended to be deployed and locations of the APs, so that the deployment personnel obtain an appropriate deployment solution.

In an embodiment, the AP deployment interface includes a second floor plan, and the second floor plan displays, by using a preset symbol mark, a location at which the AP is recommended to be deployed. The AP deployment interface further includes the AP type determined by the terminal device.

In an embodiment, the AP deployment interface includes a second floor plan, and the second floor plan displays, by using a preset symbol mark, a location at which the AP is recommended to be deployed. When the fourth operation is further used to indicate a quantity of APs, and the quantity of APs indicated by the fourth operation is inconsistent with the quantity of APs recommended to be deployed, the AP deployment interface further includes prompt information indicating whether the quantity of APs indicated by the fourth operation is appropriate.

In an embodiment, after the terminal device displays the AP deployment interface, the terminal device receives a sixth operation. The terminal device generates and displays a wife heatmap in response to the sixth operation.

In an embodiment, the terminal device performs grid division on the first floor plan, and determines, based on a grid division result, a floor plan parameter between rooms in a house in which the AP is deployed currently, where the floor plan parameter includes wall attenuation and connectivity. The terminal device determines, based on the AP type and the floor plan parameter, overall wireless signal attenuation between grids obtained after division. The terminal device determines an area in which a master AP can be deployed, where a set including grids occupied by the area in which the master AP can be deployed is a first grid set. The terminal device determines, based on the overall wireless signal attenuation between the grids, a second grid set including the grids in the first grid set, where a deployment requirement is met when the master AP is deployed in any grid in the second grid set. The terminal device determines, based on the first grid set and the second grid set, the quantity of APs recommended to be deployed and the locations of the APs recommended to be deployed. The terminal device displays the AP deployment interface based on the quantity of APs recommended to be deployed and the locations of the APs recommended to be deployed.

In an embodiment, when the second grid set is not empty, the terminal device determines that a grid with a largest deployment indicator in the second grid set is a grid in which the master AP is deployed, and determines not to deploy a sub-AP. Alternatively, when the second grid set is empty, the terminal device determines a location at which the master AP is deployed, and determines a location at which a sub-AP is deployed and a quantity of sub-APs, where a quantity of master APs is 1.

In an embodiment, that the terminal device determines a location at which the master AP is deployed, and determines a location at which a sub-AP is deployed and a quantity of sub-APs includes: (11) determining a quantity n of sub-APs recommended to be deployed; (12) sequentially traversing the first grid set to select a grid as a target location of the master AP, and when it is determined that the master AP is deployed at the target location, determining a third grid set including a sub-grid in which the sub-AP is deployed; (13) traversing the first grid set and the third grid set, and determining a set $O_i$, of a grid in which the master AP can be deployed and a grid in which the sub-AP can be deployed; (14) determining a fourth grid set including a grid in which the master AP can be deployed and a grid in which the sub-AP can be deployed that are in the set $O_i$, and that both meet a deployment requirement; (15) determining whether the fourth grid set is empty; and if no, performing an operation in operation (16), or if yes, performing an operation in operation (17); and (16) when the fourth grid set is not empty, searching the fourth grid set for a combination of a grid in which a master AP with a largest deployment indicator can be deployed and a grid in which a sub-AP can be deployed, where a location indicated by the grid in which the master AP can be deployed in the combination is a location at which the master AP is deployed, a location indicated by the grid in which the sub-AP can be deployed in the combination is a location at which the sub-AP is deployed, and a quantity of grids in which the sub-AP can be deployed in the combination is a quantity of to-be-deployed sub-APs; or (17) when the fourth grid set is empty, adjusting the quantity n of sub-APs recommended to be deployed, and returning to perform the operation in operation (12).

In an embodiment, the terminal device displays a master AP deployment interface. The terminal device receives a seventh operation for the master AP deployment interface. The terminal device determines, in response to the seventh operation, that a location specified by the seventh operation is the area in which the master AP can be deployed. Alternatively, the terminal device displays a master AP deployment interface. The terminal device receives an eighth operation for the master AP deployment interface, and determines, based on the eighth operation, the area in which the master AP can be deployed.

In an embodiment, the first data includes depth data between a target object and the terminal device. The target object includes a wall of a house in which an AP is recommended to be deployed currently.

According to a second aspect, an embodiment of this application discloses a wireless access point deployment apparatus, including: an operation receiving module, configured to receive a first operation, where the first operation is used to start wireless access point AP deployment; a floor plan interface display module, configured to display a floor plan determining interface in response to the first operation; a floor plan determining module, configured to: receive a second operation for the floor plan determining interface, and determine a first floor plan based on the second operation; an AP type determining module, configured to determine an AP type recommended to be deployed currently; and a deployment interface display module, configured to display an AP deployment interface based on the first floor plan and the AP type, where the AP deployment interface is used to display a quantity of APs recommended to be deployed and locations of the APs recommended to be deployed.

In an embodiment, the floor plan determining module includes: a first display unit, configured to display at least one prestored floor plan; a first receiving unit, configured to receive a third operation; and a first determining unit, configured to determine the first floor plan in response to the third operation, where the first floor plan is the prestored floor plan.

In an embodiment, the floor plan determining module includes: a second display unit, configured to display a floor plan generation method interface in response to the second operation; a second receiving unit, configured to receive first data; and a first generation unit, configured to generate the first floor plan based on the first data.

In an embodiment, the AP type determining module includes: a third display unit, configured to display an AP determining interface; and a second determining unit, configured to: receive a fourth operation for the AP determining interface, and determine the AP type by using the fourth operation.

In an embodiment, the AP type determining module includes: a fourth display unit, configured to display an AP determining interface; a third receiving unit, configured to receive a fifth operation for the AP determining interface; and a third determining unit, configured to determine the AP type in response to the fifth operation based on the first floor plan.

In an embodiment, the AP type determining module includes a fourth determining unit, configured to determine the AP type based on the first floor plan.

In an embodiment, the AP deployment interface includes a second floor plan, and the second floor plan displays, by using a preset symbol mark, a location at which the AP is recommended to be deployed.

In an embodiment, the AP deployment interface includes a second floor plan, and the second floor plan displays, by using a preset symbol mark, a location at which the AP is recommended to be deployed. The AP deployment interface further includes the AP type determined by a terminal device.

In an embodiment, the AP deployment interface includes a second floor plan, and the second floor plan displays, by using a preset symbol mark, a location at which the AP is recommended to be deployed. When the fourth operation is further used to indicate a quantity of APs, and the quantity of APs indicated by the fourth operation is inconsistent with the quantity of APs recommended to be deployed, the AP deployment interface further includes prompt information indicating whether the quantity of APs indicated by the fourth operation is appropriate.

In an embodiment, the apparatus further includes a wifi heatmap display module. The operation receiving module is further configured to receive a sixth operation after the AP deployment interface is displayed. The wifi heatmap display module is configured to generate and display a wifi heatmap in response to the sixth operation.

In an embodiment, the deployment interface display module includes: a grid division unit, configured to: perform grid division on the first floor plan, and determine, based on a grid division result, a floor plan parameter between rooms in a house in which the AP is deployed currently, where the floor plan parameter includes wall attenuation and connectivity; an attenuation determining unit, configured to determine, based on the AP type and the floor plan parameter, overall wireless signal attenuation between grids obtained after division; a first grid determining unit, configured to determine an area in which a master AP can be deployed, where a set including grids occupied by the area in which the master AP can be deployed is a first grid set; a second grid determining unit, configured to determine, based on the overall wireless signal attenuation between the grids, a second grid set including the grids in the first grid set, where a deployment requirement is met when the master AP is deployed in any grid in the second grid set; a deployment recommendation unit, configured to determine, based on the first grid set and the second grid set, the quantity of APs recommended to be deployed and the locations of the APs recommended to be deployed; and a deployment interface display unit, configured to display the AP deployment interface based on the quantity of APs recommended to be deployed and the locations of the APs recommended to be deployed.

In an embodiment, when the second grid set is not empty, the deployment recommendation unit is configured to: determine that a grid with a largest deployment indicator in the second grid set is a grid in which the master AP is deployed, and determine not to recommend to deploy a sub-AP. Alternatively, when the second grid set is empty, the deployment recommendation unit is configured to: determine a location at which the master AP is deployed, and determine a location at which a sub-AP is deployed and a quantity of sub-APs, where a quantity of master APs is 1.

In an embodiment, when the second grid set is empty, the deployment recommendation unit performs the following operations: (11) determining a quantity n of sub-APs recommended to be deployed; (12) sequentially traversing the first grid set to select a grid as a target location of the master AP, and when it is determined that the master AP is deployed at the target location, determining a third grid set including a sub-grid in which the sub-AP is deployed; (13) traversing the first grid set and the third grid set, and determining a set $O_i$, of a grid in which the master AP can be deployed and a grid in which the sub-AP can be deployed; (14) determining a fourth grid set including a grid in which the master AP can be deployed and a grid in which the sub-AP can be deployed that are in the set and that both meet a deployment requirement; (15) determining whether the fourth grid set $O_i$, is empty; and if no, performing an operation in operation (16), or if yes, performing an operation in operation (17); and (16) when the fourth grid set is not empty, searching the fourth grid set for a combination of a grid in which a master AP with a largest deployment indicator can be deployed and a grid in which a sub-AP can be deployed, where a location indicated by the grid in which the master AP can be deployed in the combination is a location at which the master AP is deployed, a location indicated by the grid in which the sub-AP can be deployed in the combination is a location at which the sub-AP is deployed, and a quantity of grids in which the sub-AP can be deployed in the combination is a quantity of to-be-deployed sub-APs; or (17) when the fourth grid set is empty, adjusting the quantity n of sub-APs recommended to be deployed, and returning to perform the operation in operation (12).

In an embodiment, the first grid determining unit is configured to: display a master AP deployment interface; receive a seventh operation for the master AP deployment interface; and determine, in response to the seventh operation, that a location specified by the seventh operation is the area in which the master AP can be deployed.

Alternatively, the first grid determining unit is configured to: display a master AP deployment interface; and receive an eighth operation for the master AP deployment interface, and determine, based on the eighth operation, the area in which the master AP can be deployed.

In an embodiment, the first data includes depth data between a target object and a terminal device. The target object includes a wall of a house in which an AP is recommended to be deployed currently.

According to a third aspect, an embodiment of this application discloses a wireless access point deployment apparatus, including a processor and a memory.

The memory is configured to store program instructions. The processor is configured to invoke and execute the program instructions stored in the memory, so that the wireless access point deployment apparatus performs the wireless access point deployment method in the first aspect.

According to a fourth aspect, an embodiment of this application discloses a computer-readable storage medium. The computer-readable storage medium stores instructions, and when the instructions are run on a computer, the computer is enabled to perform the wireless access point method in the first aspect.

According to the solutions disclosed in the embodiments of this application, the terminal device can generate and display an AP deployment interface based on a floor plan of a house in which an AP needs to be deployed. The deployment personnel can determine, by viewing the AP deployment interface, a quantity of APs recommended to be deployed currently and locations of the APs recommended to be deployed currently, to resolve a problem in the conventional technology that it is difficult to determine an appropriate quantity of to-be-deployed APs and locations of the APs.

BRIEF DESCRIPTION OF DRAWINGS

To describe the technical solutions in this application more clearly, the following briefly describes the accompanying drawings for describing the embodiments. It is clear that, a person of ordinary skill in the art may derive other drawings from these accompanying drawings without creative efforts.

FIG. 10 is a schematic diagram of another AP deployment interface in a wireless access point deployment method according to an embodiment of this application;

DESCRIPTION OF EMBODIMENTS

In the specification, claims, and accompanying drawings of this application, the terms such as "first", "second", and "third" are intended to distinguish different objects but do not limit a particular sequence.

In the embodiments of this application, the term such as "example" or "for example" is used to represent giving an example, an illustration, or a description. Any embodiment or design scheme described as an "example" or "for example" in the embodiments of this application shall not be explained as being more preferred or having more advantages than another embodiment or design scheme. Exactly, use of the term such as "example" or "for example" is intended to present a relative concept in a specific manner.

For clear and concise description of the following embodiments, brief descriptions of related technologies are first provided.

An AP is the core of a wireless network. When wireless network access is required, an AP usually needs to be deployed. After accessing a wired network, the AP converts a wired signal into a wireless signal and transmits the wireless signal. Various terminal devices (such as a smartphone, a tablet computer, and a computer) that support wireless network access may receive the wireless signal transmitted by the AP, and access the wireless network, to perform network access. Therefore, to ensure normal working of the terminal device and enable the terminal device to access a network, an AP usually needs to be deployed in an area in which the terminal device is located.

Figure 1:
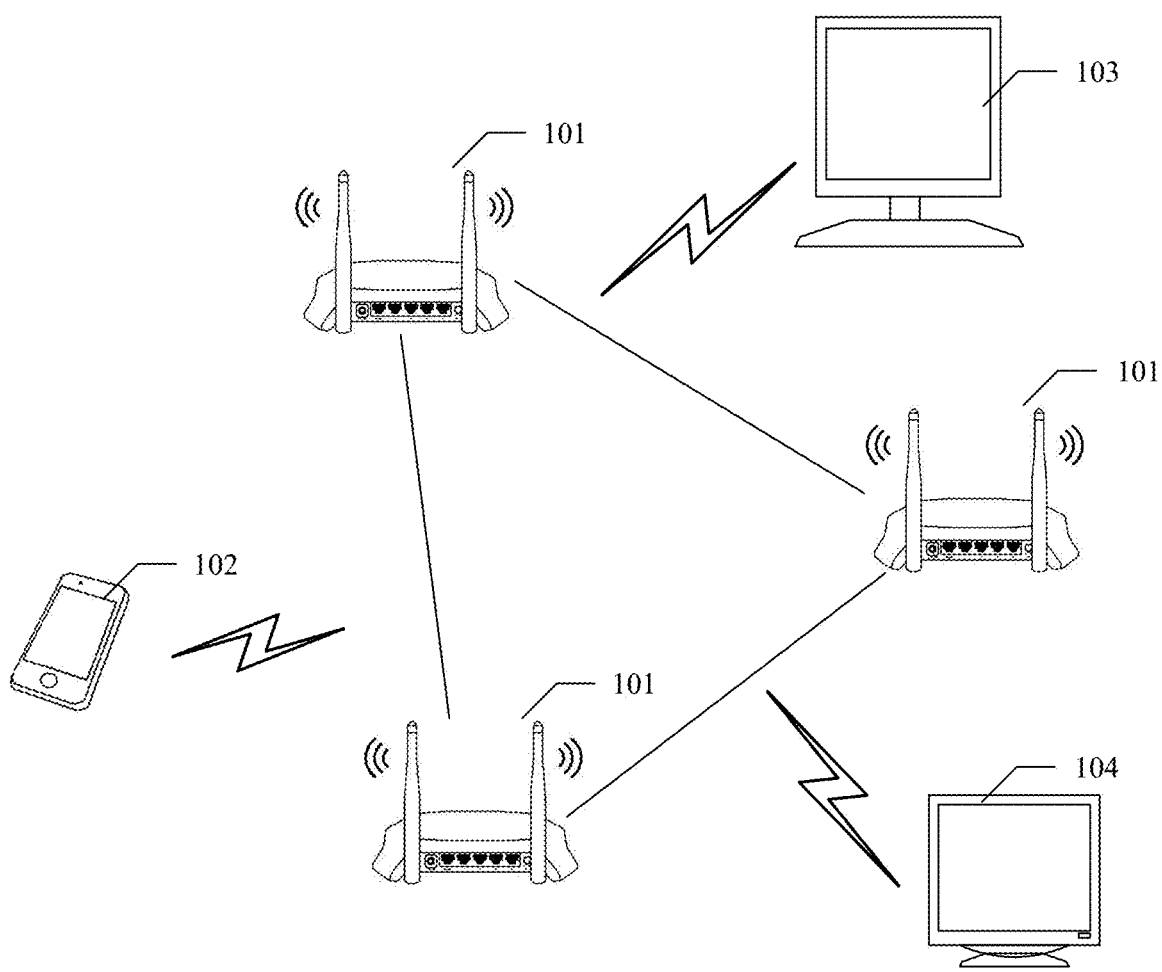
FIG. 1 is a schematic diagram of an application scenario of a wireless access point deployment method according to an embodiment of this application.

Refer to a schematic diagram of an application scenario of an AP shown in FIG. 1. A space (for example, a house) corresponding to the application scenario includes an AP 101 and a terminal device. In one space, one or more APs are usually deployed. For example, three APs are deployed in the space shown in FIG. 1, so that a wireless signal in the space has relatively good coverage. In addition, the terminal device accesses a wireless network by receiving the wireless signal. There may be a plurality of types of terminal devices, for example, a smartphone 102, a computer 103, and a television 104 in FIG. 1. This is not limited in the embodiments of this application.

Currently, a user usually deploys an AP based on experience and intuition. However, the user often does not know performance and signal coverage of the AP. Therefore, it is difficult for the user to determine an appropriate quantity of to-be-deployed APs and locations of the APs.

If a small quantity of APs are deployed in an area, wireless signals transmitted by the APs cannot cover all areas. For example, when an AP is deployed in a living room, a wireless signal transmitted by the AP usually covers only an area of the living room, and cannot cover an area in which a bedroom is located. Consequently, a wireless signal in the bedroom is relatively poor. In this case, when the user accesses the network in the bedroom by using the smartphone, the smartphone usually accesses the network at a slow rate or even fail to connect to the wireless network. Therefore, a large quantity of APs usually need to be deployed in a large area.

Even if a sufficient quantity of APs are deployed, user experience is affected if locations of the APs are inappropriate. For example, if an area in which APs are densely deployed has a relatively strong wireless signal, but another area cannot be covered by the wireless signal, user experience is deteriorated. However, when an excessively large quantity of APs are deployed, resources are wasted, and excessive APs often interfere with each other.

A quantity of to-be-deployed APs and locations of the APs are often not ideal when the user deploys an AP based on experience and intuition.

To resolve the foregoing technical problem, this application discloses a wireless access point deployment method and apparatus by using the following embodiments, to provide an appropriate AP deployment solution.

The wireless access point deployment method disclosed in the embodiments of this application may be applied to a plurality of terminal devices. The plurality of terminal devices may determine, based on related information of a house in which an AP needs to be deployed (for example, a floor plan and an area of the house) and types of various APs, a quantity of APs recommended to be deployed in the house and locations of the APs recommended to be deployed in the house, and display, by using a display interface of the terminal device, the quantity of APs recommended to be deployed and the locations of the APs recommended to be deployed.

In some embodiments, the terminal device may be a device such as a mobile phone, a tablet computer, a desktop computer, a laptop computer, a notebook computer, an ultra-mobile personal computer (UMPC), a handheld computer, a netbook, a personal digital assistant (PDA), a wearable terminal device, or a smartwatch. Specific forms of the foregoing smart household device, server, and terminal device are not particularly limited in this application. In the embodiments, a structure of the terminal device may be shown in FIG. 1. FIG. 1 is a schematic diagram of a structure of a terminal device to which a wireless access point deployment method according to an embodiment of this application is applied.

Figure 2:
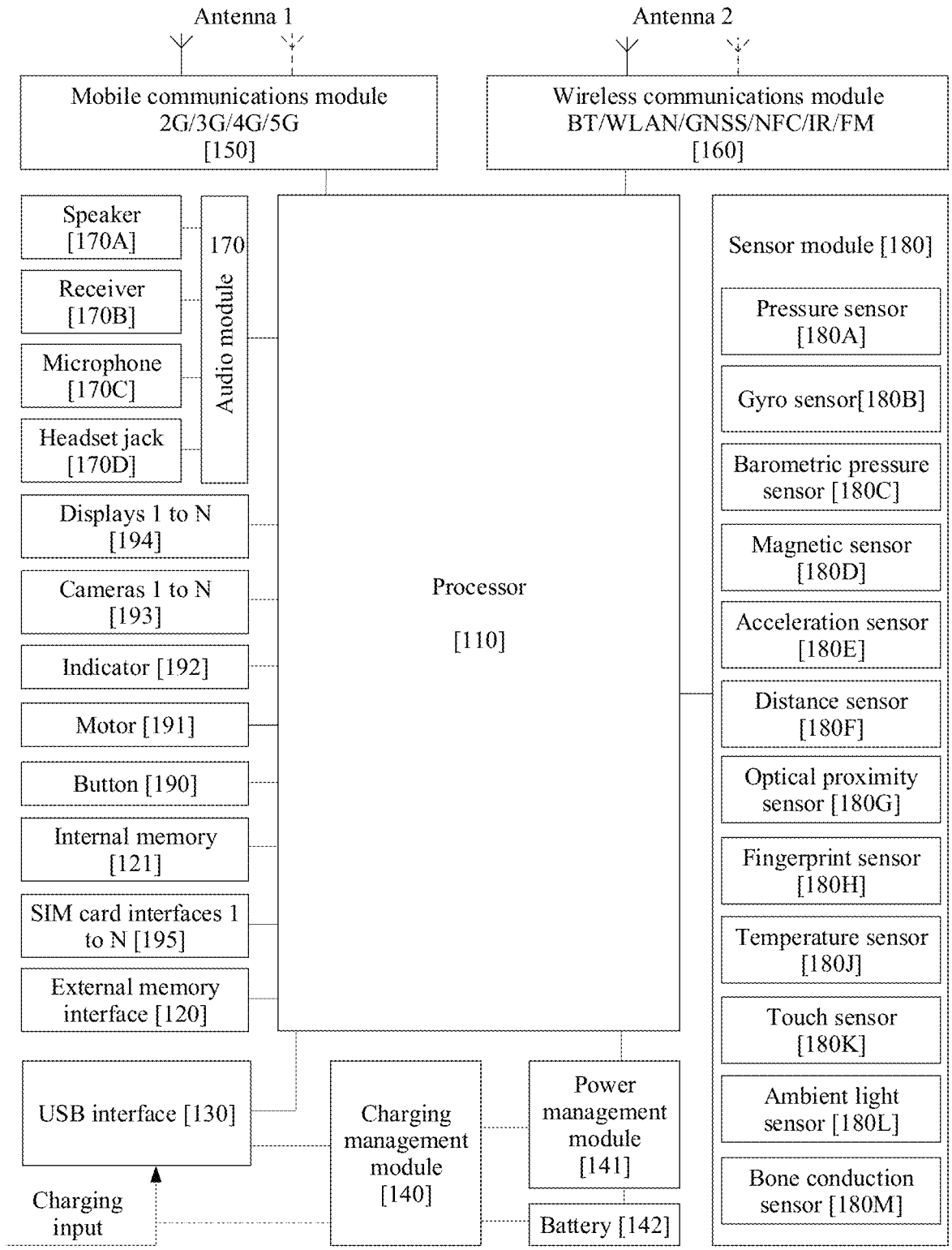
FIG. 2 is a schematic diagram of composition of a terminal device according to an embodiment of this application.

As shown in FIG. 2, the terminal device may include a processor 110, an external memory interface 120, an internal memory 121, a universal serial bus (USB) interface 130, a charging management module 140, a power management module 141, a battery 142, a sensor module 180, a button 190, a motor 191, an indicator 192, a camera 193, a display 194, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like. Further, when the terminal device is a mobile phone, the terminal device may further include an antenna 1, an antenna 2, a mobile communications module 150, a wireless communications module 160, an audio module 170, a speaker 170A, a receiver 170B, a microphone 170C, a headset jack 170D, a subscriber identification module (SIM) card interface 195, and the like.

It may be understood that the structure shown in the embodiments does not constitute a specific limitation on the terminal device. In some other embodiments, the terminal device may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU).

Different processing units may be independent devices, or may be integrated into one or more processors. For example, in this application, the processor 110 may determine, based on related information of a house in which an AP needs to be deployed (for example, a floor plan and an area of the house) and types of various APs, a quantity of APs recommended to be deployed in the house and locations of the APs recommended to be deployed in the house.

The controller may be a nerve center and a command center of the terminal device. The controller may generate an operation control signal based on instruction operation code and a time sequence signal, to complete control of instruction reading and instruction execution.

A memory may further be disposed in the processor 110, and is configured to store instructions and data. In some embodiments, the memory in the processor 110 is a cache. The memory may store instructions or data that has just been used or is cyclically used by the processor 110. If the processor 110 needs to use the instructions or the data again, the processor 110 may directly invoke the instructions or the data from the memory. This avoids repeated access and reduces a waiting time of the processor 110. Therefore, system efficiency is improved.

Further, in the embodiments of this application, the memory may further store a floor plan of a house and the like that are pre-entered into the terminal device. This is not limited in the embodiments of this application.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes a serial data line (SDA) and a serial clock line (SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the terminal device.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through the PCM bus interface. In some embodiments, the audio module 170 may alternatively transmit an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photographing function of the terminal device. The processor 110 communicates with the display 194 through the DSI interface, to implement a display function of the terminal device.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be a mini USB interface, a micro USB interface, a USB Type-C interface, or the like. The USB interface 130 may be configured to connect to the charger to charge the terminal device, or may be configured to transmit data between the terminal device and a peripheral device. or may be configured to connect to a headset for playing audio through the headset. The interface may alternatively be configured to connect to another terminal device, for example, an AR device.

It may be understood that an interface connection relationship between the modules that is shown in the embodiments is merely an example for description, and does not constitute a limitation on the structure of the terminal device. In some other embodiments of this application, the terminal device may alternatively use an interface connection mode different from that in the foregoing embodiments, or a combination of a plurality of interface connection modes.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input by using a wireless charging coil of the terminal device. When charging the battery 142, the charging management module 140 may further supply power to the terminal device by using the power management module 141.

The power management module 141 is configured to connect to the battery 142 and the charging management module 140 to the processor 110. The power management module 141 receives an input of the battery 142 and/or an input of the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the terminal device may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the terminal device may be configured to cover one or more communications frequency bands. Different antennas may be further multiplexed to improve antenna utilization. For example, the antenna 1 may be multiplexed as a diversity antenna in a wireless local area network. In some other embodiments, the antenna may be used in combination with a tuning switch.

The mobile communications module 150 may provide a wireless communications solution used in the terminal device and including wireless communication of 2G, 3G, 4G, 5G, and the like. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transfer a processed electromagnetic wave to the modem processor for demodulation. The mobile communications module 150 may further amplify a signal modulated by the modem processor, and convert the signal to an electromagnetic wave for radiation through the antenna 1. In some embodiments, at least some functional modules of the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal by using an audio device (which is not limited to the speaker 170A, the receiver 170B, or the like), or displays an image or a video by using the display 194. In some embodiments, the modem processor may be an independent device. In some other embodiments, the modem processor may be independent of the processor 110, and is disposed in a same component as the mobile communications module 150 or another functional module.

The wireless communications module 160 may provide a wireless communication solution that is applied to the terminal device and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communications module 160 may be one or more devices that integrate at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 of the terminal device is coupled to the mobile communications module 150, and the antenna 2 is coupled to the wireless communications module 160, so that the terminal device can communicate with a network and other devices through a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The terminal device implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (quantum dot light emitting diode, QLED), or the like. In some embodiments, the terminal device may include one or N displays 194, where N is a positive integer greater than 1.

A series of graphical user interfaces (GUI) may be displayed on the display 194 of the terminal device, and all these GUIs are of a home screen of the terminal device. Generally, a size of the display 194 of the terminal device is fixed, and limited controls can be displayed only on the display 194 of the terminal device. A control is a GUI element, is a software component, is included in an application program, and controls all data processed by the application program and interaction operations of the data. A user may interact with the control through direct manipulation (direct manipulation), to read or edit information about the application program. Generally, the control may include visual interface elements such as an icon, a button, a menu, a tab, a text box, a dialog box, a status bar, a navigation bar, and a widget. For example, in this embodiment of this application, the display 194 may display a virtual key.

The terminal device may implement a photographing function by using the ISP, the camera 193, the video codec, the GPU, the display 194, the application processor, and the like.

The ISP is configured to process data fed back by the camera 193. For example, during shooting, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated by using the lens, and is projected onto the photosensitive element. The photosensitive element may be a charge coupled device (CCD) or a complementary metal-oxide-semiconductor (CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the terminal device may include one or N cameras 193, where N is a positive integer greater than 1.

The digital signal processor is configured to process a digital signal, and may process another digital signal in addition to the digital image signal. For example, when the terminal device selects a frequency, the digital signal processor is configured to perform Fourier transform on energy of the frequency.

The video codec is configured to compress or decompress a digital video. The terminal device may support one or more video codecs. In this way, the terminal device can play or record videos in a plurality of encoding formats, for example, moving picture experts group (MPEG)-1, MPEG-2, MPEG-3, MPEG-4, and the like.

The NPU is a neural-network (NN) computing processor, quickly processes input information by referring to a structure of a biological neural network, for example, by referring to a mode of transmission between human brain neurons, and may further continuously perform self-learning. The NPU may be used to implement an application such as intelligent cognition of the terminal device, for example, image recognition, facial recognition, speech recognition, and text understanding.

The external memory interface 120 may be configured to connect to an external memory card such as a micro SD card, to expand a storage capability of the terminal device. The external memory card communicates with the processor 110 through the external memory interface 120, to implement a data storage function. For example, files such as music and a video are stored in the external memory card.

The internal memory 121 may be configured to store computer executable program code. The executable program code includes instructions. The processor 110 runs the instructions stored in the internal memory 121, to implement various function applications and data processing of the terminal device. For example, in the embodiments, the processor 110 may deploy the AP by executing the instructions stored in the internal memory 121 and by using the solution disclosed in the embodiments of this application. The internal memory 121 may include a program storage area and a data storage area. The program storage area may store an operating system, an application required by at least one function (for example, a voice playing function or an image playing function), and the like. The data storage area may store data (for example, audio data or an address book) created in a process of using the terminal device, and the like. In addition, the internal memory 121 may include a high-speed random access memory, and may further include a nonvolatile memory, for example, at least one magnetic disk storage device, a flash memory, or a universal flash storage (UFS). The processor 110 executes various functional applications and data processing of the terminal device by running the instruction stored in the internal memory 121 and/or the instruction stored in the memory disposed in the processor.

The terminal device may implement an audio function such as music playing or recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The terminal device may be used to listen to music or listen to a hands-free call by using the speaker 170A.

The receiver 170B, also referred to as an "earpiece", is configured to convert an audio electrical signal into a sound signal. When the terminal device is used to answer a call or listen to voice information, a voice may be listened to by placing the receiver 170B close to a human ear.

The microphone 170C, also referred to as a "mic" or a "sound conducting device", is configured to convert a sound signal into an electrical signal. When making a call or sending a voice message, a user may make a sound near the microphone 170C, to enter a sound signal to the microphone 170C. At least one microphone 170C may be disposed in the terminal device. In some other embodiments, two microphones 170C may be disposed in the terminal device. In addition to collecting a sound signal, the microphones may further implement a noise reduction function. In some other embodiments, three, four, or more microphones 170C may be disposed in the terminal device, to collect a sound signal, reduce noise, identify a sound source, implement a directional recording function, and the like.

The headset jack 170D is configured to connect to a wired headset. The headset jack 170D may be the USB interface 130, or may be a 3.5 mm open mobile terminal platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, for example, a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The terminal device determines pressure strength based on the capacitance change. When a touch operation is performed on the display 194, the terminal device detects strength of the touch operation based on the pressure sensor 180A. The terminal device may further calculate a touch position based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on a Messages icon, an instruction for creating a new SMS message is executed.

The gyro sensor 180B may be configured to determine a motion posture of the terminal device. In some embodiments, angular velocities of the terminal device around three axes (that is, x, y, and z axes) may be determined by using the gyro sensor 180B. The gyro sensor 180B may be configured to perform image stabilization during photographing. For example, when the shutter is pressed, the gyro sensor 180B detects a shake angle of the terminal device, calculates, based on the angle, a distance that needs to be compensated by a lens module, and enables the lens to counteract the shake of the terminal device by performing reverse motion, thereby implementing image stabilization. The gyro sensor 180B may be further used in a navigation scenario and a motion-sensing game scenario.

The barometric pressure sensor 180C is configured to measure barometric pressure. In some embodiments, the terminal device calculates an altitude by using a barometric pressure value measured by the barometric pressure sensor 180C, to assist in positioning and navigation.

The magnetic sensor 180D includes a Hall effect sensor. The terminal device may detect opening and closing of a flip carrying case by using the magnetic sensor 180D. In some embodiments, when the terminal device is a flip phone, the terminal device can detect opening and closing of a flip lid based on the magnetic sensor 180D. Further, a feature such as automatic unlocking upon opening of the flip cover is set based on a detected opening or closing state of the leather case or a detected opening or closing state of the flip cover.

The acceleration sensor 180E may detect magnitudes of accelerations of the terminal device in various directions (generally three-axis). A magnitude and a direction of gravity may be detected when the terminal device is stationary. The acceleration sensor 180E may be further configured to identify a posture of the terminal device, to be applied to applications such as landscape/portrait switching and a pedometer.

The distance sensor 180F is configured to measure a distance. The terminal device may measure a distance by using infrared light or a laser. In some embodiments, in a photographing scenario, the terminal device may measure a distance by using the distance sensor 180F, to implement fast focusing.

The optical proximity sensor 180G may include, for example, a light-emitting diode (LED) and an optical detector such as a photodiode. The light-emitting diode may be an infrared light-emitting diode. The terminal device emits infrared light outwards by using the light-emitting diode. The terminal device detects infrared reflected light from a nearby object by using the photodiode. When detecting sufficient reflected light, the terminal device may determine that there is an object near the terminal device. When detecting insufficient reflected light, the terminal device may determine that there is no object near the terminal device. The terminal device may detect, by using the optical proximity sensor 180G, that the user holds the terminal device close to the ear for a call, to automatically turn off the screen to save power. The optical proximity sensor 180G may also be used in a leather case mode or a pocket mode to automatically unlock or lock a screen.

The ambient light sensor 180L is configured to sense ambient light brightness. The terminal device may adaptively adjust luminance of the display 194 based on the sensed ambient light luminance. The ambient light sensor 180L may also be configured to automatically adjust a white balance during photographing. The ambient light sensor 180L may further cooperate with the optical proximity sensor 180G to detect whether the terminal device is in a pocket, to prevent accidental touch.

The fingerprint sensor 180H is configured to collect a fingerprint. The terminal device may implement fingerprint-based unlocking, unlocking for application access, fingerprint-based photographing, fingerprint-based call answering, and the like by using a collected fingerprint characteristic.

The temperature sensor 180J is configured to detect a temperature. In some embodiments, the terminal device executes a temperature processing policy by using the temperature detected by the temperature sensor 180J. For example, when the temperature reported by the temperature sensor 180J exceeds a threshold, the terminal device reduces performance of a processor located near the temperature sensor 180J, to reduce power consumption and implement heat protection. In some other embodiments, when the temperature is lower than another threshold, the terminal device heats the battery 142, to avoid abnormal shutdown of the terminal device caused by a low temperature. In some other embodiments, when the temperature is lower than still another threshold, the terminal device boosts an output voltage of the battery 142 to prevent abnormal shutdown caused by the low temperature.

The touch sensor 180K is also referred to as a "touch device". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. The display 194 may provide a visual output related to the touch operation. In some other embodiments, the touch sensor 180K may alternatively be disposed on a surface of the terminal device at a location different from that of the display 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, to receive a blood pressure beating signal. In some embodiments, the bone conduction sensor 180M may also be disposed in the headset, to obtain a bone conduction headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The terminal device may receive a key input, and generate a key signal input related to user setting and function control of the terminal device.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder scenario, an information receiving scenario, an alarm clock scenario, and a game scenario) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the terminal device. The terminal device may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may also be compatible with an external storage card. The terminal device interacts with a network by using the SIM card, to implement functions such as a call and data communication. In some embodiments, the terminal device uses an eSIM, that is, an embedded SIM card. The eSIM card may be embedded in the terminal device, and cannot be separated from the terminal device.

In addition, an operating system runs on the foregoing components, for example, an iOS operating system developed by Apple, an Android open-source operating system developed by Google, and a Windows operating system developed by Microsoft. An application program may be installed and run on the operating system.

The operating system of the terminal device may use a layered architecture, an event-driven architecture, a microkernel architecture, a micro service architecture, or a cloud architecture. In the embodiments of this application, an Android system with a layered architecture is used as an example to describe a software structure of the terminal device.

Figure 3:
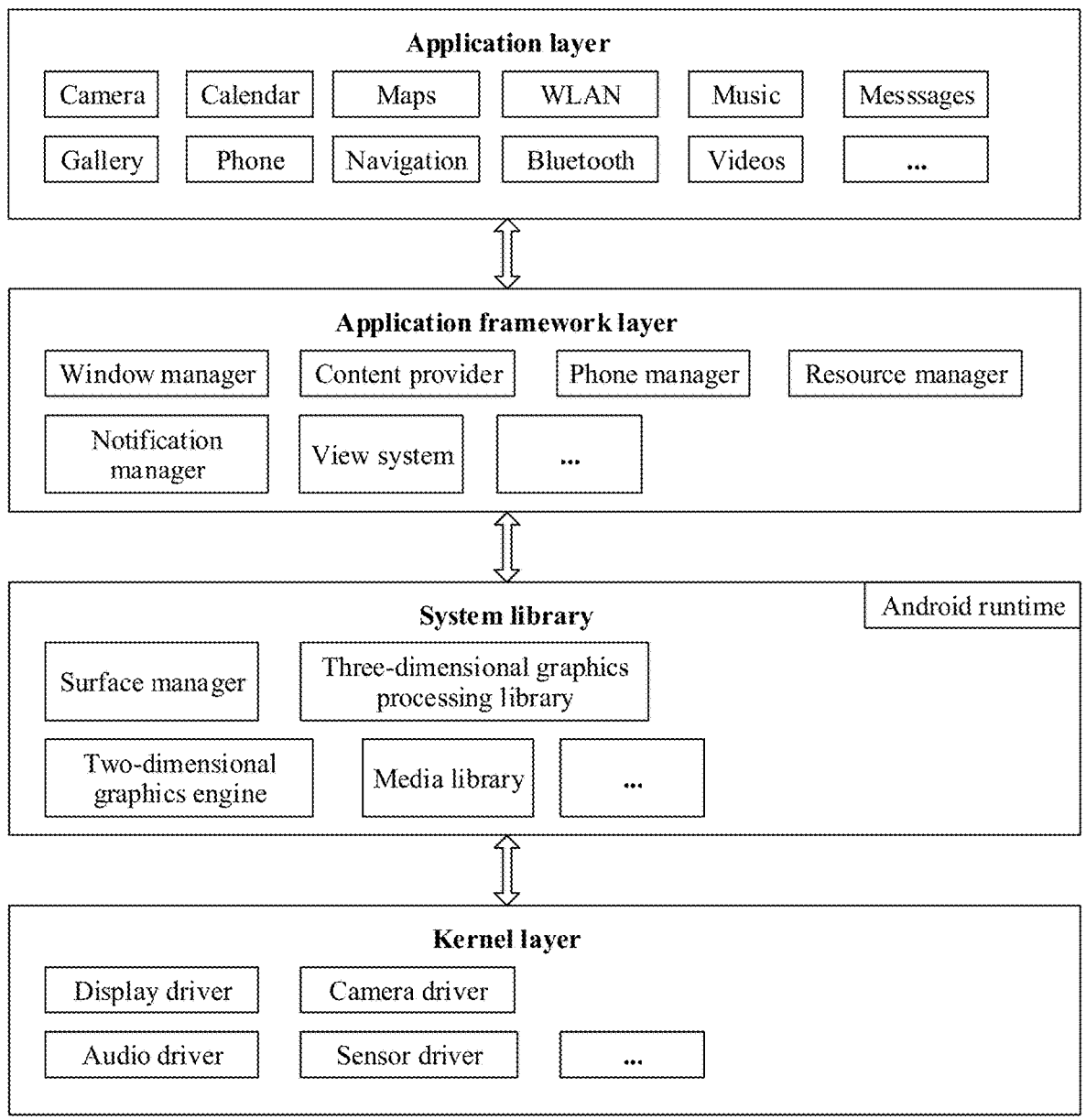
FIG. 3 is a block diagram of a software structure of a terminal device according to an embodiment of this application.

FIG. 3 is a block diagram of a software structure of a terminal device according to an embodiment of this application.

In a hierarchical architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages. As shown in FIG. 2, the application packages may include applications such as Camera, Gallery, Calendar, Phone, Map, Navigation, WLAN, Bluetooth, Music, Video, and Messages. For example, in the embodiments of this application, the application package may further include an AP deployment application or an AP deployment applet. When an AP deployment solution is determined by using the method disclosed in the embodiments of this application, the AP deployment application or the AP deployment applet may access an AP deployment service provided at the application framework layer.

The application framework layer provides an application programming interface (API) and a programming framework for an application at the application layer. The application framework layer includes some predefined functions. As shown in FIG. 2, the application framework layer may include a window manager, a content provider, a view system, a phone manager, a resource manager, a notification manager, and the like. For example, in the embodiments of this application, the application framework layer may provide an AP deployment—related API for the application layer, and provide an AP deployment management service for the application layer, to determine a quantity of APs recommended to be deployed and locations of the APs recommended to be deployed.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, calls that are made and received, a browsing history and a bookmark, a phone book, and the like.

The view system includes visual controls, such as a control for displaying a text and a control for displaying an image. The view system may be configured to construct an application. A display interface may include one or more views. For example, a display interface including an SMS message notification icon may include a text display view and an image display view.

The phone manager is configured to provide a communication function of the terminal device, for example, management of a call status (including answering, declining, or the like).

The resource manager provides, for an application, various resources such as a localized character string, an icon, a picture, a layout file, and a video file.

The notification manager enables an application to display notification information in a status bar, and may be configured to convey a notification type message, where the displayed notification information may automatically disappear after a short pause and require no user interaction. For example, the notification manager is configured to notify download completion, provide a message notification, and the like. The notification manager may alternatively be a notification that appears in the status bar at the top of the system in a form of a graph or a scroll bar text, for example, a notification of an application running on the background or a notification that appears on the screen in a form of a dialog window. For example, text information is prompted in the status bar, a prompt tone is produced, the terminal device vibrates, or an indicator light blinks.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording of audio and videos in a plurality of commonly used formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

It should be noted that, although the embodiments of this application are described by using the Android system as an example, a basic principle in the embodiments is also applicable to a terminal device based on an operating system such as iOS or Windows.

Further, a related deployment application (APP), a WeChat deployment applet, or the like may be set in the terminal device. The deployment APP, the deployment applet, or the like may be used to implement human-machine interaction between deployment personnel and the terminal device, so as to complete AP deployment. In an embodiment, when an AP deployment solution needs to be obtained, the deployment personnel touch the deployment app or the deployment applet. After receiving the touch operation for the deployment app or the deployment applet, the terminal device performs the method disclosed in the embodiments of this application.

Figure 4:
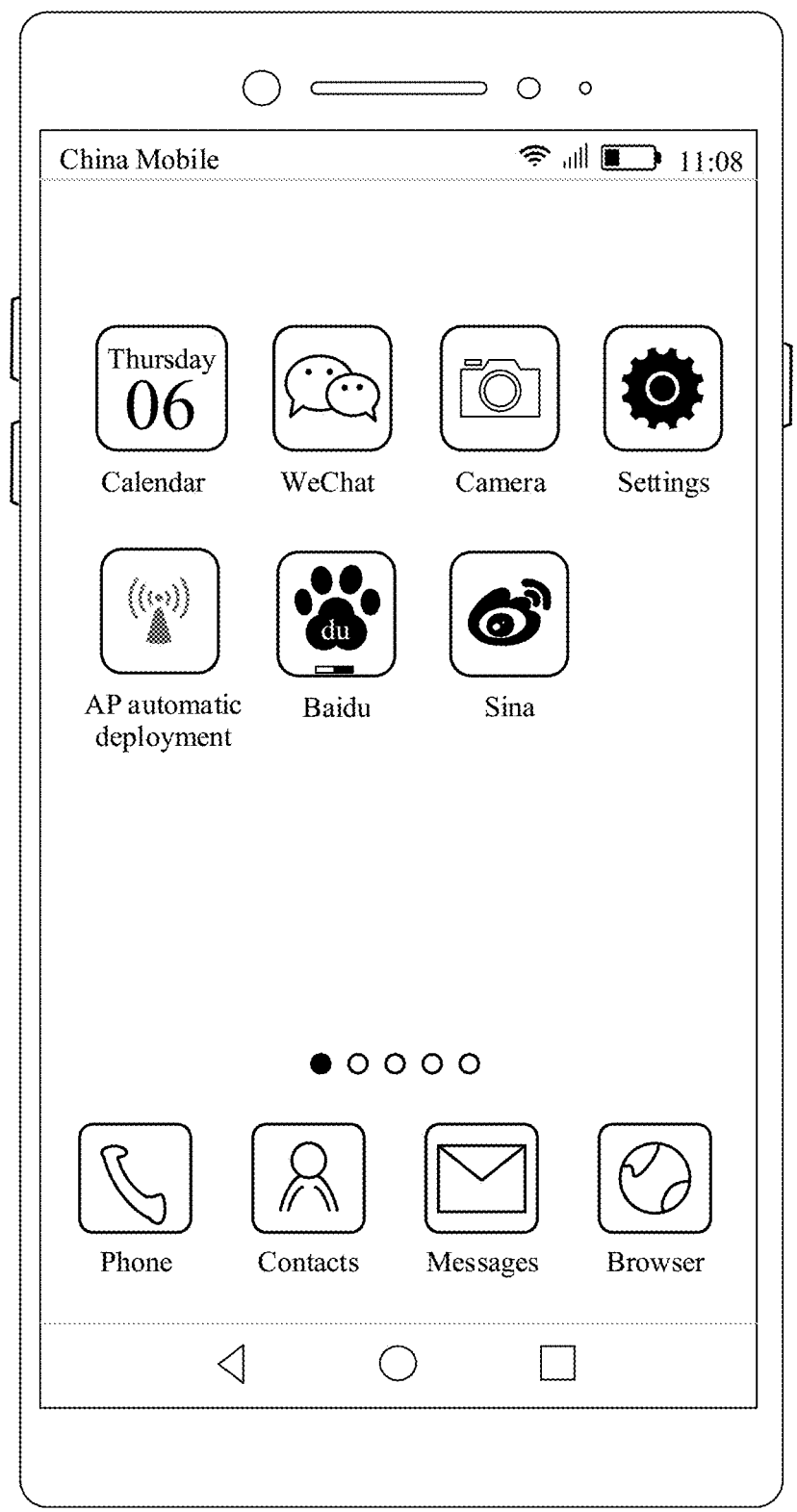
FIG. 4 is a schematic diagram of an icon of app deployment in a wireless access point deployment method according to an embodiment of this application.

In an example, an icon of the deployment app may be shown in FIG. 4. FIG. 4 is a schematic diagram of a display interface of the terminal device. In addition, in the example in FIG. 4, a name of the deployment app is "AP automatic deployment". The icon of the app is the first icon in the second row of icons displayed on the terminal interface in FIG. 4. When an AP needs to be deployed, the deployment personnel can touch the icon. After receiving the touch operation for the icon, the terminal device starts to perform the method disclosed in the embodiments of this application, to determine a quantity of APs recommended to be deployed and locations of the APs recommended to be deployed.

Figure 5:
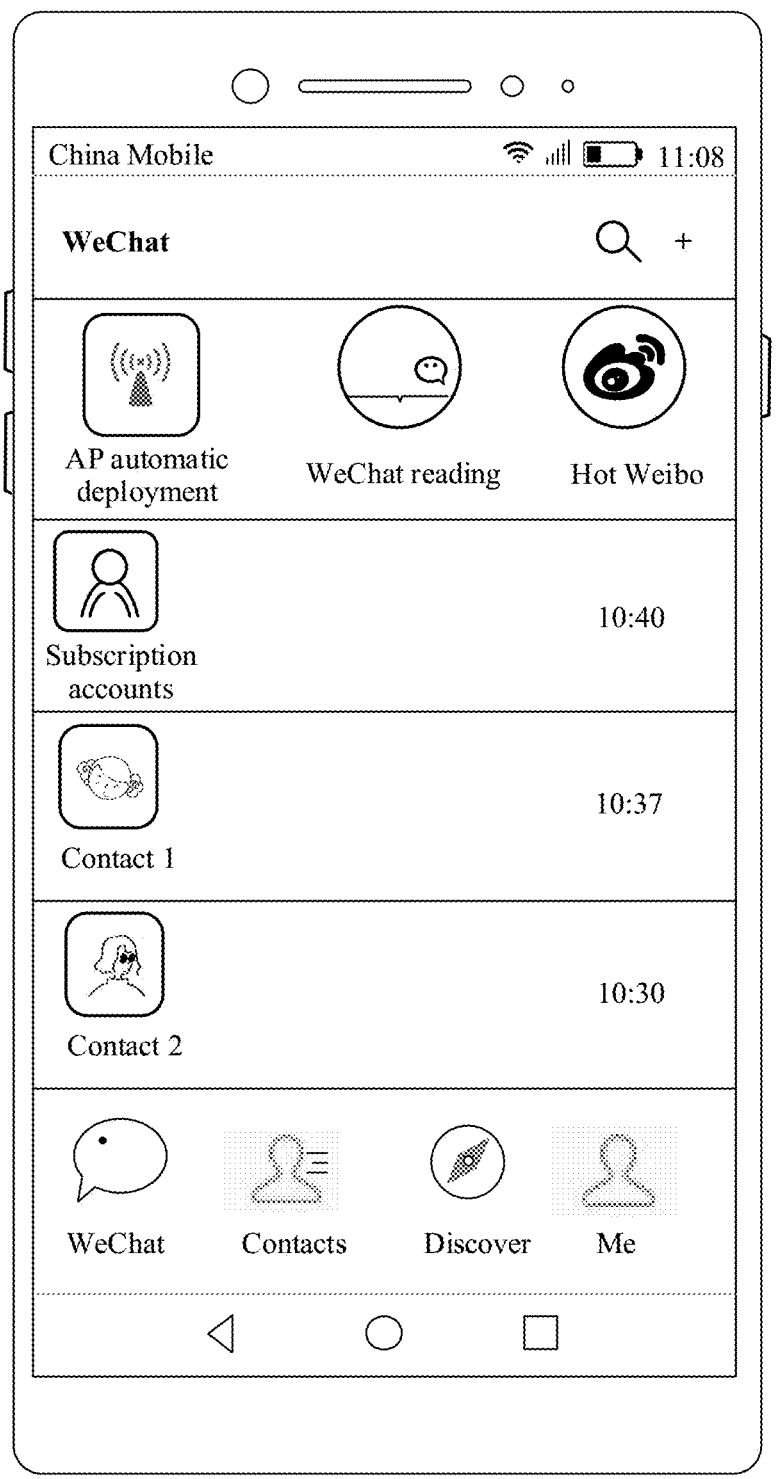
FIG. 5 is a schematic diagram of an icon of applet deployment in a wireless access point deployment method according to an embodiment of this application.

In another example, a display interface of a deployment applet in the terminal device is shown in FIG. 5. In this example, after opening an interface that is in WeChat and that is used to display each applet, the terminal device may display an icon of the deployment applet. In the WeChat interface shown in FIG. 5, interfaces of three applets are included. A name of the deployment applet is "AP automatic deployment", and the icon of the applet is the first icon in applet icons displayed on the WeChat interface in FIG. 5. When an AP needs to be deployed, the deployment personnel can touch the icon. When receiving the touch operation for the deployment applet, the terminal device starts to perform the method disclosed in the embodiments of this application, to determine a quantity of APs recommended to be deployed and locations of the APs recommended to be deployed.

Certainly, the icon of the deployment app or the deployment applet may alternatively be in another form. This is not limited in this application.

Alternatively, AP deployment may be started in another manner. This is not limited in this application. For example, a specific button may be set in the terminal device, and after the specific button is tapped, the terminal device starts AP deployment.

The following describes an example of a working process of software and hardware of the terminal device with reference to an AP deployment scenario.

When receiving a touch operation, the touch sensor 180K reports the touch operation to the processor 110, so that the processor starts the application in response to the touch operation, and displays a user interface of the application on the display 194. For example, after receiving a touch operation on an icon of a deployment app (for example, the deployment app shown in FIG. 3) or a deployment applet (for example, the deployment applet shown in FIG. 4), the touch sensor 180K reports the touch operation to the processor 110, so that the processor 110 starts current AP deployment in response to the touch operation, and displays an AP deployment—related user interface on the display 194. In addition, in the embodiments of this application, the terminal device may be enabled to start AP deployment in another manner, and display a user interface of AP deployment on the display 194. For example, when a user interface is displayed after a black screen occurs, a lock screen is displayed, or unlocking is performed, the terminal may start AP deployment in response to a voice instruction or a shortcut operation of a user, and display a user interface of AP deployment on the display 194.

The user interface of AP deployment may include various function buttons. In some embodiments, the user interface of AP deployment may further include options related to AP deployment, and the like. For example, a related interface for determining a floor plan may be displayed in the user interface. The deployment personnel may tap an option on the interface, to determine whether a floor plan needs to be input, or select a floor plan from an image database, or generate a floor plan. Certainly, in a process of AP deployment, another function button may be further displayed on the user interface of the terminal device.

The following describes the embodiments of this application with reference to the accompanying drawings, to specify an AP deployment solution disclosed in this application.

Figure 6:
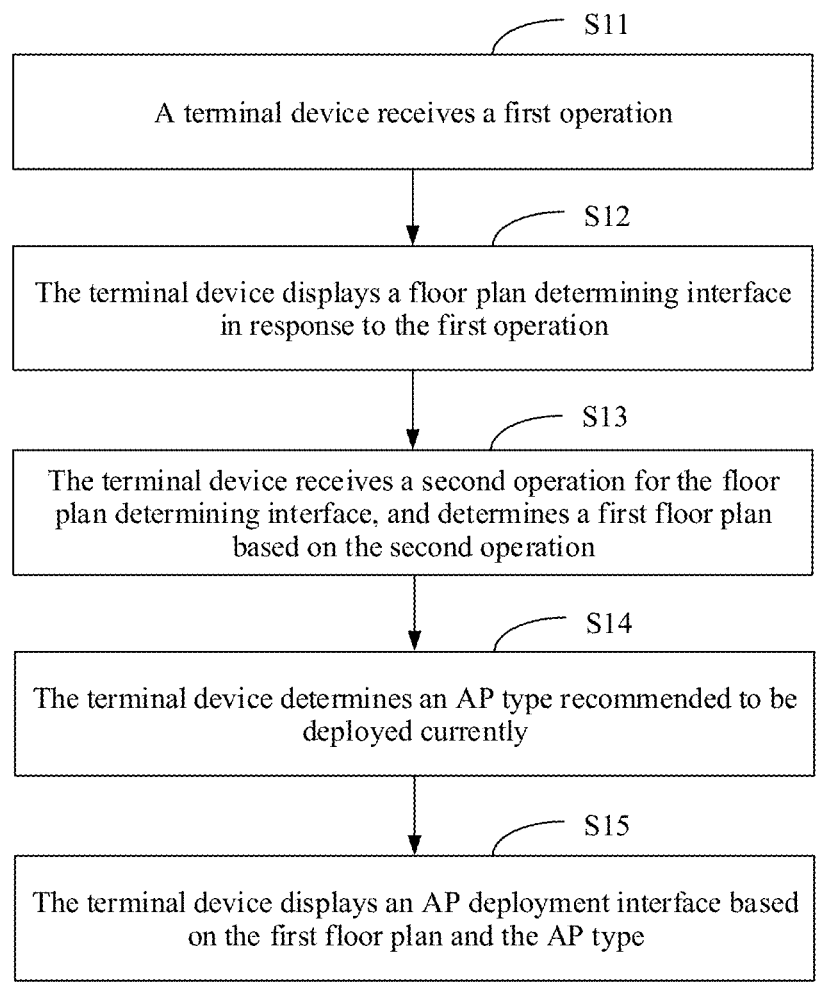
FIG. 6 is a schematic diagram of a working process of a wireless access point deployment method according to an embodiment of this application.

FIG. 6 is a schematic diagram of a working process. An AP deployment method disclosed in this embodiment of this application includes the following operations.

Operation S11: A terminal device receives a first operation, where the first operation is used to start AP deployment.

When AP deployment needs to be performed, a user correspondingly performs the first operation on the terminal device, to trigger the terminal device to start an AP deployment procedure, so that the terminal device determines, according to the method disclosed in this application, a quantity of APs recommended to be deployed currently and locations of the APs recommended to be deployed currently.

The first operation may be a preset gesture or a voice instruction entered by deployment personnel. The preset gesture may be any one of a tap gesture, a slide gesture, a pressure recognition gesture, a touch-and-hold gesture, an area change gesture, a double-press gesture, or a double-tap gesture. In some embodiments, the first operation may be an operation performed by the deployment personnel on a virtual button of the terminal device, or may be that the user taps a physical button of the terminal device.

For example, the deployment personnel may touch the icon of the deployment app shown in FIG. 3, or touch the icon of the deployment applet shown in FIG. 4. In this case, the first operation is a touch operation for the icon of the deployment app or the icon of the deployment applet.

Operation S12: The terminal device displays a floor plan determining interface in response to the first operation.

When AP deployment is performed by using the wireless access point deployment method disclosed in this embodiment of this application, a floor plan of a house in which an AP is deployed currently needs to be determined, so that a quantity of APs recommended to be deployed currently and locations of the AP recommended to be deployed currently are determined based on the floor plan. Therefore, to enable the terminal device to obtain the floor plan of the house in which the AP is deployed, the terminal device may display the floor plan determining interface when AP deployment starts.

The terminal device may determine, in a plurality of manners, the floor plan of the house in which the AP is deployed currently. For example, the terminal device may receive the floor plan entered by the deployment personnel. Alternatively, the terminal device may provide a plurality of forms of floor plans, and then determine, based on a received selection operation, the floor plan of the house in which the AP is recommended to be deployed currently. Alternatively, the terminal device may generate the floor plan based on an existing floor plan generation method.

Operation S13: The terminal device receives a second operation for the floor plan determining interface, and determines a first floor plan based on the second operation.

The first floor plan is the floor plan of the house in which the AP needs to be deployed currently. In addition, in this embodiment of this application, the first floor plan may be determined in a plurality of manners.

In one manner, that the terminal device determines a first floor plan based on the second operation includes the following operations:

The terminal device displays at least one prestored floor plan.

The terminal device receives a third operation.

The terminal device determines the first floor plan in response to the third operation, where the first floor plan is the prestored floor plan.

The prestored floor plan may be each picture prestored in a gallery of the terminal device, for example, may be a picture captured by using a camera, or may be a picture obtained by using an application such as a browser. Alternatively, the prestored floor plan may be a template of each floor plan prestored in the terminal device.

To clarify a manner of determining the first floor plan in a process of performing the AP deployment method disclosed in this embodiment of this application, a plurality of examples are disclosed below.

Figure 7A:
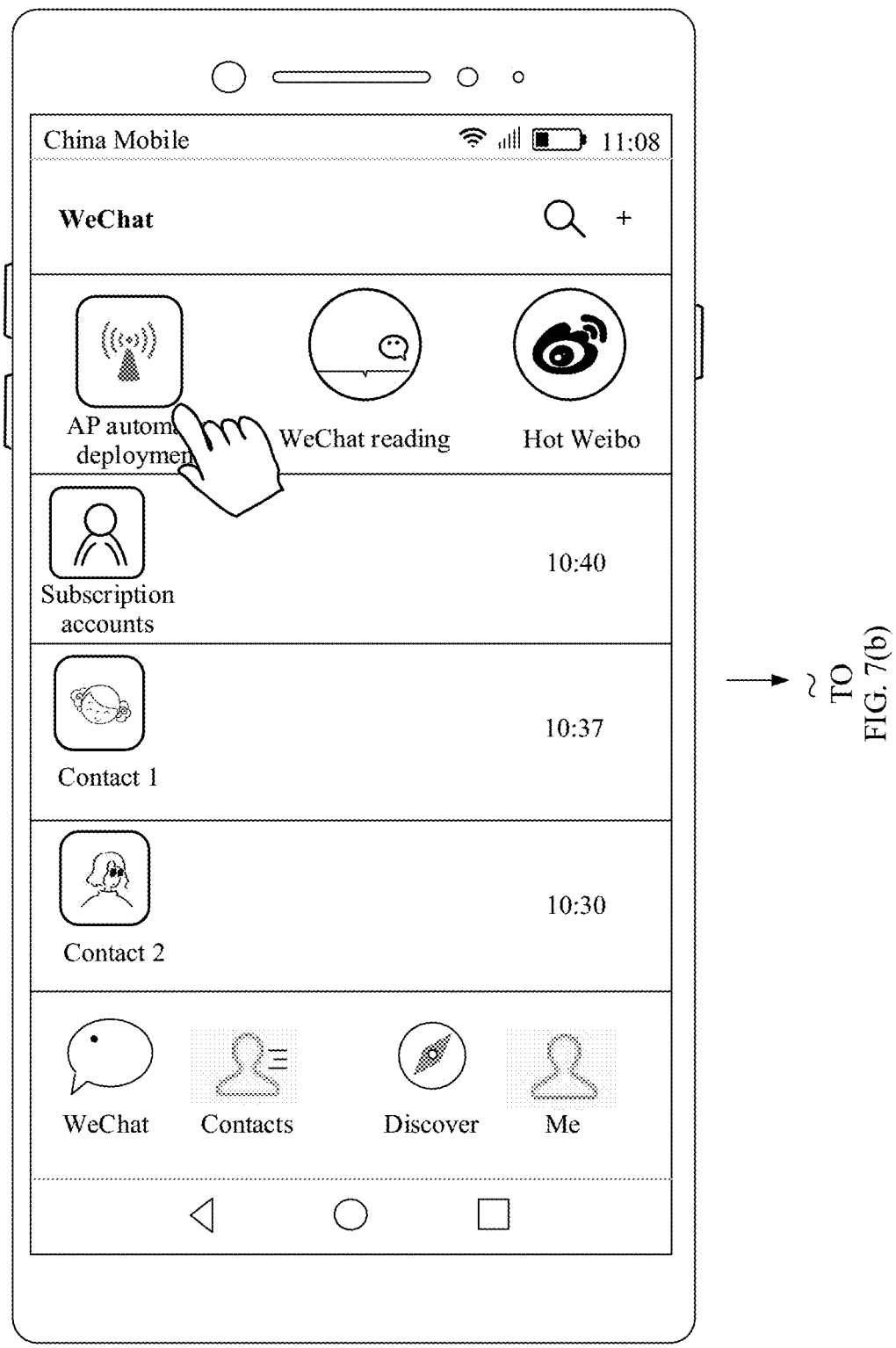
FIG. 7(a) to FIG. 7(d) are a schematic diagram of an AP deployment interface in a wireless access point deployment method according to an embodiment of this application.
Figure 7B:
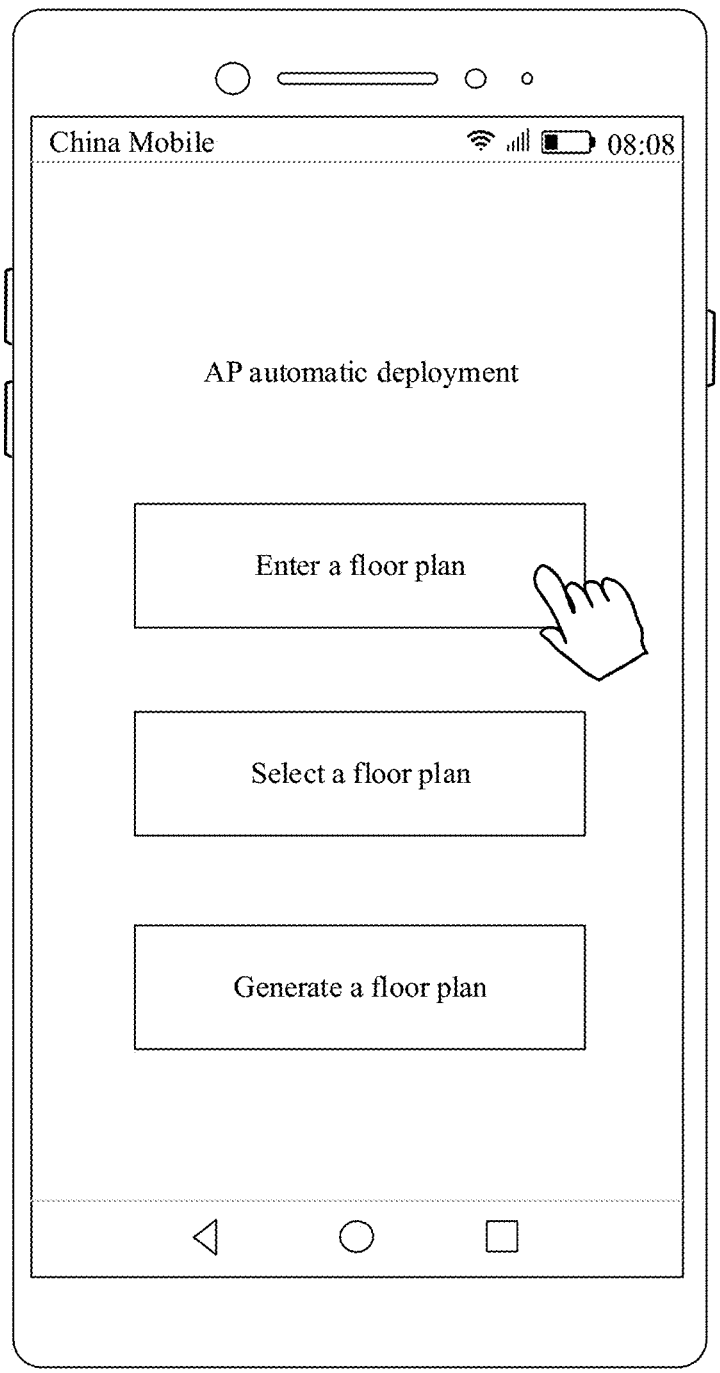
Figure 7C:
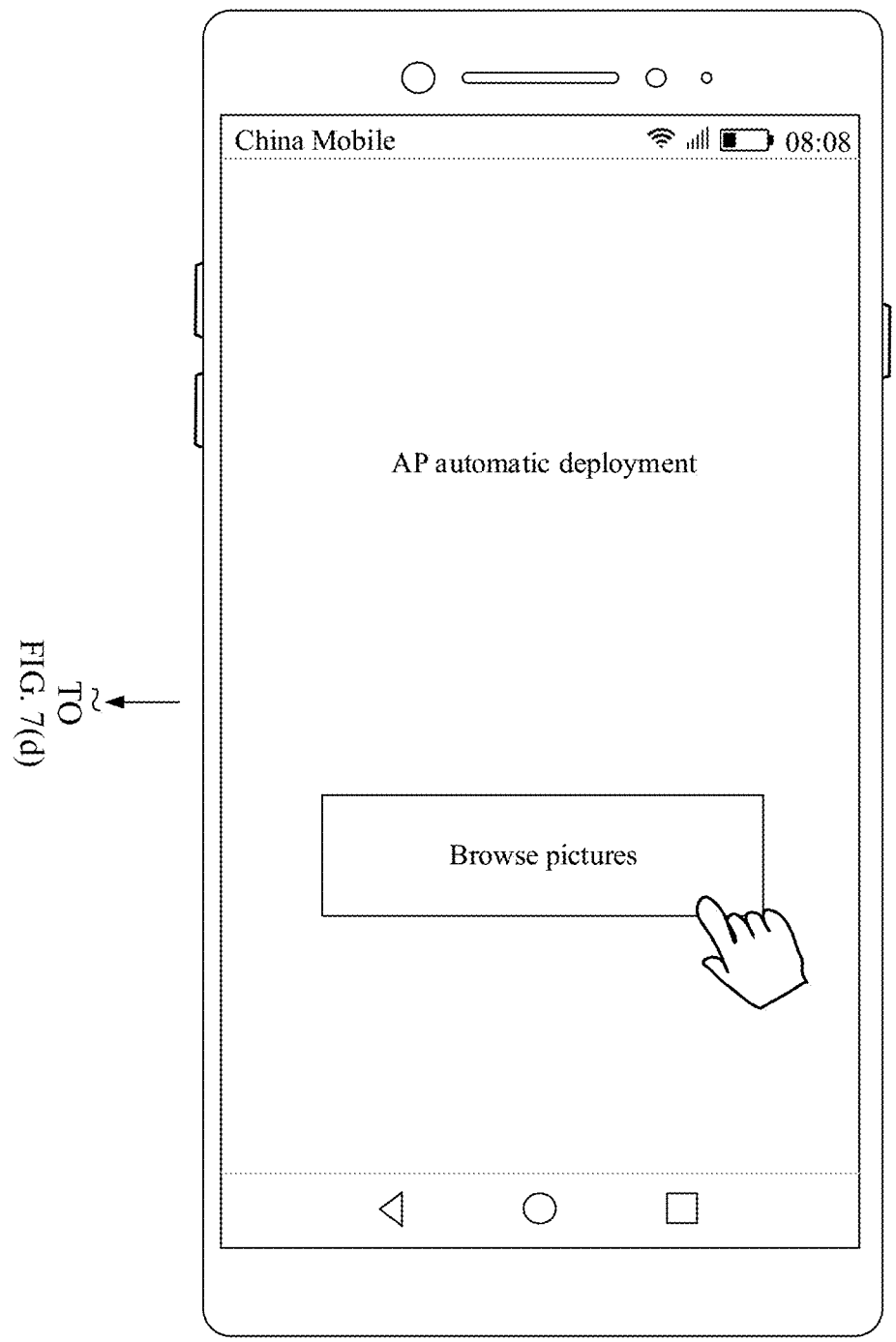

In a first example, the prestored floor plan is each picture prestored in a gallery of the terminal device. FIG. 7(a) to FIG. 7(d) are an example diagram of an AP deployment interface in this example. In this example, the first operation is a touch operation for an icon of a deployment applet shown in FIG. 7(a). In this case, after the touch operation for the icon of the deployment applet is received, a floor plan determining interface shown in FIG. 7(b) may be displayed. FIG. 7(b) includes three options: "Enter a floor plan", "Select a floor plan", and "Generate a floor plan".

When the deployment personnel consider that there is a floor plan that is prestored in the gallery of the terminal device, and the prestored floor plan may be used as the floor plan required for current AP deployment, the deployment personnel touch the option "Enter a floor plan". After receiving the touch operation for the option "Enter a floor plan", the terminal device jumps to an interface shown in FIG. 7(c). On the interface shown in FIG. 7(c), an option "Browse pictures" is provided. The deployment personnel may tap the option to select a path of the gallery in which a to-be-displayed picture is located. After receiving an operation for the option "Browse pictures", the terminal device displays an interface shown in FIG. 7(d). The interface displays all pictures in the path for selection by the deployment personnel. After receiving a selection operation on one picture thereof by the deployment personnel, the picture is determined as the floor plan (that is, the first floor plan) of the house in which the AP needs to be deployed currently. For example, after receiving a tap operation for a picture 1, the terminal device determines that the picture 1 is the first floor plan. Then, the terminal device may jump to an interface of a subsequent operation, for example, jump to a subsequent AP determining interface.

Figure 7D:
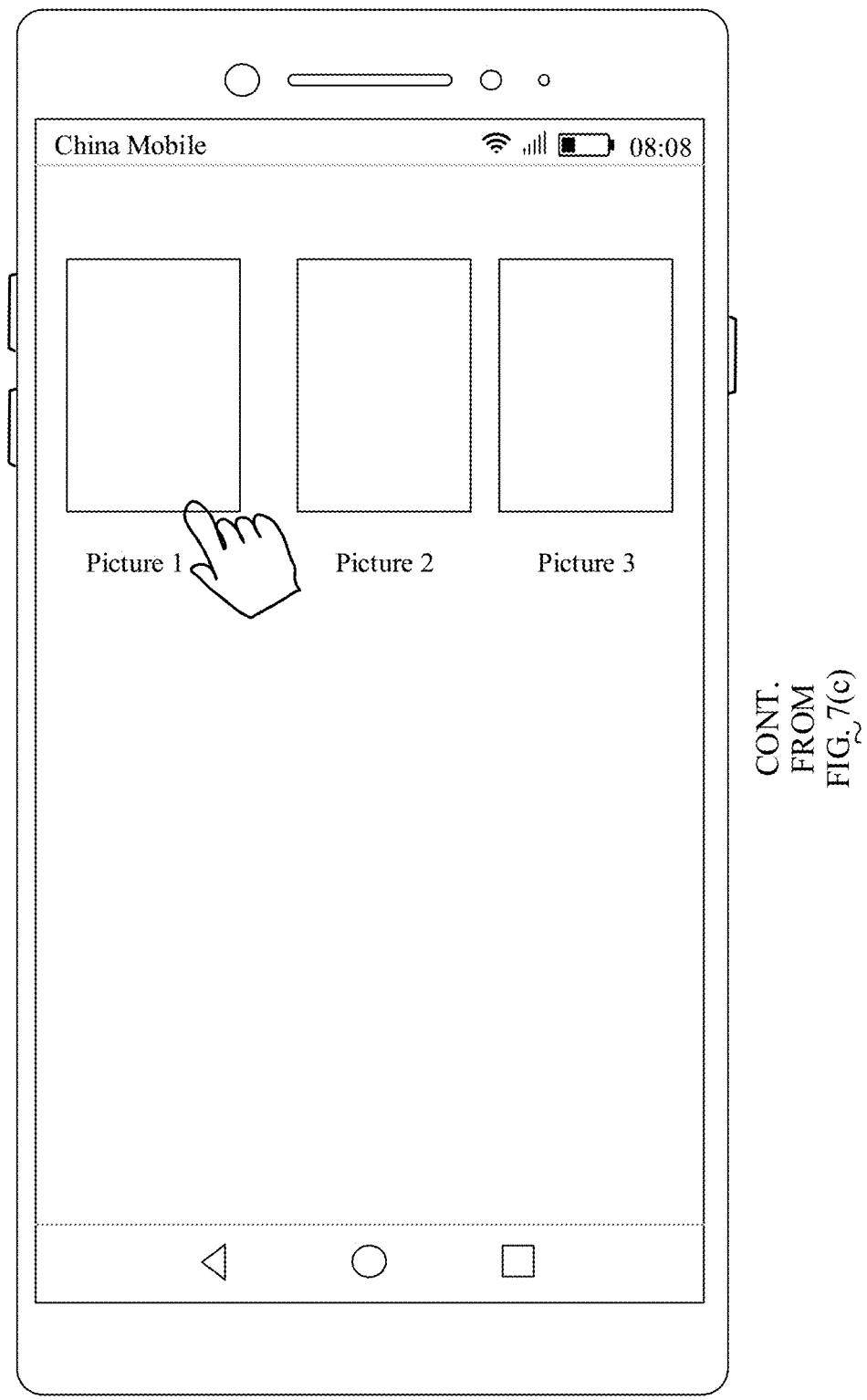

In addition, when the pictures displayed on the interface in FIG. 7(d) does not include the currently required first floor plan, the deployment personnel may touch a back button. After receiving the touch operation for the back button, the terminal device returns to the interface shown in FIG. 7(c), to select another path on the interface shown in FIG. 7(c). When the terminal device displays the interface in FIG. 7(c), the deployment personnel may also touch a back button on the interface, so that the terminal device returns to the interface shown in FIG. 7(b), and the deployment personnel can select another option.

In this case, the second operation includes the operation of touching the option "Enter a floor plan" and the operation of selecting the path in which the to-be-displayed picture is located. In addition, the third operation is an operation of selecting a picture displayed by the terminal device, to determine the picture as the first floor plan.

In the foregoing example, the first floor plan is determined by using the picture prestored in the terminal device. However, one path of the terminal device usually includes a plurality of pictures. For example, a path corresponding to the camera usually includes a plurality of pictures captured in advance, for example, a floor plan, a landscape, and a portrait that are captured in advance. Therefore, when the terminal device displays the pictures for selection by the deployment personnel, the deployment personnel may select an incorrect picture. In this case, in this embodiment of this application, after a picture selected by the deployment personnel is determined, picture recognition may be further performed on the picture. If it is determined, through picture recognition, that the picture is a floor plan, it is determined that the picture is the first floor plan. If it is determined, through picture recognition, that the picture is not a floor plan, the terminal device may further generate corresponding prompt information, to prompt the deployment personnel that the picture selected by the deployment personnel cannot be used as the first floor plan, and prompt the deployment personnel to re-determine the first floor plan.

Figure 8A:
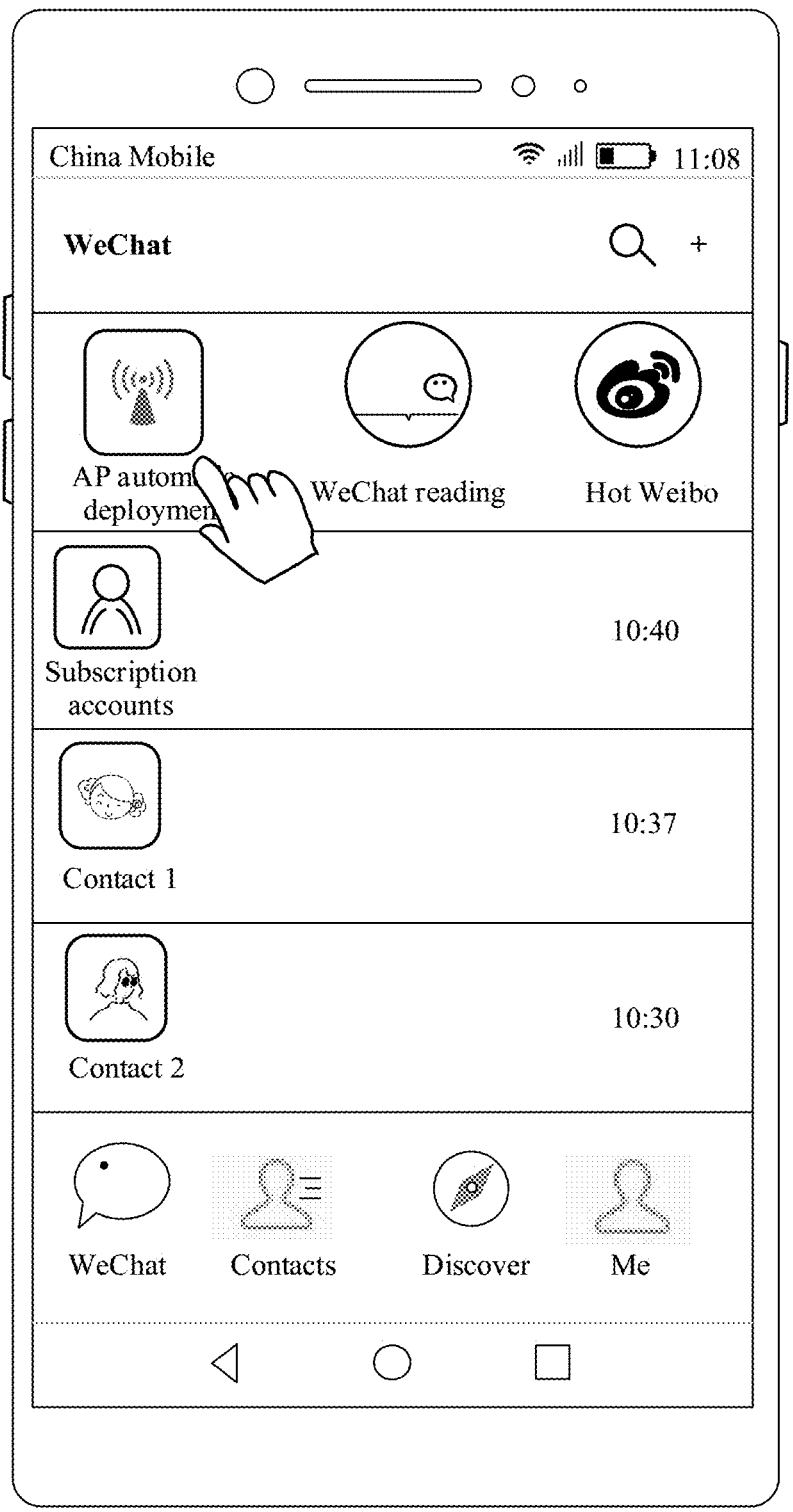
FIG. 8(a) to FIG. 8(c) are a schematic diagram of another AP deployment interface in a wireless access point deployment method according to an embodiment of this application.
Figure 8B:
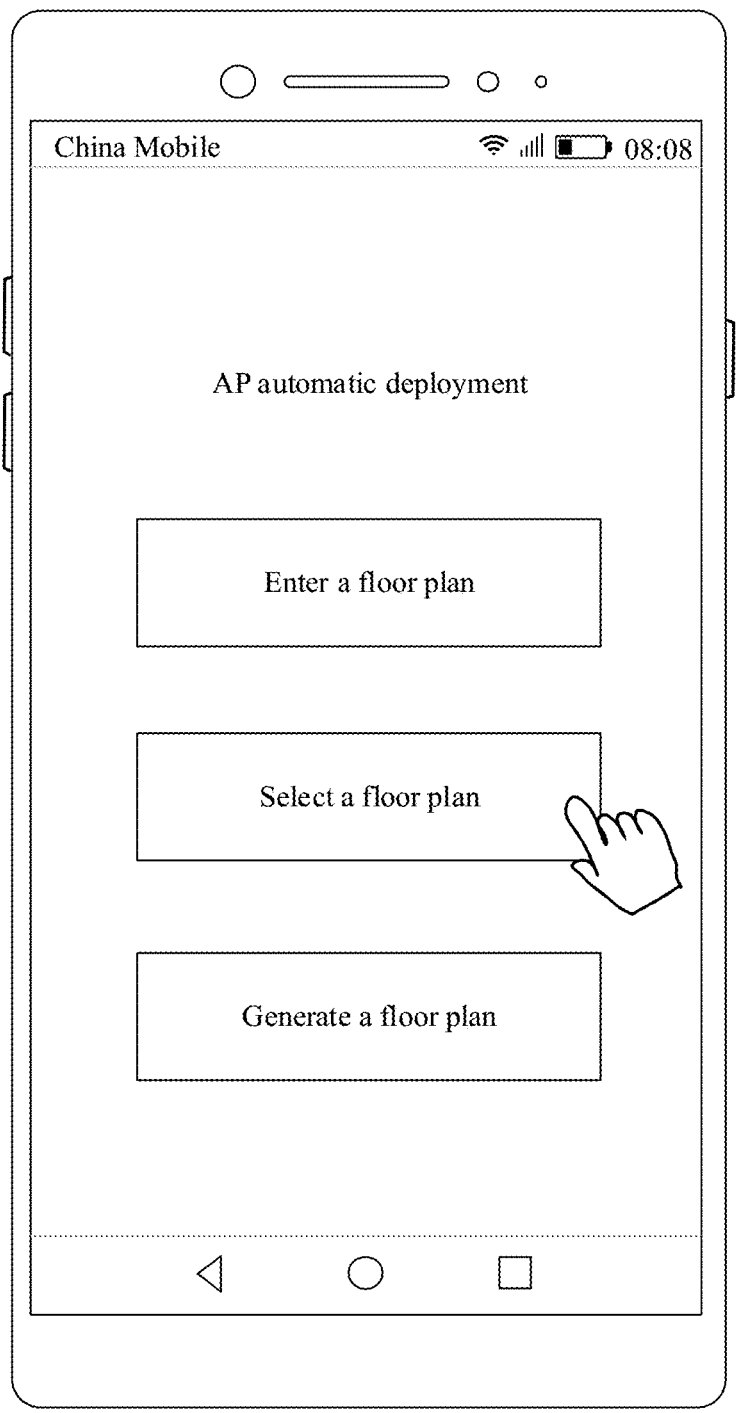
Figure 8C:
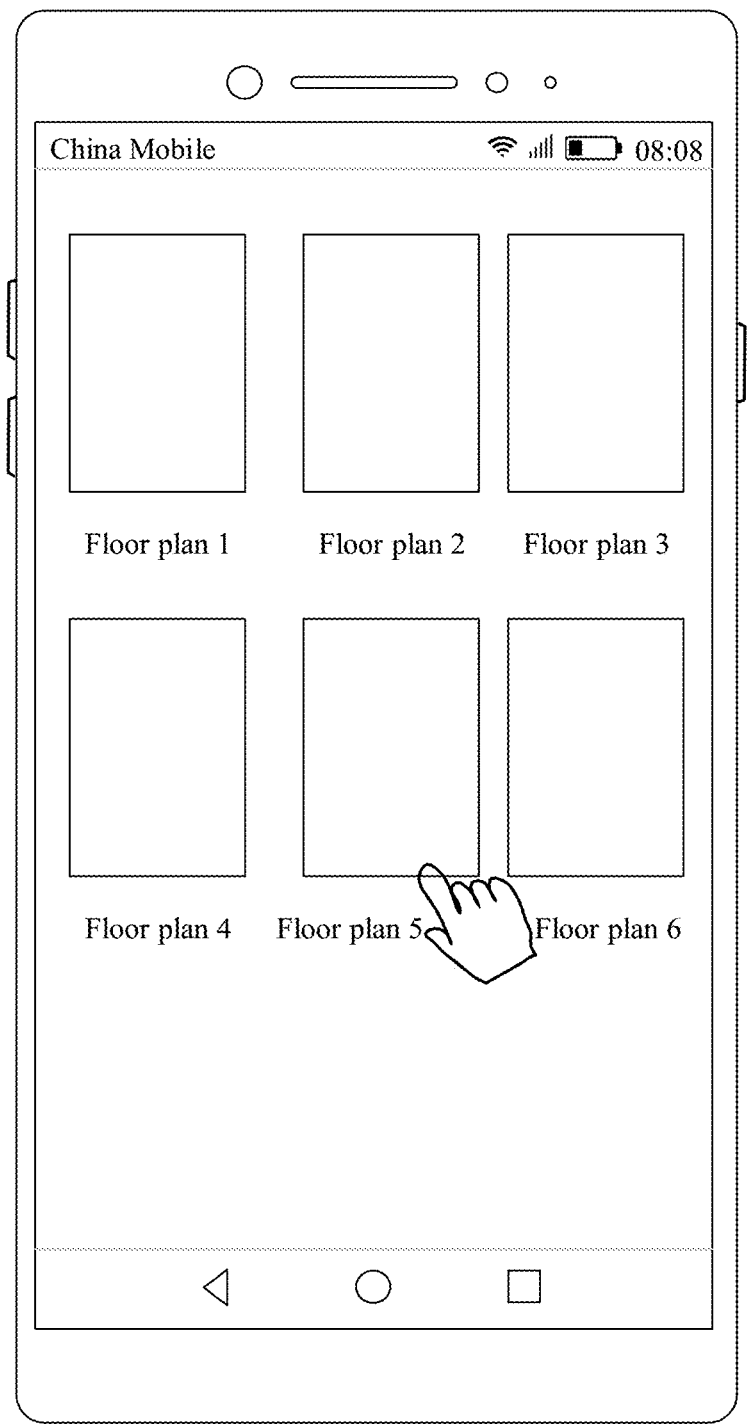

In another example, the terminal device may provide templates of a plurality of floor plans for selection by the deployment personnel. In other words, the at least one prestored floor plan displayed by the terminal device is the template of the prestored floor plan of the terminal device. The template may be pre-generated and stored by an AP deployment application or an AP deployment applet. In addition, one of the floor plan maps is selected as the first floor plan based on the received third operation. In this case, an interface displayed by the terminal device is shown in FIG. 8(a) to FIG. 8(c). FIG. 8(a) to FIG. 8(c) are another example diagram of an AP deployment interface. In this example, the first operation is a touch operation for an icon of a deployment applet shown in FIG. 8(a). In this case, after the touch operation for the icon of the deployment applet is received, a floor plan determining interface shown in FIG. 8(b) may be displayed. FIG. 8(b) includes three options: "Enter a floor plan", "Select a floor plan", and "Generate a floor plan".

In this example, after the deployment personnel touch the option "Select a floor plan", the terminal device may display an interface shown in FIG. 8(c). The interface displays templates of floor plans in a plurality of forms. After receiving a tap operation on a template of one of the floor plans, it is determined that the template is the floor plan of the house in which the AP needs to be deployed currently. For example, in FIG. 8(c), if the deployment personnel tap a floor plan 5, it is determined that the floor plan 5 is the first floor plan of the house in which the AP needs to be deployed currently. Then, the terminal device may further jump to an interface of a subsequent operation, for example, jump to an AP determining interface.

In addition, when the pictures displayed on the interface in FIG. 8(c) does not include the currently required first floor plan, the deployment personnel may also touch a back button on the interface. After receiving the touch operation, the terminal device returns to the interface shown in FIG. 8(b), so that the deployment personnel can select another option.

In this example, the second operation includes the operation of touching the option "Select a floor plan", and the third operation includes the operation of selecting the template of the floor plan on the interface.

In another manner provided in this embodiment of this application, that the terminal device determines a first floor plan based on the second operation includes the following operations:

The terminal device displays a floor plan generation method interface in response to the second operation.

The terminal device receives first data.

The terminal device generates the first floor plan based on the first data.

The floor plan generation method interface includes at least one floor plan generation method for selection by the deployment personnel. After the deployment personnel select one floor plan generation method thereof, the terminal device obtains the first data based on the method, and generates the first floor plan by using the first data. The floor plan generation method may be a sound wave detection method, or the first floor plan may be generated by using a sensor, a depth camera, or the like built in the terminal device. This is not limited in this embodiment of this application.

In addition, the first data includes depth data between a target object and the terminal device. The target object includes a wall of a house in which an AP is recommended to be deployed currently. In this case, the terminal device generates the first floor plan based on a depth between the terminal device and each wall. When the floor plan generation method selected by the deployment personnel is the sound wave detection method, the depth data may be obtained through sound wave detection. When the sensor built in the terminal device is selected to generate a floor plan, the first data is obtained by using the sensor. When the depth camera built in the terminal device is selected to generate a floor plan, the first data is obtained by using the depth camera.

Figure 9A:
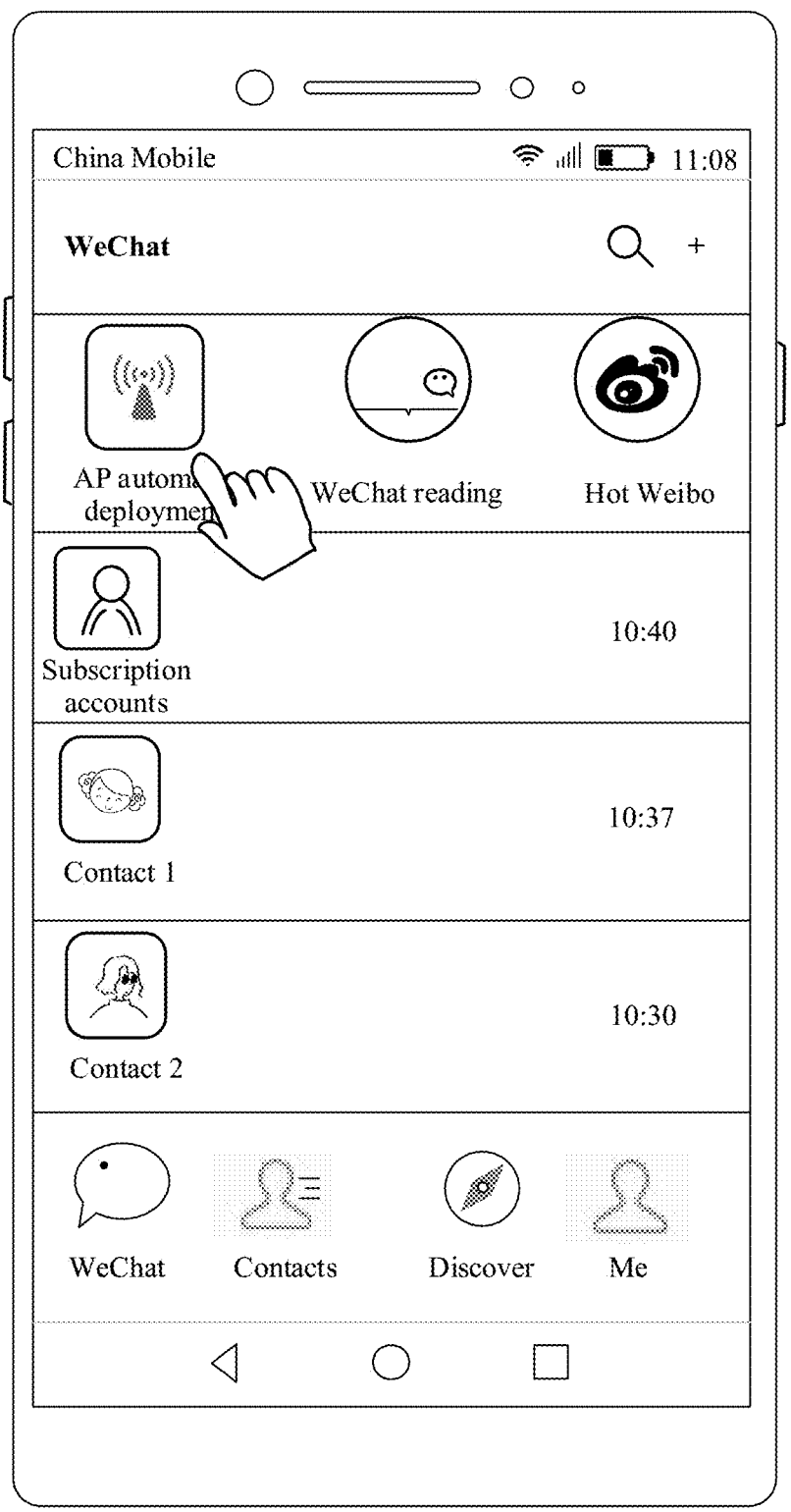
FIG. 9(a) to FIG. 9(c) are a schematic diagram of another AP deployment interface in a wireless access point deployment method according to an embodiment of this application.
Figure 9B:
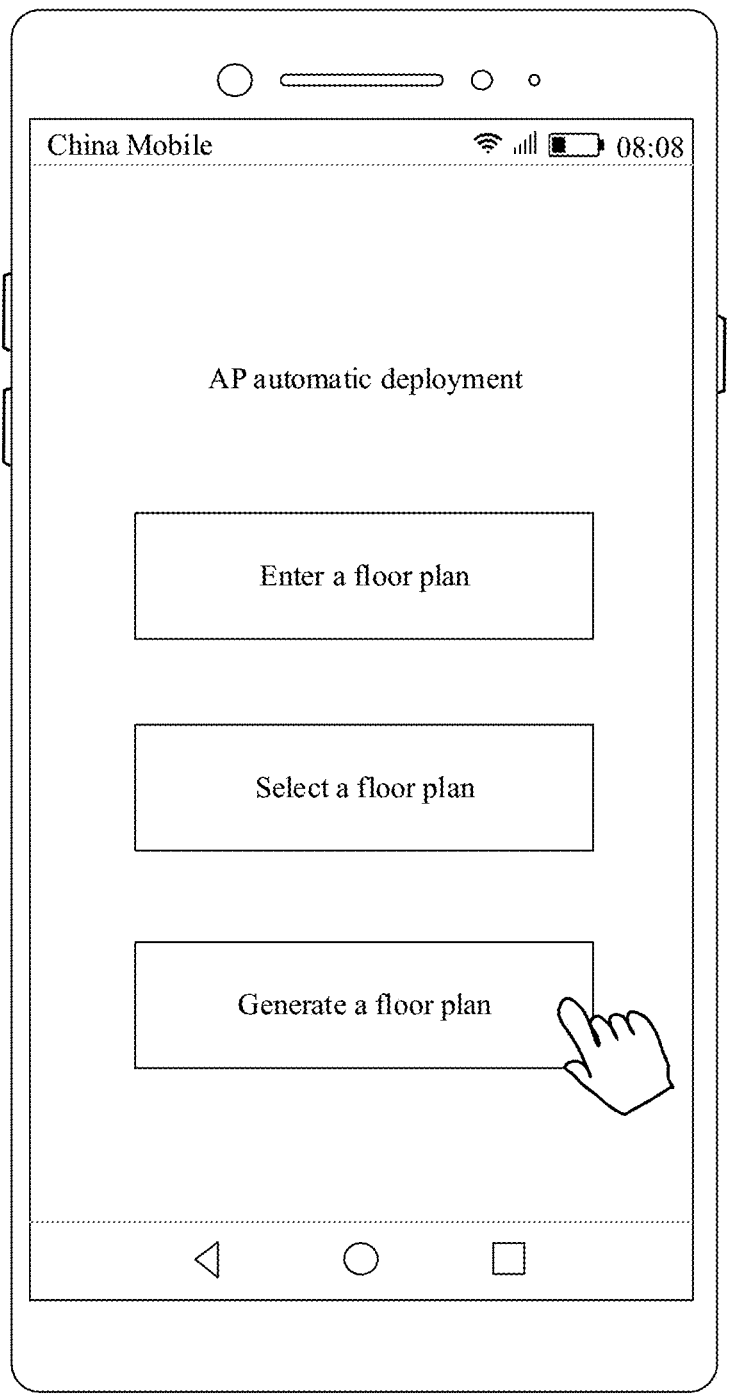
Figure 9C:
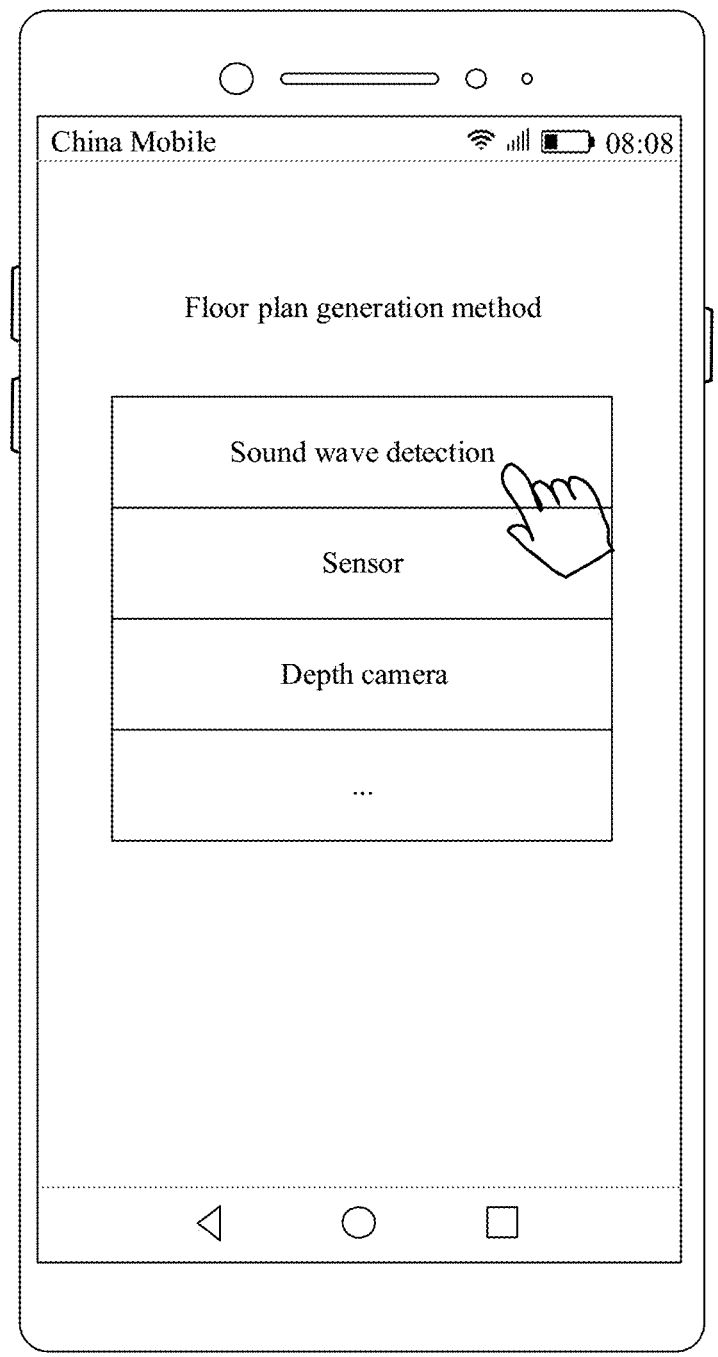

For example, when the first floor plan is generated based on the first data, refer to a schematic diagram of an interface displayed by the terminal device shown in FIG. 9(a) to FIG. 9(c). In this example, the first operation is a touch operation for an icon of a deployment applet shown in FIG. 9(a), and then the terminal device displays a floor plan determining interface shown in FIG. 9(b).

In this example, the deployment personnel may tap the option "Generate a floor plan". In this case, the terminal device may display an interface shown in FIG. 9(c). The interface displays a plurality of floor plan generation methods for selection by the deployment personnel. The deployment personnel may select one of the floor plan generation methods. After receiving the selection operation for the floor plan generation method by the deployment personnel, the terminal device generates the floor plan by using the method. For example, on the interface shown in FIG. 9(c), the deployment personnel tap the option "Sound wave detection". In this case, after receiving the tap operation, the terminal device generates the first floor plan by using the sound wave detection method. Then, the terminal device may further jump to an interface of a subsequent operation, for example, jump to an AP determining interface. In addition, when the interface shown in FIG. 9(c) does not include a floor plan generation method that the deployment personnel want to use, the deployment personnel may also touch a back button. After receiving the touch operation, the terminal device returns to the interface shown in FIG. 9(b), so that the deployment personnel can select another option. Alternatively, when the terminal device generates a floor plan by using a default floor plan generation method, after receiving a touch operation for the option "Generate a floor plan", the terminal device generates the first floor map according to the default floor plan generation method, and does not jump to the interface shown in FIG. 9(c).

In this example, the second operation includes the operation of touching the option "Generate a floor plan" and the operation of selecting the floor plan generation method.

Based on the foregoing various interfaces and the received operations, the terminal device may determine the first floor plan of the house in which the AP is recommended to be deployed, to determine, by using the first floor plan, an appropriate quantity of APs recommended to be deployed and appropriate locations of the APs recommended to be deployed.

Operation S14: The terminal device determines an AP type recommended to be deployed currently.

In this embodiment of this application, the AP type recommended to be deployed currently needs to be determined, to determine performance of the AP based on the AP type, and determine a corresponding deployment solution based on the performance of the AP. For example, the terminal device may prestore related parameters corresponding to various types of APs, or the terminal device may determine, by accessing a server, related parameters corresponding to various types of APs, and may determine performance of the APs by using the related parameters.

In an actual AP deployment process, the deployment personnel often have different requirements. For example, in some scenarios, the deployment personnel have not purchased an AP, that is, a to-be-deployed AP type is not determined. In this case, the terminal device may provide various AP models for the deployment personnel to select. Alternatively, the terminal device may provide one or more recommended AP models, and determine a corresponding deployment solution based on a recommended AP type. Alternatively, the deployment personnel have purchased an AP, that is, an AP type recommended to be deployed is determined. In this case, a quantity of APs recommended to be deployed currently and locations of the APs need to be determined based on the determined AP type.

In this embodiment of this application, the AP type recommended to be deployed currently may be determined in a plurality of manners. In one manner, that the terminal device determines an AP type recommended to be deployed currently includes the following operations:

The terminal device displays an AP determining interface.

The terminal device receives a fourth operation for the AP determining interface, and determines the AP type by using the fourth operation.

The fourth operation is used to indicate an AP type selected by the deployment personnel. For example, the AP determining interface displayed by the terminal device may display at least one AP type, and the deployment personnel select one AP type by using the fourth operation. In this case, the terminal device determines that the AP type selected by the deployment personnel is the AP type recommended to be deployed currently. Alternatively, the AP determining interface displayed by the terminal device may include an input box, and the deployment personnel enter an AP type into the input box by using the fourth operation. After receiving the input AP type, the terminal device determines that the input AP type is the AP type recommended to be deployed currently.

Certainly, the fourth operation may alternatively be an operation in another form. This is not limited in this embodiment of this application.

To clarify a process of determining an AP type by using the fourth operation in this embodiment of this application, a corresponding example is disclosed below.

In one embodiment, the terminal device determines, based on an AP model selected by the deployment personnel, an AP type recommended to be deployed currently. For example, in some scenarios, when AP deployment needs to be performed, the deployment personnel have not purchased an AP, and the deployment personnel do not determine an AP type that needs to be deployed currently. The terminal device may display an AP type list, where the AP type list includes a plurality of types of APs, and select one AP type thereof based on the received fourth operation, so that the terminal device can determine the AP type recommended to be deployed currently.

In this example, refer to an example diagram shown in FIG. 10. After determining the floor plan, the terminal device may jump to an AP determining interface shown in FIG. 10(*a*). The interface includes three options: "AP list", "Enter an AP type", and "Provide a recommendation". The deployment personnel may tap the option "AP list". After receiving the tap operation, the terminal device jumps to an interface for displaying an AP type list. The interface for displaying the AP type list may be shown in FIG. 10(*b*). This figure includes a plurality of AP types for selection by the deployment personnel. After receiving a selection operation for an AP type by the deployment personnel, the terminal device determines that the AP type is the AP type recommended to be deployed currently, and then may further jump to an interface of a subsequent operation. For example, when the terminal device displays the list shown in FIG. 10(*b*), the deployment personnel tap the type "AP5030DN". After receiving the tap operation, the terminal device determines that an AP of the type AP5030DN is the AP type recommended to be deployed currently.

In this example, the fourth operation may include the operation of selecting the option "AP list", and the operation of selecting the plurality of AP types displayed on the terminal device.

In addition, in an actual deployment process, in some scenarios, the deployment personnel have determined the AP type that needs to be deployed currently. For example, if the deployment personnel have purchased an AP and want to deploy the purchased AP, the AP type recommended to be deployed currently is an AP type of the AP that has been purchased by deployment personnel. To meet this requirement, this application discloses another example. In this example, the terminal device may receive an AP model entered by the deployment personnel, to determine, based on the input of the deployment personnel, an AP model to be deployed currently.

Figure 11A:
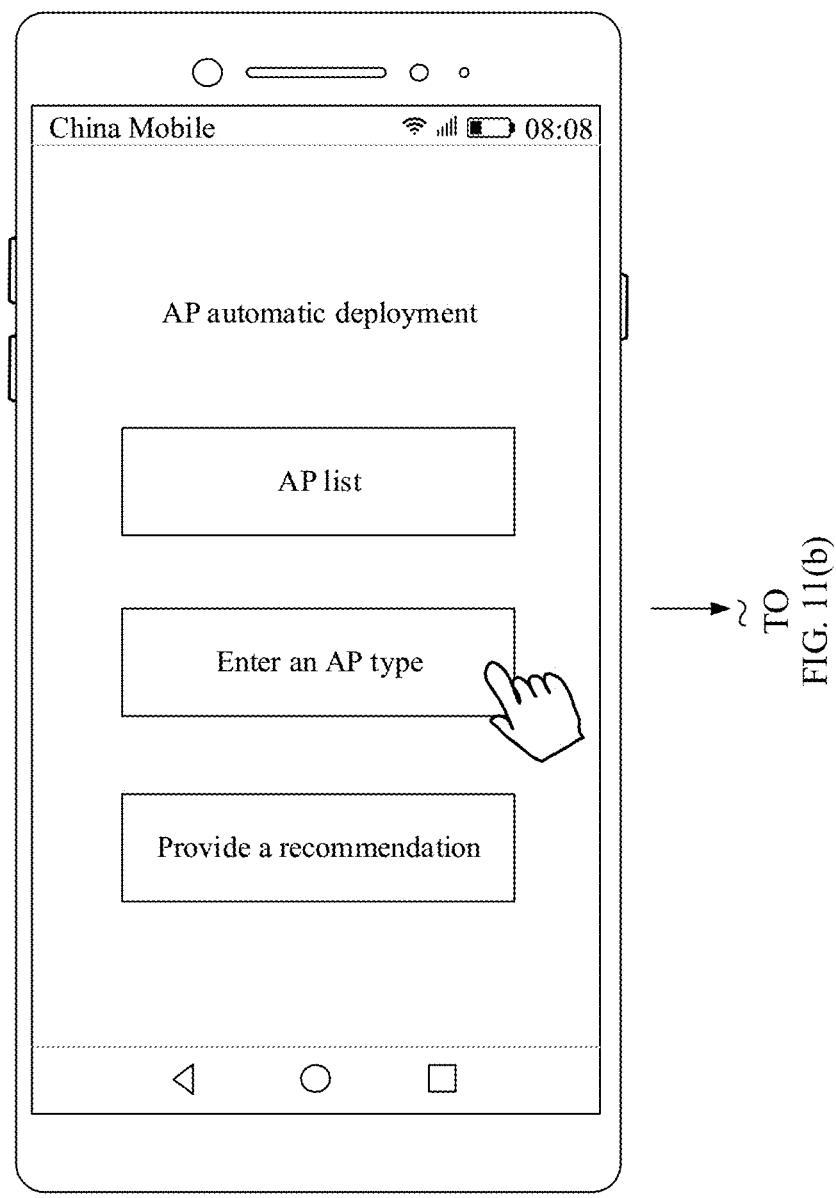
FIG. 11(a) to FIG. 11(c) are a schematic diagram of another AP deployment interface in a wireless access point deployment method according to an embodiment of this application.
Figure 11B:
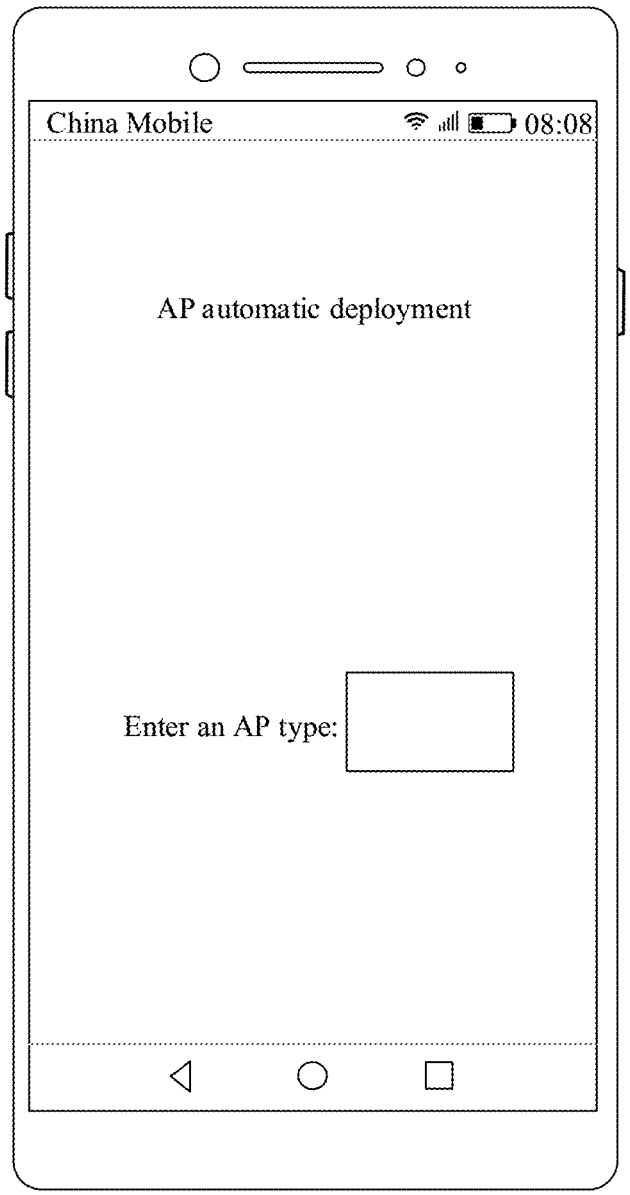
Figure 11C:
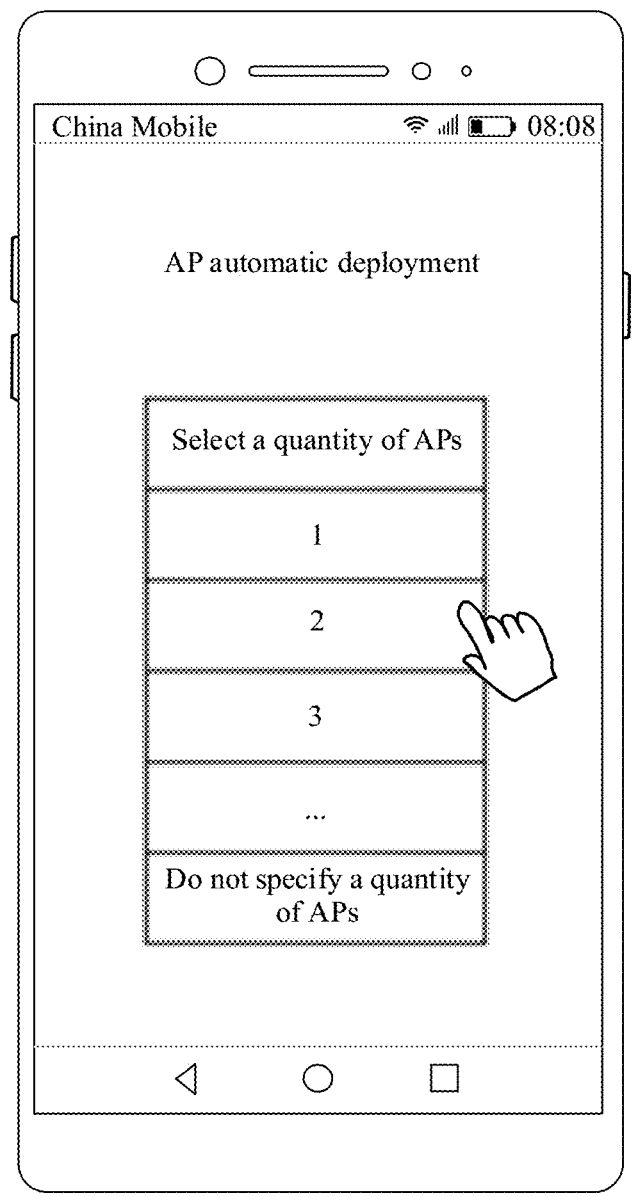

In this example, refer to another example diagram shown in FIG. 11(*a*) to FIG. 11(*c*). After determining the floor plan, the terminal device may jump to an AP determining interface shown in FIG. 11(*a*). The interface includes three options: "AP list", "Enter an AP type", and "Provide a recommendation". The deployment personnel may tap the option "Enter an AP type". After receiving the tap operation, the terminal device jumps to an interface for receiving an AP model. The interface may be shown in FIG. 11(*b*). When displaying the interface, the terminal device displays an input box, and may receive an AP type entered by the deployment personnel into the input box.

In this example, the fourth operation may include the operation of selecting the option "Enter an AP type", and the operation of entering the AP type.

Alternatively, when the terminal device supports a photographing function, the terminal device may further photograph an AP prepared by the deployment personnel, obtain a picture including the AP, determine an AP type in the picture through picture recognition, and determine that the AP type in the picture is the AP type recommended to be deployed currently.

In this case, the fourth operation may include obtaining the picture including the AP.

Further, in this example, the terminal device may further receive a quantity of APs. For example, when the deployment personnel purchase a specific quantity of APs, the deployment personnel may enter the quantity of APs. In this case, after receiving an input AP model, the terminal device may display an interface for selecting a quantity of APs. An input box may be set on the interface, so that an input quantity of APs can be received by using the input box. In addition, a plurality of number options may be further set on the interface. When a touch operation for a number option is received, the terminal device determines an input quantity of APs by using the number option corresponding to the touch operation. In addition, the interface for selecting the quantity of APs may further include an option "Do not specify a quantity of APs". When receiving an operation for the option, the terminal device jumps to a next interface. The interface that is displayed by the terminal device and that is used to select the quantity of APs may be shown in FIG. 11(*c*). When receiving a touch operation for a number option, the terminal device determines that the number is a quantity of APs specified by the deployment personnel. For example, in FIG. 11(*c*), the deployment personnel tap and touches a number "2". In this case, the terminal device determines that the specified quantity of APs is 2. In addition, after the terminal device receives a touch operation for a number option, or receives an operation for the option "Do not specify a quantity of APs", the terminal device may further jump to an interface of a subsequent operation.

In this case, in this example, the fourth operation may further include the operation of entering the quantity of APs.

Alternatively, when the terminal device supports a photographing function, the terminal device may further photograph an AP prepared by the deployment personnel, obtain a picture including the AP, determine a quantity of APs included in the picture through picture recognition, and determine that the quantity of APs in the picture is the quantity of APs recommended to be deployed currently.

In this case, the fourth operation may include obtaining the picture including the AP.

In the foregoing example, a manner in which the terminal device determines the AP type by using the fourth operation is disclosed. The terminal device may further determine, in another manner, the AP type recommended to be deployed currently. In another manner, that the terminal device determines an AP type recommended to be deployed currently includes the following operations:

The terminal device displays an AP determining interface.

The terminal device receives a fifth operation for the AP determining interface.

The terminal device determines the AP type in response to the fifth operation based on the first floor plan.

In some scenarios, the deployment personnel expect the terminal devices to provide a related recommendation for an AP type. For example, when the deployment personnel are not familiar with an AP, the deployment personnel usually expect the terminal device to recommend an appropriate AP type. In this case, the terminal device may determine the AP type based on the first floor plan in the foregoing manner.

When determining the AP type based on the first floor plan, the terminal device may determine, based on a scaling ratio between a house area in the first floor plan and an actual house area, an actual house area corresponding to the first floor plan, and determine, based on a prestored correspondence between an actual house area and an AP type, at least one AP type as the AP type recommended to be deployed currently.

In addition, when the AP type recommended to be deployed currently is determined in the foregoing manner, the deployment personnel may select the option "Provide a recommendation" in the AP determining interface shown in 10(a). After receiving a tap operation for the option, the terminal device may provide one or more recommended AP types. The recommended AP type is the AP type recommended to be deployed currently. Then, the terminal device may further jump to an interface of a subsequent operation.

In this example, the fifth operation includes the operation of selecting the option "Provide a recommendation".

Further, in an embodiment of this application, the AP type recommended to be deployed currently may be determined in another manner. The manner includes the following operation:

The terminal device determines the AP type based on the first floor plan.

In this manner, after obtaining the first floor plan, the terminal device directly determines, based on the first floor plan, the AP type recommended to be deployed currently.

This embodiment of this application separately discloses the method for determining, by the terminal device based on the fourth operation, the AP type recommended to be deployed currently, the method for determining, by the terminal device based on the fifth operation, the AP type recommended to be deployed currently, and the method for determining, by the terminal device based on the first floor plan, the AP type recommended to be deployed currently. When the terminal device determines the AP type based on the fourth operation or the fifth operation, human-machine interaction needs to be performed because the terminal device needs to receive the fourth operation or the fifth operation. Therefore, the determined AP type is usually expected by the deployment personnel. In addition, when the terminal device directly determines, based on the first floor plan, the AP type recommended to be deployed currently, because no human-machine interaction is required, efficiency of determining the AP type can be improved.

To meet different requirements of the deployment personnel for determining the AP type, before determining the AP type recommended to be deployed currently, the terminal device may further receive an adjustment operation. The adjustment operation is used to adjust a method for determining the AP type. For example, when the adjustment operation indicates to determine, by using the fifth operation, the AP type recommended to be deployed currently, the terminal device always determines the AP type by using the fifth operation before receiving a next adjustment operation.

Operation S15: The terminal device displays an AP deployment interface based on the first floor plan and the AP type, where the AP deployment interface is used to display a quantity of APs recommended to be deployed and locations of the APs recommended to be deployed.

In an embodiment of this application, the terminal device may determine, based on the first floor plan and the AP type recommended to be deployed currently, the quantity of APs recommended to be deployed and the locations of the APs recommended to be deployed, and display, by using the AP deployment interface, the quantity of APs recommended to be deployed and the locations of the APs recommended to be deployed, so that the deployment personnel can determine the quantity of APs recommended to be deployed currently and the locations of the APs recommended to be deployed currently.

In an embodiment, the AP deployment interface includes a second floor plan, and the second floor plan displays, by using a preset symbol mark, a location at which an AP is recommended to be deployed. A location of the symbol is the location at which the AP is recommended to be deployed, and a quantity of symbols is a quantity of APs recommended to be deployed.

The preset symbol in the second floor plan may be in a plurality of forms. For example, the symbol may generally be in a relatively striking color such as black, red, or green, and may be in a shape such as a triangle, a circle, or a pentagram. This is not limited in this embodiment of this application.

In another embodiment, when the terminal device determines the AP type based on the first floor plan, the AP deployment interface includes a second floor plan, and the second floor plan displays, by using a preset symbol mark, a location at which an AP is recommended to be deployed. The AP deployment interface further includes the AP type determined by the terminal device.

In this case, the deployment personnel can view the deployment interface to determine both the quantity of APs recommended to be deployed currently and the locations of the APs, and the AP type recommended by the terminal device.

In another embodiment, when the terminal device determines, by using the fourth operation, the AP type recommended to be deployed currently, the fourth operation is further used to indicate a quantity of APs, and the quantity of APs indicated by the fourth operation is inconsistent with the quantity of APs recommended to be deployed, the AP deployment interface includes a second floor plan, and the second floor plan displays, by using a preset symbol mark, a location at which an AP is recommended to be deployed. The AP deployment interface further includes prompt information indicating whether the quantity of APs indicated by the fourth operation is appropriate.

For example, when the quantity of APs indicated by the fourth operation is less than the quantity of APs recommended to be deployed currently, the terminal device may generate a prompt indicating that the quantity of APs is insufficient, so that the deployment personnel can prepare more APs.

Further, in an embodiment of this application, after the terminal device displays the AP deployment interface, the method further includes the following operations:

The terminal device receives a sixth operation.

The terminal device generates and displays a wireless fidelity (wireless fidelity, wifi) heatmap in response to the sixth operation.

The wifi heatmap is used to display strengths of wireless signals in different areas in the house in which the AP needs to be deployed currently according to the recommendation of the terminal device. In an embodiment, the wifi heatmap may include a third floor plan, and strengths of wireless signals in all areas in the third floor plan are displayed in a special highlight form. Colors of areas with different strengths of wireless signals are different.

In an embodiment, the AP deployment interface may include a virtual button "Display a wifi heatmap". When the deployment personnel need to view the wifi heatmap, the deployment person may touch the virtual button. In this case, the sixth operation includes a touch operation for the virtual button "Display a wifi heatmap".

Alternatively, when the terminal device supports voice input, the deployment personnel may send a voice. The voice includes related information of "Display a wifi heatmap". After receiving the voice, the terminal device performs voice recognition, and then displays a corresponding wifi heatmap. In this case, the sixth operation includes a voice sending operation, and the sent voice includes related information of "Display a wifi heatmap".

Certainly, the sixth operation may alternatively be an operation in another form. This is not limited in this embodiment of this application.

Further, in another embodiment, each time after displaying the AP deployment interface, the terminal device may further wait for preset duration, and display the wifi heatmap after the preset duration.

To further clarify a form of the AP deployment interface, a plurality of examples are disclosed below.

Figure 12A:
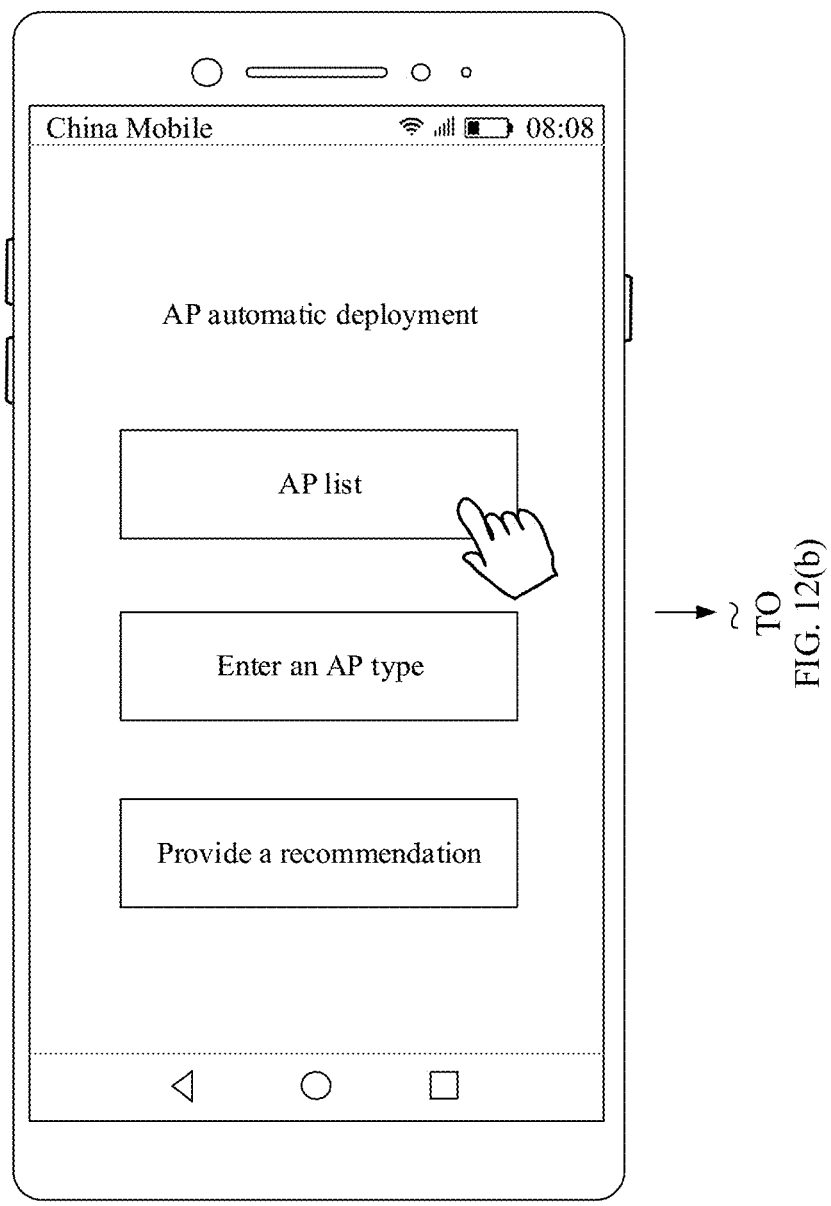
FIG. 12(a) to FIG. 12(d) are a schematic diagram of another AP deployment interface in a wireless access point deployment method according to an embodiment of this application.
Figure 12B:
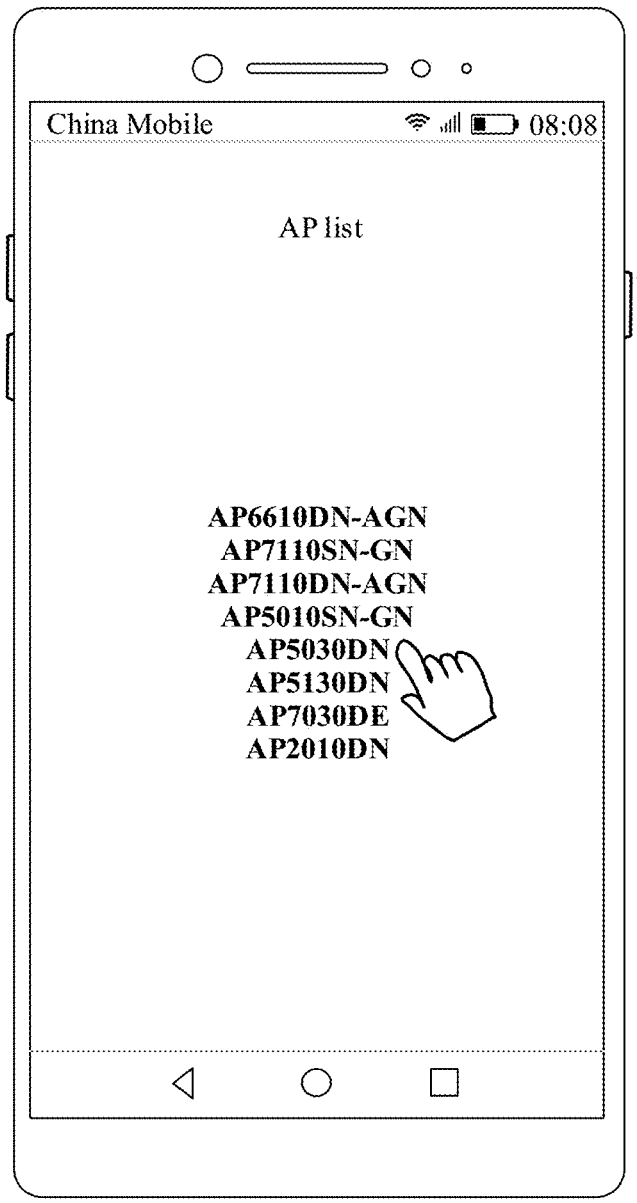
Figure 12C:
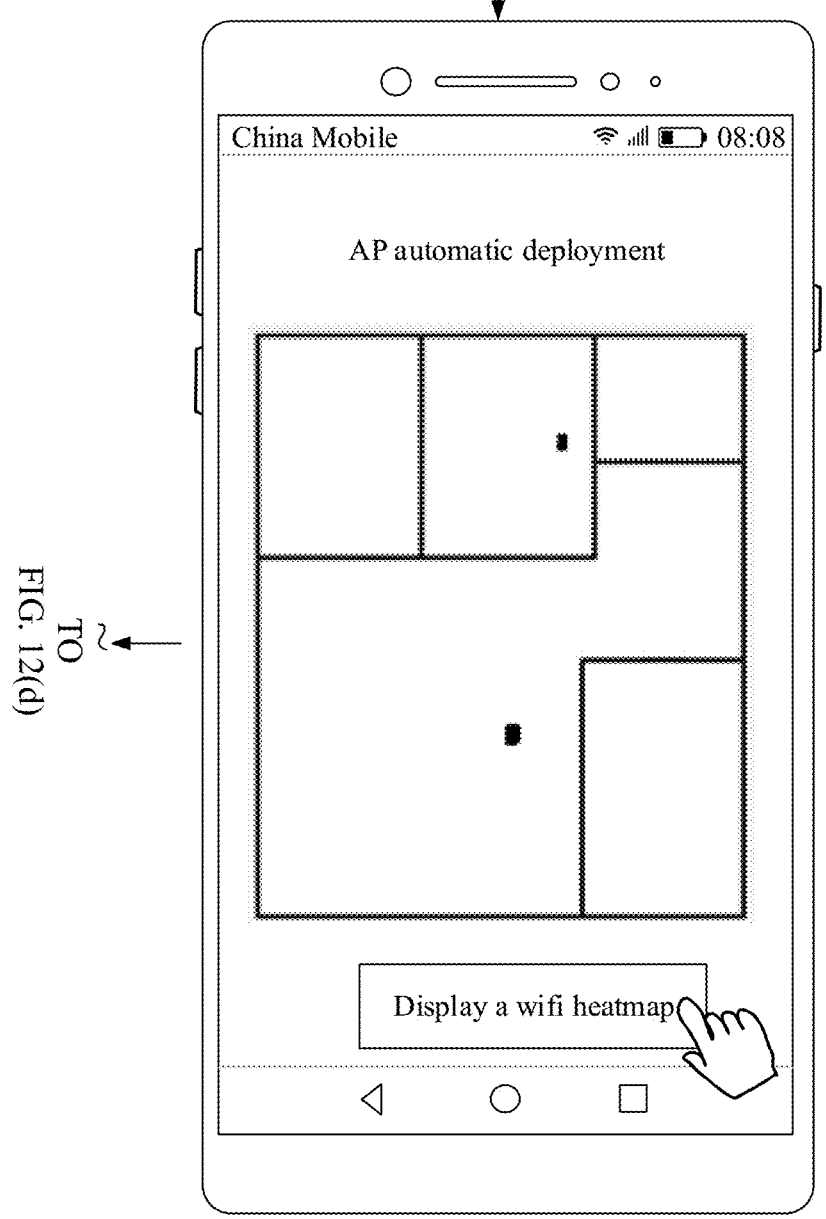
Figure 12D:
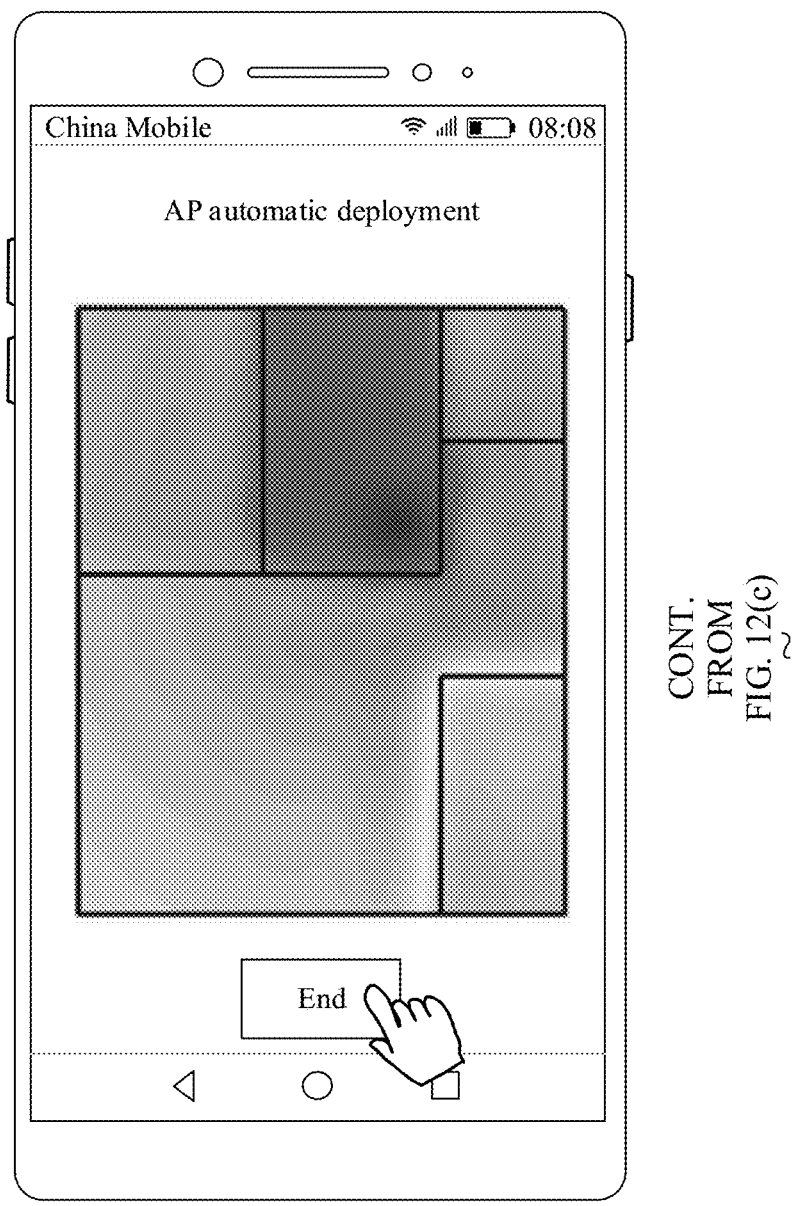

In an example, a preset symbol in the AP deployment interface is a black dot. Refer to FIG. 12(a) to FIG. 12(d). When the terminal device displays an AP determining interface, as shown in FIG. 12(a), the deployment personnel tap an option "AP list" on the interface, and after the terminal device displays an AP type list shown in FIG. 12(b), the deployment personnel select one AP type thereof. In this case, an interface of an AP deployment solution displayed by the terminal device is shown in FIG. 12(c). The interface displays a second floor plan. In the second floor plan, an AP recommended to be deployed currently is marked by using a black dot. A location marked with a black dot is the location at which the AP is recommended to be deployed currently, and a quantity of black dots marked in the second floor plan is the quantity of APs recommended to be deployed currently. In this case, if the interface shown in FIG. 12(c) includes two black dots, it indicates that two APs are recommended to be deployed currently, and the two APs are recommended to be deployed at locations marked with the black dots.

Further, on an interface for displaying the AP deployment solution, an option "Display a wifi heatmap" may be further set. After receiving a touch operation for the option, the terminal device jumps to a display interface of the wifi heatmap, to display the wifi heatmap.

In this case, the schematic diagram of the interface shown in FIG. 12(c) includes the option "Display a wifi heatmap". When the deployment personnel need to view the wifi heatmap, the deployment personnel may tap the option "Display a wifi heatmap". After receiving the touch operation for the option, the terminal device may jump to an interface shown in FIG. 12(d), and display the wifi heatmap by using the interface.

Further, the interface for displaying the wifi heatmap may further include an option "End". When the deployment personnel already know the quantity of APs recommended to be deployed currently and the locations of the APs, and need to end the current AP deployment operation, the deployment personnel may tap the operation "End". After receiving the tap operation, the terminal device ends the current AP deployment, and jumps to an interface before AP deployment starts. For example, when AP deployment is started by touching an icon of a deployment app on a home screen of the terminal device, after receiving the touch operation for the option "End", the terminal device usually jumps to the home screen on which an icon of each app is displayed. When AP deployment is started by touching a deployment applet of WeChat, after receiving the touch operation for the option "End", the terminal device jumps to an interface of WeChat.

Figure 13A:
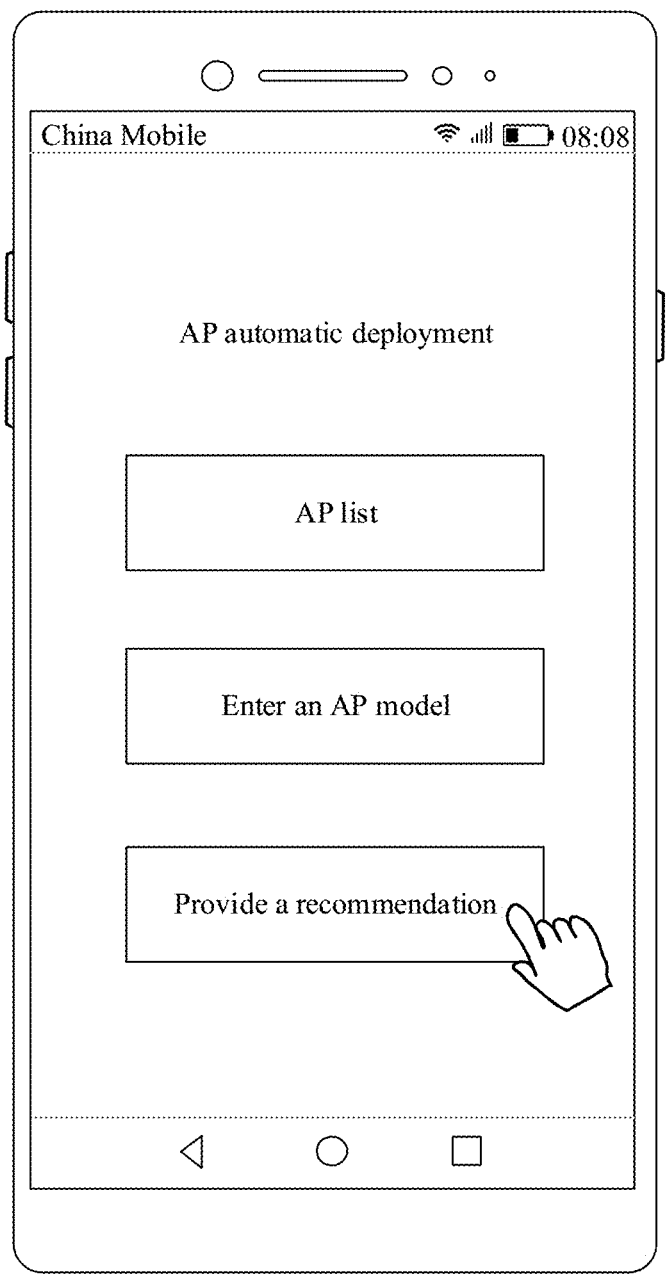
FIG. 13(a) to FIG. 13(c) are a schematic diagram of another AP deployment interface in a wireless access point deployment method according to an embodiment of this application.
Figure 13B:
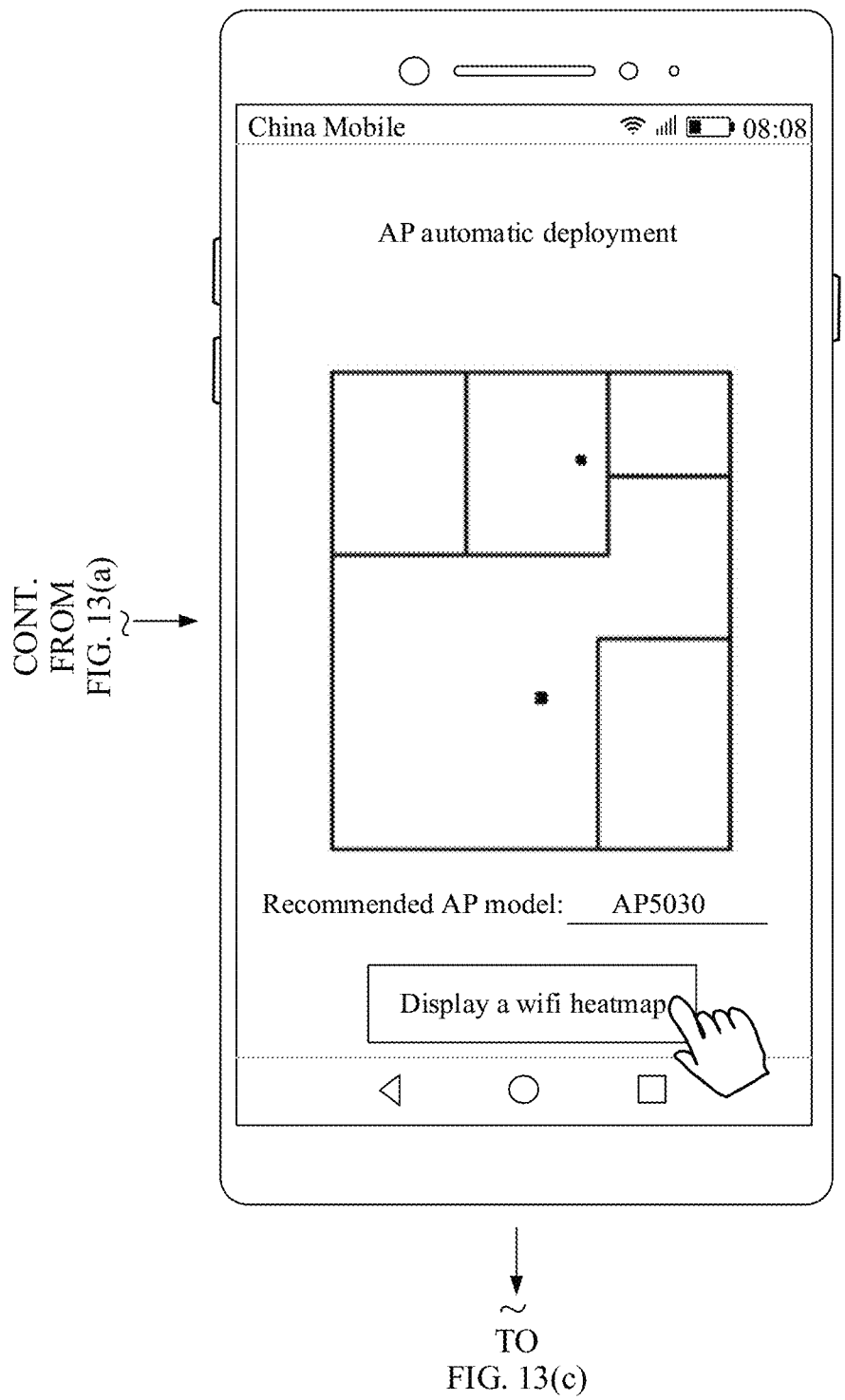

In another example, when the terminal device displays an AP determining interface, as shown in FIG. 13(a), after the deployment personnel tap an option "Provide a recommendation" on the interface, an interface of an AP deployment solution displayed by the terminal device is shown in FIG. 13(b). The interface displays a second floor plan. In the second floor plan, a location of a to-be-deployed AP is marked by using a black dot. The location at which the AP is recommended to be deployed currently may be determined based on a location of the black dot, and it may be determined, based on a quantity of black dots, that two APs are recommended to be deployed currently. In addition, because the terminal device provides a recommendation for an AP type, the AP deployment interface further includes the AP type determined by the terminal device. For example, FIG. 13(b) includes a description of "Recommended AP model: AP5030". The description means that after the tap operation for the option "Provide a recommendation" by the deployment personnel is received, the AP type recommended to be deployed currently by the terminal device is AP5030.

Figure 13C:
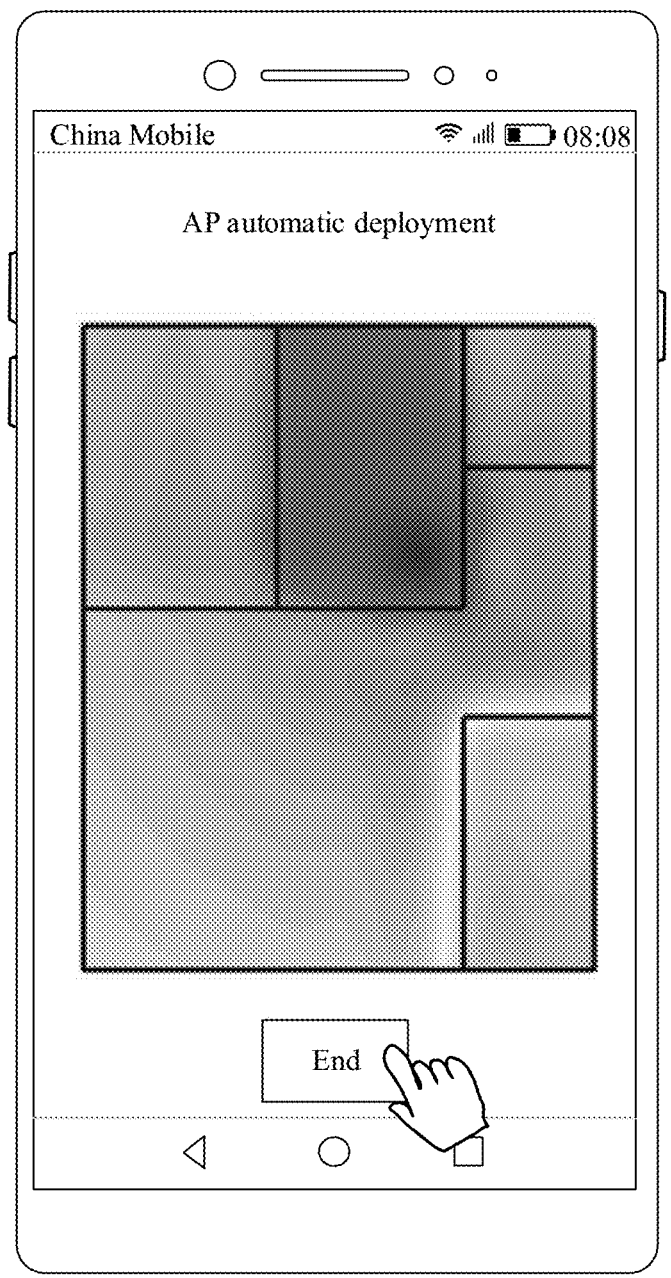

Further, on the interface for displaying the AP deployment solution, an option "Display a wifi heatmap" may be further set. For example, FIG. 13(b) includes an option "Display a wifi heatmap". When the deployment personnel need to view the wifi heatmap, the deployment personnel may tap the option "Display a wifi heatmap". After receiving the touch operation for the option, the terminal device may display an interface shown in FIG. 13(c), and display a corresponding wifi heatmap by using the interface. In addition, the interface for displaying the wifi heatmap may further include an option "End". After receiving a tap operation for the option "End", the terminal device ends the current AP deployment, and jumps to an interface before AP deployment starts.

Alternatively, in another embodiment, when the terminal device displays an AP determining interface, the deployment personnel tap an option "Enter an AP type" on the interface. In this case, an interface of an AP deployment solution displayed by the terminal device may be shown in FIG. 13(c). The interface displays a second floor plan, and an AP is marked by using a black dot in the second floor plan. A location marked with a black dot is the location at which the AP is recommended to be deployed currently, and a quantity of black dots marked in the second floor plan is the quantity of APs recommended to be deployed currently.

Figure 14A:
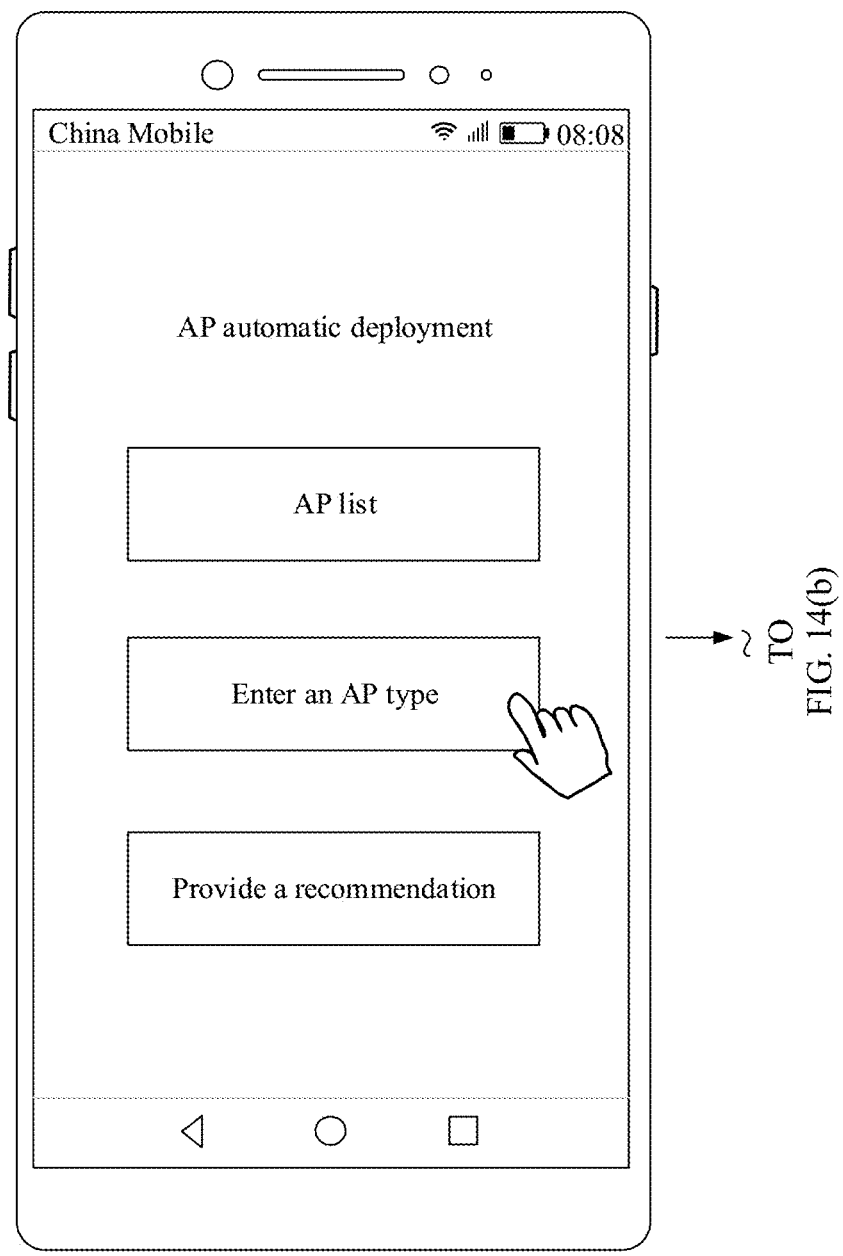
FIG. 14(a) to FIG. 14(f) are a schematic diagram of another AP deployment interface in a wireless access point deployment method according to an embodiment of this application.
Figure 14B:
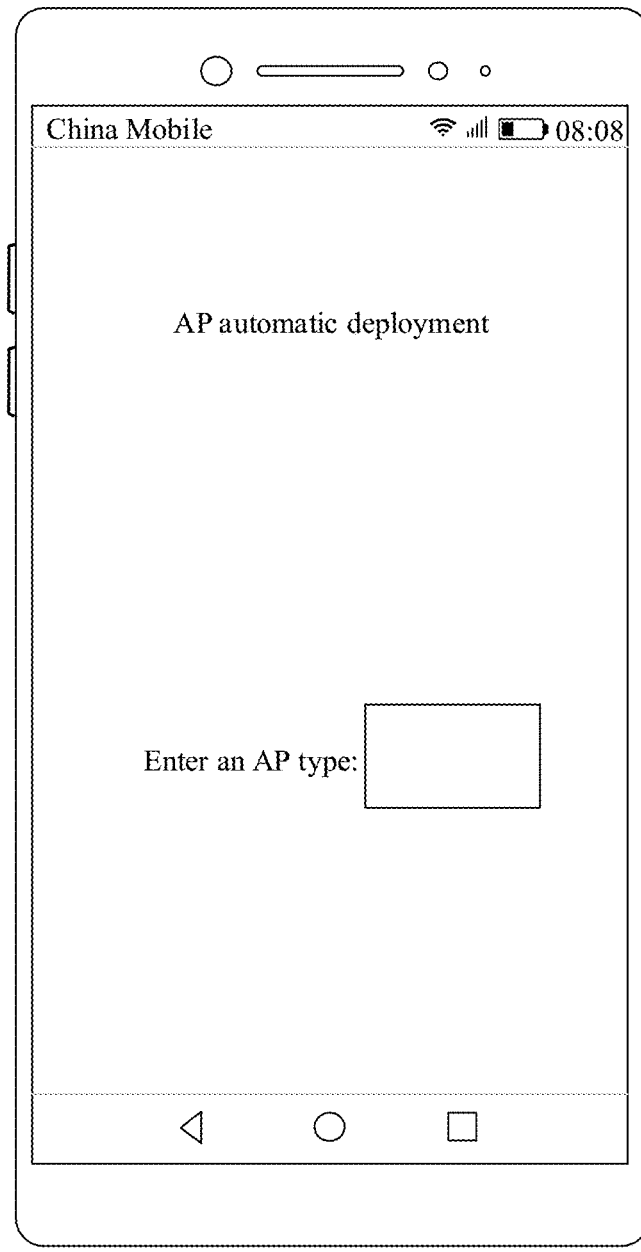
Figure 14C:
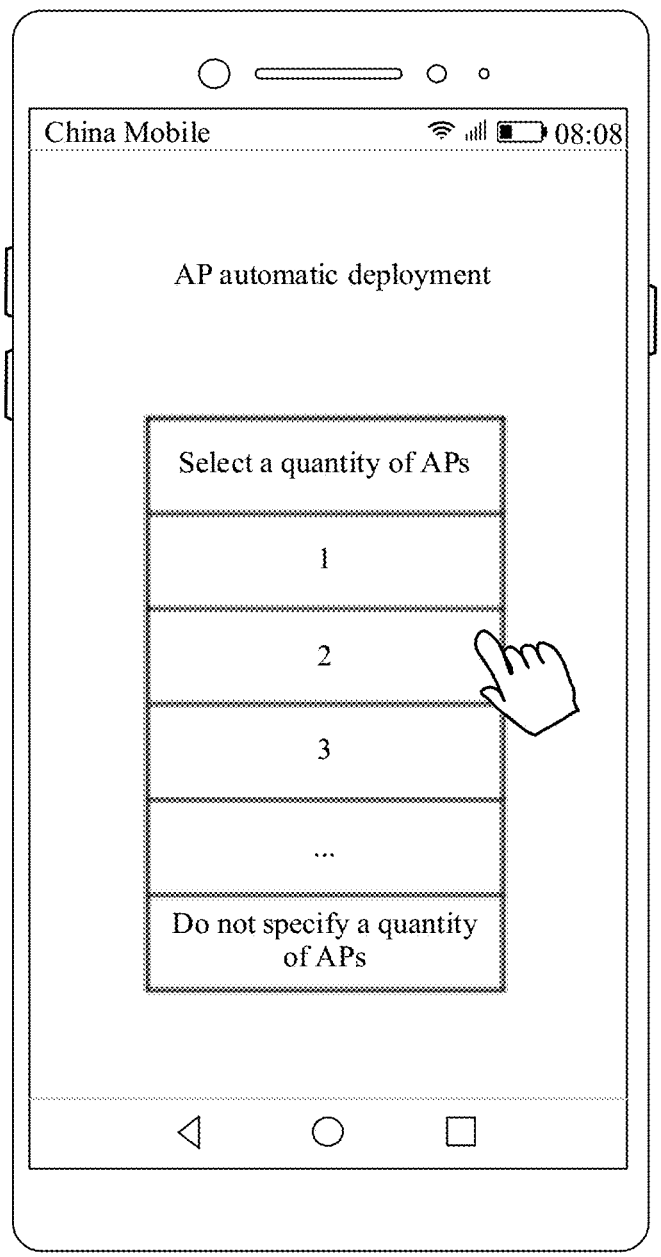

Further, when the terminal device allows the deployment personnel to enter the quantity of APs, the deployment personnel enter both the AP type and the quantity of APs. In this case, refer to a schematic diagram of the example shown in FIG. 14(a) to FIG. 14(f). In this example, when the terminal device displays an AP determining interface, as shown in FIG. 14(a), the deployment personnel tap an option "Enter an AP type" on the interface. After receiving the tap operation for the option "Enter an AP type", the terminal device jumps to an interface shown in FIG. 14(b), and receives an AP model entered by the deployment personnel on the interface. Then, the terminal device jumps to an interface in FIG. 14(c), and receives the quantity of APs entered by the deployment personnel. That is, the deployment personnel specify the AP type and the quantity of APs. In this case, after the quantity of APs recommended to be deployed currently is determined, the terminal device may compare the quantity of APs recommended to be deployed currently with the quantity of APs indicated by the deployment personnel, and generate a corresponding prompt interface based on the quantity.

Figure 14D:
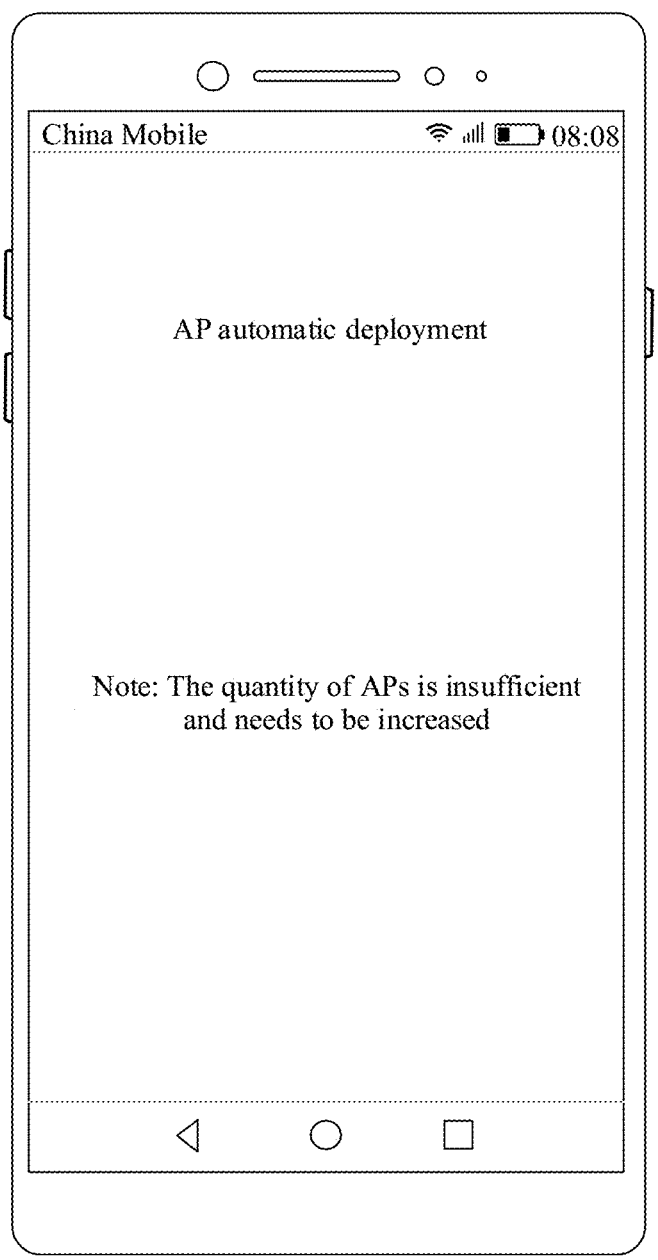
Figure 14E:
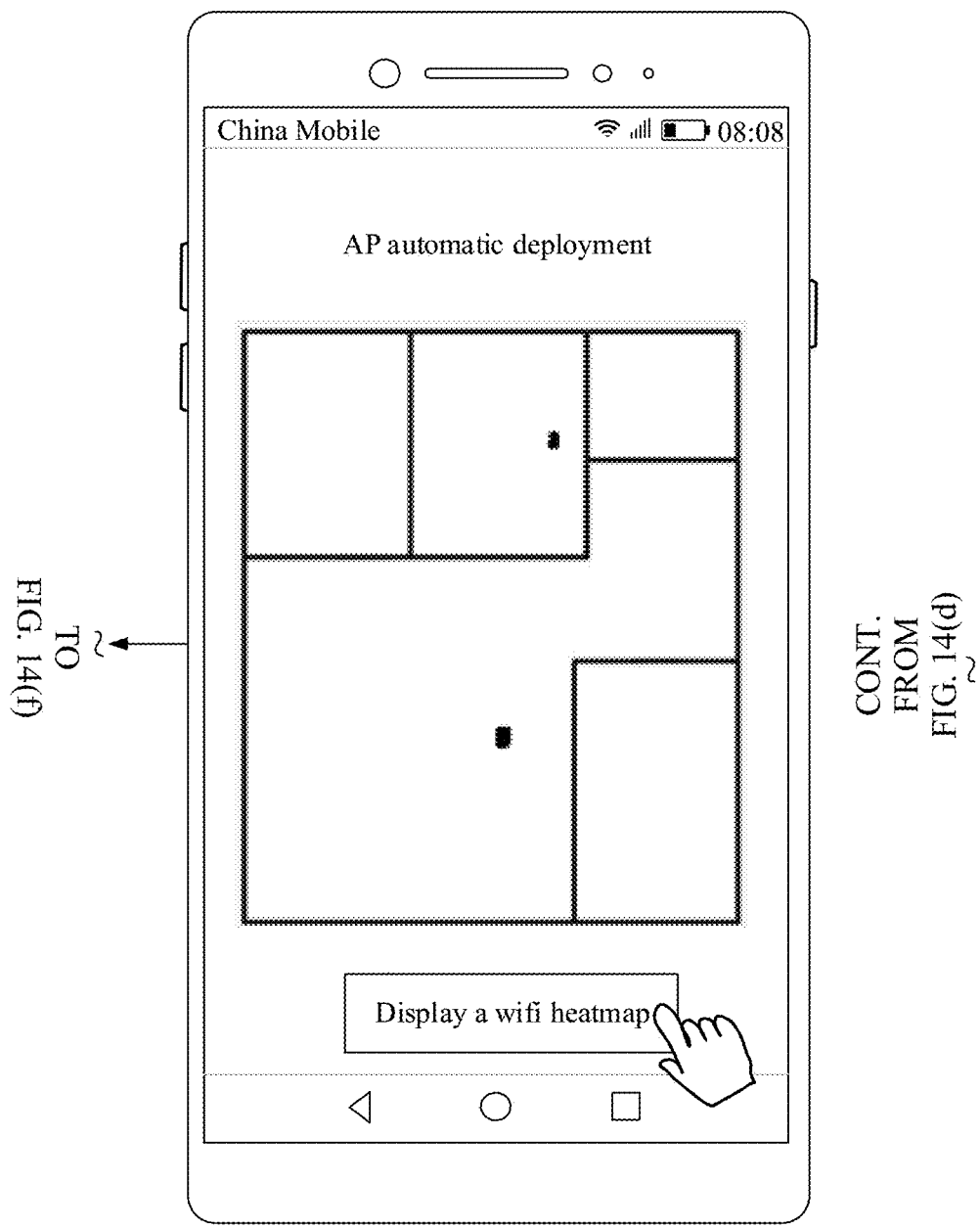
Figure 14F:
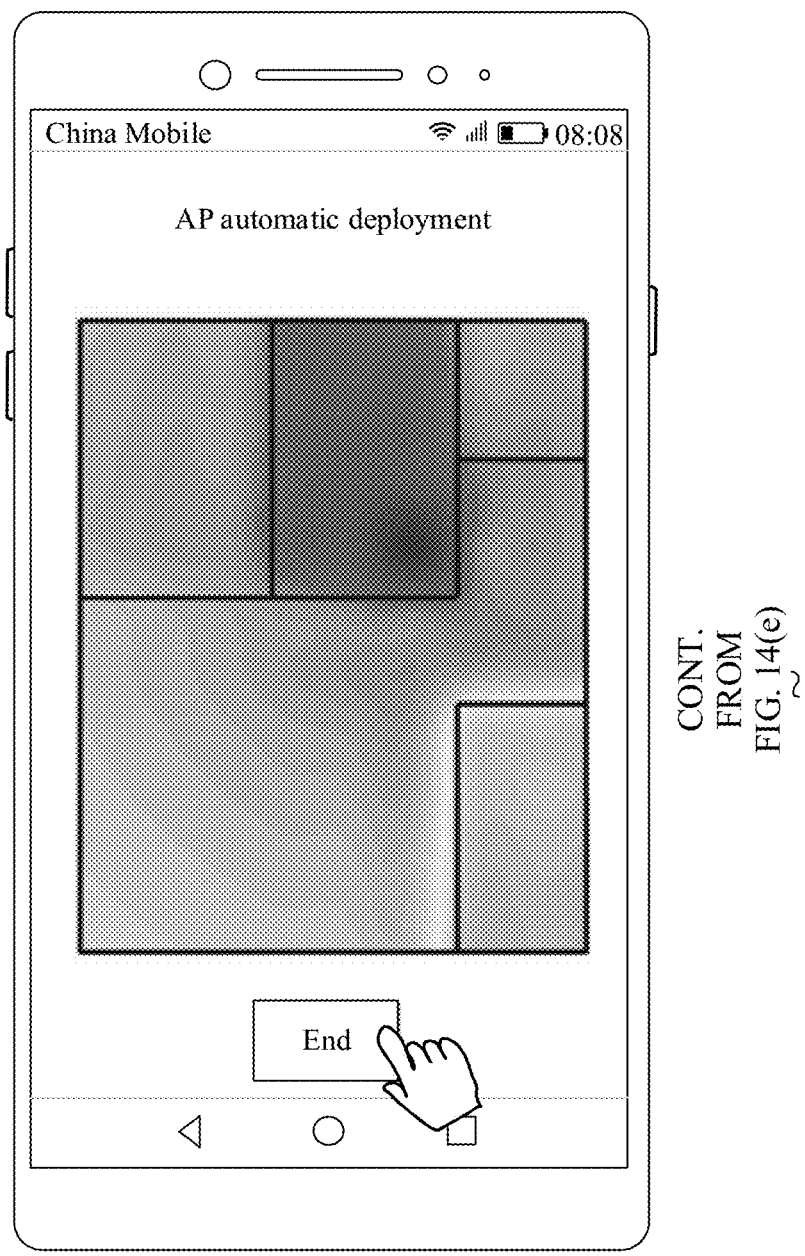

If the quantity of APs specified by the deployment personnel is less than the quantity of APs recommended to be deployed currently, the terminal device displays an interface shown in FIG. 14(d), to prompt that the quantity of APs is insufficient and needs to be increased. In addition, when the quantity of APs specified by the deployment personnel is greater than the quantity of APs recommended to be deployed currently, the terminal device displays another interface, to prompt that the quantity of APs is excessively large and needs to be reduced. When the terminal device displays the prompt interface in FIG. 14(d), if a touch operation for a next operation by the terminal device is received or a time for displaying the prompt interface reaches preset duration, the terminal device may jump to an interface shown in FIG. 14(e). The interface displays a second floor plan. In the second floor plan, a location at which an AP is recommended to be deployed currently is marked by using a black dot, and a quantity of black dots is used to indicate a quantity of APs recommended to be deployed currently. In addition, the interface further includes an option "Display a wifi heatmap". After receiving a touch operation for the option, the terminal device may display an interface shown in FIG. 14(f), and display a corresponding wifi heatmap by using the interface. The interface for displaying the wifi heatmap may further include an option "End". After receiving a tap operation for the option "End", the terminal device ends the current AP deployment, and jumps to an interface before AP deployment starts.

According to an embodiment of this application, the terminal device can display the AP deployment interface. The deployment personnel can determine, by viewing the AP deployment interface, a quantity of APs recommended to be deployed currently and locations of the APs recommended to be deployed currently, to resolve a problem in the conventional technology that it is difficult to determine an appropriate quantity of to-be-deployed APs and locations of the APs.

Figure 15:
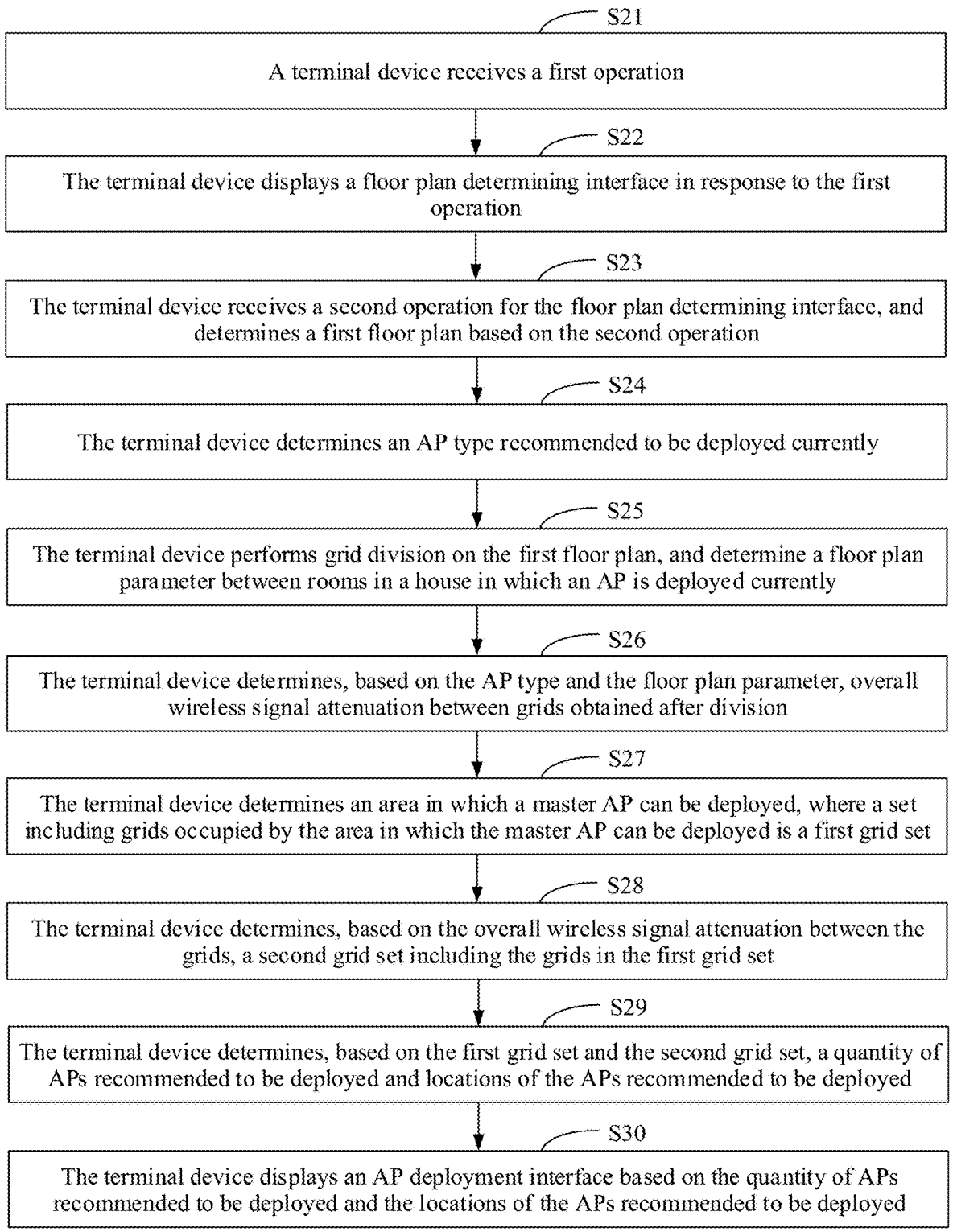
FIG. 15 is a schematic diagram of a working process of another wireless access point deployment method according to an embodiment of this application.

In this embodiment of this application, operation S15 discloses an operation of displaying, by the terminal device, the AP deployment interface based on the first floor plan and the AP type. To clarify operations included in this operation, this application discloses another embodiment. FIG. 15 is a schematic diagram of a working process. A wireless access point deployment method disclosed in this embodiment includes the following operations.

Operation S21: A terminal device receives a first operation, where the first operation is used to start wireless access point AP deployment.

Operation S22: The terminal device displays a floor plan determining interface in response to the first operation.

Operation S23: The terminal device receives a second operation for the floor plan determining interface, and determines a first floor plan based on the second operation.

Operation S24: The terminal device determines an AP type recommended to be deployed currently.

A specific operation process of operation S21 to operation S24 is the same as the specific operation process of operation S11 to operation S14 in the foregoing embodiment, and may be cross-referenced. Details are not described herein again.

Operation S25: The terminal device performs grid division on the first floor plan, and determines, based on a grid division result, a floor plan parameter between rooms in a house in which an AP is deployed currently, where the floor plan parameter includes wall attenuation and connectivity.

In this embodiment of this application, after the first floor plan is obtained, a corresponding floor plan connected graph may be further obtained based on the first floor plan. The floor plan connected graph is used to indicate a connection relationship between rooms in a house in which an AP needs to be deployed currently. After obtaining the first floor plan, the terminal device considers each room in the first floor plan as one unit, and adjacent rooms are connected by using a straight line, to obtain a floor plan connected graph.

Figure 16:
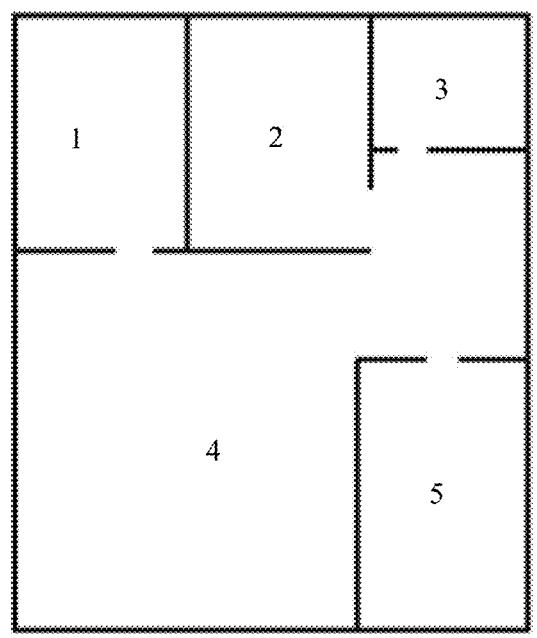
FIG. 16 is a schematic diagram of a floor plan in a wireless access point deployment method according to an embodiment of this application.
Figure 17:
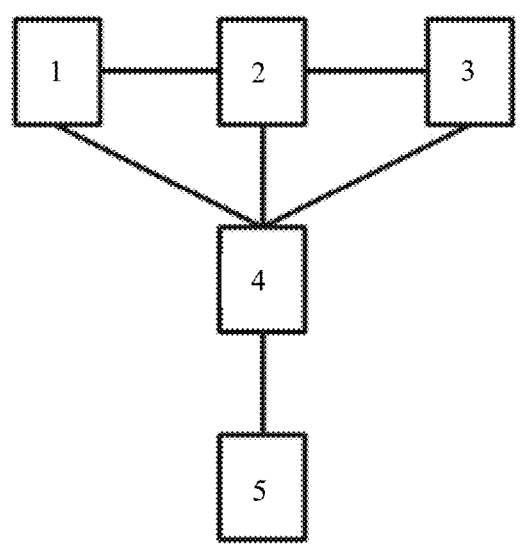
FIG. 17 is a schematic diagram of a floor plan connected graph in a wireless access point deployment method according to an embodiment of this application.

In an example, when the first floor plan is shown in FIG. 16, the floor plan connected graph is shown in FIG. 17. Numbers in FIG. 16 and FIG. 17 are room numbers.

In this embodiment of this application, the floor plan parameter includes wall attenuation and connectivity. Wall attenuation is signal attenuation caused when a wireless signal transmitted by the AP traverses walls between different rooms, and wall attenuation caused when the wireless signal traverses from a room A to a room B may be denoted as $C_{ab}$. In addition, wall attenuation is generally related to a material and a thickness of a wall. In this embodiment of this application, wall attenuation may be determined based on a correspondence between materials and thicknesses of different walls and wall attenuation. Connectivity between the room A and the room B may be denoted as $L_{ab}$. Different values of $L_{ab}$ may be obtained according to a connection relationship between the room A and the room B. The connection relationship includes "completely connected", "completely disconnected", and "partially connected".

In an embodiment, when connectivity between rooms is determined, grid division needs to be performed on the first floor plan, so that each room occupies one or more grids, and sizes of the grids are the same. Then, the connectivity is determined based on a grid division result.

Figure 18:
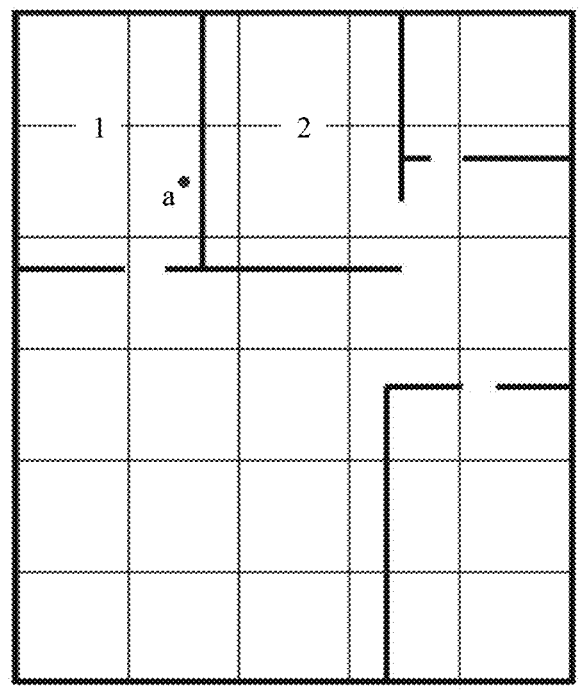
FIG. 18 is a schematic diagram of grid division on a floor plan in a wireless access point deployment method according to an embodiment of this application.

In an example of grid division, the first floor plan is shown in FIG. 16, and a schematic diagram after grid division is performed on the floor plan is shown in FIG. 18.

In this case, a connecting straight line between any grid in the room A and any grid in the room B is determined. When no connecting straight line between grids passes through another room, the connection relationship between the room A and the room B is "completely connected". In this case, the connectivity between the room A and the room B is $L_{ab}=1$. For example, a connection relationship between a room 1 and a room 2 in FIG. 16 is "completely connected".

When a connecting straight line between any grid in the room A and any grid in the room B passes through another room, the connection relationship between the room A and the room B is "completely disconnected". In this case, the connectivity between the room A and the room B is $L_{ab}$=inf. For example, a connection relationship between a room 1 and a room 5 in FIG. 16 is "completely disconnected".

In addition, a connecting straight line between any grid in the room A and any grid in the room B is determined. When a part of the connecting straight line does not pass through another room, the connection relationship between the room A and the room B is "partially connected". In this case, $1 < L_{ab} < 2$. For example, a connection relationship between a room 1 and a room 4 in FIG. 16 is "partially connected".

The connectivity between the room A and the room B follows the following formula:

$$L_{ab} = \frac{\sum_{u=HA_1}^{u=HA_u}\left(\frac{HB_{u1}}{HN_B}*1 + \frac{HB_{u0}}{HN_B}*2\right)}{HN_A}.$$

Based on the foregoing formula, connectivity between any two rooms may be determined. In the foregoing formula, $L_{ab}$ is the connectivity between the room A and the room B, HA is a grid set including all grids in the room A, $HA_u$ is a $u^{th}$ grid in the grid set, $HN_A$ is a quantity of grids in the room A, $HN_B$ is a quantity of grids in the room B, $HB_{u1}$ is a quantity of grids that can be connected between the room B and the room A, and $HB_{u0}$ is a quantity of grids that cannot be connected between the room B and the room A.

In addition, when connectivity between two rooms is determined by using the foregoing formula, quantities of grids included in the two rooms need to be determined separately (that is, $HN_A$ and $HN_B$). In this embodiment of this application, when a quantity of grids included in a room is determined, a room in which a center point of one grid is located is usually used as a room to which the grid belongs, and a quantity of grids included in the room is calculated based on the quantity. For example, if one grid is located in both a first room and a second room, but a center point of the grid is in the first room, it is determined that the grid belongs to the first room, and when a quantity of grids included in the first room is calculated, the grid is included in the first room. However, when a quantity of grids included in the second room is calculated, the grid needs to be ignored.

For example, in FIG. 18, a part of a grid is located in a room 1, and the other part is located in a room 2, but a center point a of the grid is located in the room 1. Therefore, when a quantity of grids included in the room 1 is calculated, it is determined that the grid is a grid belonging to the room 1.

Alternatively, in an embodiment of this application, when a quantity of grids included in a room is determined, if one grid is located in different rooms at the same time, areas of the different rooms in which the grid is located may be further obtained, a room with a largest area is used as a room to which the grid belongs, and a quantity of grids included in the room is calculated.

Certainly, a quantity of grids included in each room may alternatively be calculated in another manner. This is not limited in this embodiment of this application.

In addition, the terminal device further needs to obtain an area of each room, and the area of each room may be determined based on a scaling ratio of an area of a floor plan to an actual area of a house and an area of the floor plan.

In an example, when the first floor plan is shown in FIG. 16, and the floor plan connected graph is shown in FIG. 17, a floor plan parameter and an area of each room in this example may be shown in the following table:

| Room | Area | Spacing attenuation | Connectivity |
|------|------|---------------------|--------------|
| 1 | $S_1$ | $C_{12}$ | $L_{12} = 1$ |
|   |   | $C_{14}$ | $1 < L_{14} < 2$ |
| 2 | $S_2$ | $C_{12}$ | $L_{12} = 1$ |
|   |   | $C_{23}$ | $1 < L_{23} < 2$ |
|   |   | $C_{24}$ | $1 < L_{24} < 2$ |
| 3 | $S_3$ | $C_{23}$ | $1 < L_{23} < 2$ |
|   |   | $C_{34}$ | $1 < L_{34} < 2$ |
| 4 | $S_4$ | $C_{14}$ | $1 < L_{14} < 2$ |
|   |   | $C_{24}$ | $1 < L_{24} < 2$ |
|   |   | $C_{34}$ | $1 < L_{34} < 2$ |
|   |   | $C_{45}$ | $L_{45} = 1$ |
| 5 | $S_5$ | $C_{45}$ | $L_{45} = 1$ |

Figure 19:
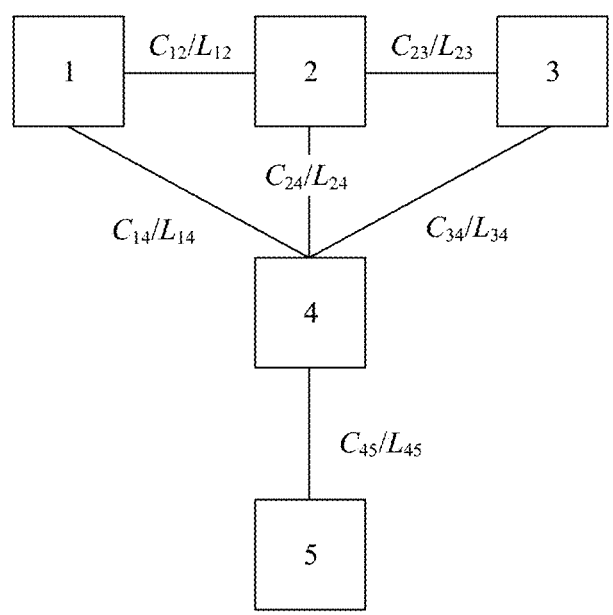
FIG. 19 is a schematic diagram of a floor plan connected graph including a floor plan parameter in a wireless access point deployment method according to an embodiment of this application.

In addition, in this case, the floor plan connected graph including the floor plan parameter may be further determined, and the floor plan connected graph including the floor plan parameter is shown in FIG. 19.

Operation S26: The terminal device determines, based on the AP type and the floor plan parameter, overall wireless signal attenuation between grids obtained after division.

Overall wireless signal attenuation between two grids is a sum of spacing attenuation between the two grids and propagation attenuation in free space between the two grids.

In addition, the spacing attenuation between the two grids is spacing attenuation between rooms in which the two grids are located. For example, if a first grid is located in the room A, and a second grid is located in the room B, spacing attenuation between the first grid and the second grid is the wall attenuation between the room A and the room B. When two grids are located in a same room, spacing attenuation between the two grids is 0.

It is assumed that spacing attenuation between the room A and the room B is $LOSS_{AB}$. When the room A is adjacent to the room B, the spacing attenuation $LOSS_{AB}$ between the room A and the room B is a product of the wall attenuation and the connectivity between the two rooms. For example, when the first floor plan is shown in FIG. 16, the room 1 is adjacent to the room 2, and spacing attenuation between the room 1 and the room 2 may be expressed as:

$$LOSS_{12}=C_{12}*L_{12}.$$

$LOSS_{12}$ is the spacing attenuation between the room 1 and the room 2, $C_{12}$ is wall attenuation between the room 1 and the room 2, and $L_{12}$ is connectivity between the room 1 and the room 2.

When the room A is not adjacent to the room B, indirect calculation is performed by using a room adjacent to the room A and the room B. For example, when the first floor plan is shown in FIG. 16, the room 1 and the room 5 are not adjacent to each other, but both the room 1 and the room 5 are adjacent to the room 4. In this case, spacing attenuation between the room 1 and the room 5 may be expressed as:

$$LOSS_{15}=C_{14}*L_{14}+C_{45}*L_{45}.$$

$LOSS_{15}$ is the spacing attenuation between the room 1 and the room 5, $C_{14}$ is wall attenuation between the room 1 and the room 4, $L_{14}$ is connectivity between the room 1 and the room 4, $C_{45}$ is wall attenuation between the room 4 and the room 5, and $L_{45}$ is connectivity between the room 4 and the room 5.

In addition, the propagation attenuation in the free space is attenuation generated when a wireless signal propagates in the free space, and the propagation attenuation in the free space may be expressed as PL. In this embodiment of this application, the wireless signal is a wireless signal transmitted by an AP recommended to be deployed currently.

The free space is propagation space without any multipath. The propagation attenuation in the free space may be determined by using a signal transmission attenuation model. In a feasible example, the signal transmission attenuation model is as follows:

$$PL=32.4+20 \log_{10}(f_c)+20 \log_{10}(d).$$

In an embodiment of this application, $f_c$ is a frequency of a wireless signal transmitted by an AP corresponding to the AP type that is recommended to be deployed currently and that is determined in operation S14, and d is a transmission distance of the wireless signal. When propagation attenuation in free space between two grids is calculated, d in the foregoing formula is a transmission distance of a wireless signal between the two grids. In an embodiment of this application, an AP type of each AP (including a master AP and a sub-AP) recommended to be deployed is determined in operation S14. Then, performance of each AP recommended to be deployed currently may be determined based on the AP type. The performance includes a frequency of a transmitted wireless signal.

In an embodiment of this application, when a transmission distance d between two grids needs to be determined, a length of a line segment connected to center points of the two grids in a floor plan is generally obtained in the floor plan, and then an actual length of the line segment may be determined based on a ratio of an area of a house in the floor plan to an actual area of the house and the length of the line segment in the floor plan. The actual length of the line segment is a transmission distance of a wireless signal between the two grids.

Figure 20:
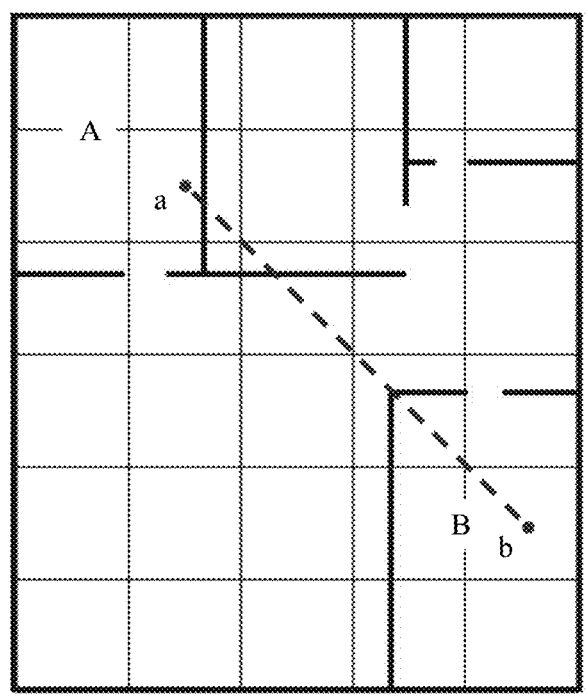
FIG. 20 is a schematic diagram of a transmission distance of a wireless signal between two grids in a wireless access point deployment method according to an embodiment of this application.

In an example, as shown in FIG. 20, propagation attenuation in free space between two grids needs to be calculated. A point a and a point b in the figure are center points of the two grids respectively. In a calculation process, a line between the center points of the two grids is first obtained, that is, a line segment connected to the point a and the point b is obtained. The line segment is shown by a dashed line in FIG. 20. Then, a length of the line segment in time and space is obtained through conversion based on a ratio of an area of a house in the first floor plan to an actual area of the house. The length is a transmission distance d of a wireless signal between the two grids.

The overall wireless signal attenuation may be expressed as Los. Because overall wireless signal attenuation between two grids is a sum of spacing attenuation between the two grids and propagation attenuation in free space between the two grids, the overall wireless signal attenuation between the two grids may be expressed as:

$$Los=Loss+PL.$$

Los is overall wireless signal attenuation between any two grids, Loss is spacing attenuation between the two grids, and PL is propagation attenuation in free space between the two grids.

Operation S27: The terminal device determines an area in which a master AP can be deployed, where a set including grids occupied by the area in which the master AP can be deployed is a first grid set.

A model of the master AP is a model of the AP that is recommended to be deployed currently and that is determined in operation S14, and a quantity of master APs is 1. That is, when it is determined that only the master AP is recommended to be deployed in a subsequent operation, it indicates that only one AP needs to be deployed in the house.

In an embodiment of this application, the area in which the master AP can be deployed may be determined in a plurality of manners. In a feasible manner, that the terminal device determines an area in which a master AP can be deployed includes the following operations:

The terminal device displays a master AP deployment interface.

The terminal device receives a seventh operation for the master AP deployment interface.

The terminal device determines, in response to the seventh operation, that a location specified by the seventh operation is the area in which the master AP can be deployed.

The seventh operation is used to specify a location at which the master AP can be deployed. In this case, the terminal device determines, based on the received seventh operation, the area in which the master AP can be deployed. For example, deployment personnel may specify that the master AP is deployed in the room 4. In this case, a location of the room 4 is the area in which the master AP can be deployed.

Alternatively, in another embodiment, the terminal device displays a master AP deployment interface. The terminal device receives an eighth operation for the master AP deployment interface, and determines, based on the eighth operation, the area in which the master AP can be deployed.

The eighth operation may be used to indicate a location of a network cable interface in a house. In this case, the terminal device may determine a room with a largest area in rooms in which a network cable interface is disposed, and then use the room with the largest area as the area in which the master AP can be deployed. Alternatively, rooms with connectivity in rooms in which a network cable interface is disposed are determined, and then a room with best connectivity is used as the area in which the master AP can be deployed.

Alternatively, the eighth operation is used to indicate the terminal device to select the area in which the master AP can be deployed. In this case, after receiving the eighth operation, the terminal device may determine, in a plurality of manners, the area in which the master AP can be deployed. In a first manner, the terminal device may determine connectivity of rooms based on the first floor plan, and use a room with best connectivity as the area in which the master AP can be deployed. For example, in the first floor plan shown in FIG. 16, the room 4 is connected to all other rooms, and has best connectivity. In this case, the terminal device may determine that the room 4 is the area in which the master AP can be deployed. In this manner, because the master AP is deployed in the room with best connectivity, average attenuation of a wireless signal from the master AP to each room is relatively small.

In a second manner, an area in which a central location of the first floor plan is located is determined. If there is an intersection between the area and a room with best connectivity, the terminal device uses the intersection as the area in which the master AP can be deployed. In addition, if there is no intersection between the area and a room with best connectivity, the terminal device determines an area at a central location of the room with the best connectivity as the area in which the master AP can be deployed. Compared with the first manner, this manner reduces the area in which the master AP can be deployed, so that an appropriate location for deploying the master AP can be more accurately determined.

Certainly, the terminal device may further determine, in another manner, the area in which the master AP can be deployed. This is not limited in this embodiment of this application.

To clarify a method for determining the area in which the master AP can be deployed, the following example is disclosed.

In an embodiment of this application, after determining the AP type recommended to be deployed currently, the terminal device may jump to an interface for determining the area in which the master AP can be deployed. In an example, refer to an example diagram of an interface shown in FIG. 21(a) to FIG. 21(d). In this example, when displaying an interface shown in FIG. 21(a), the terminal device determines, by using an AP type in an AP list tapped by the deployment personnel, an AP type recommended to be deployed currently. In this case, after receiving a tap operation for a specific AP type, the terminal device may jump to an interface shown in FIG. 21(b). The interface shown in FIG. 21(b) displays options "Specify a location of a master AP", "Enter a location of a network cable interface", and "Provide a recommendation".

When the deployment personnel specify a location at which a master AP can be deployed, the deployment personnel can select the option "Specify a location of a master AP". After receiving the selection operation by the deployment personnel, the terminal device jumps to an interface shown in FIG. 21(c). The interface displays the first floor plan, and prompts the deployment personnel to select a location of a master AP. Then, the deployment personnel may perform a tap operation at a location in the first floor plan. After receiving the tap operation, the terminal device uses the location at which the tap operation is performed as the area in which the master AP can be deployed.

In this case, the seventh operation includes the operation of selecting the option "Specify a location of a master AP" by the deployment personnel and the tap operation at a location in the first floor plan.

Figure 21A:
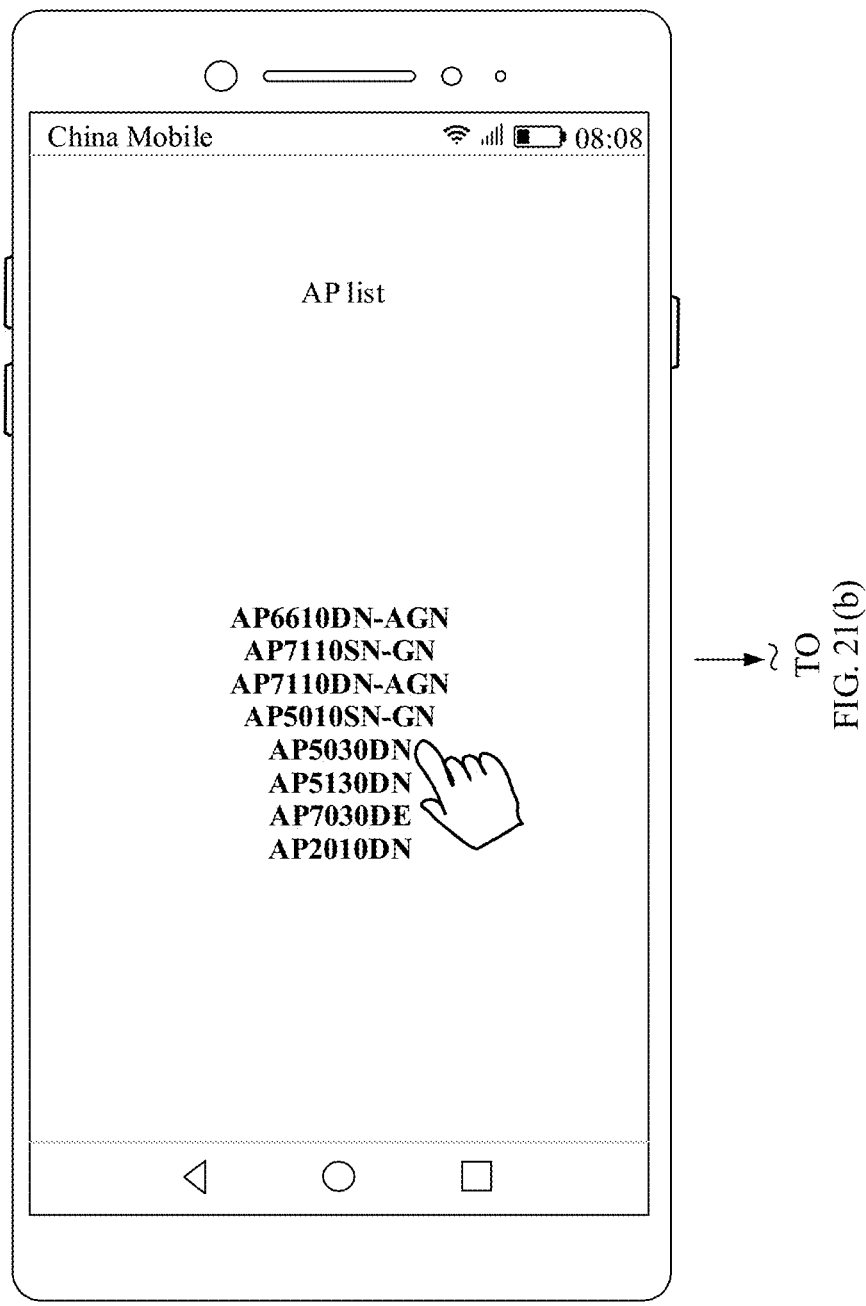
FIG. 21(a) to FIG. 21(d) are a schematic diagram of another AP deployment interface in a wireless access point deployment method according to an embodiment of this application.
Figure 21B:
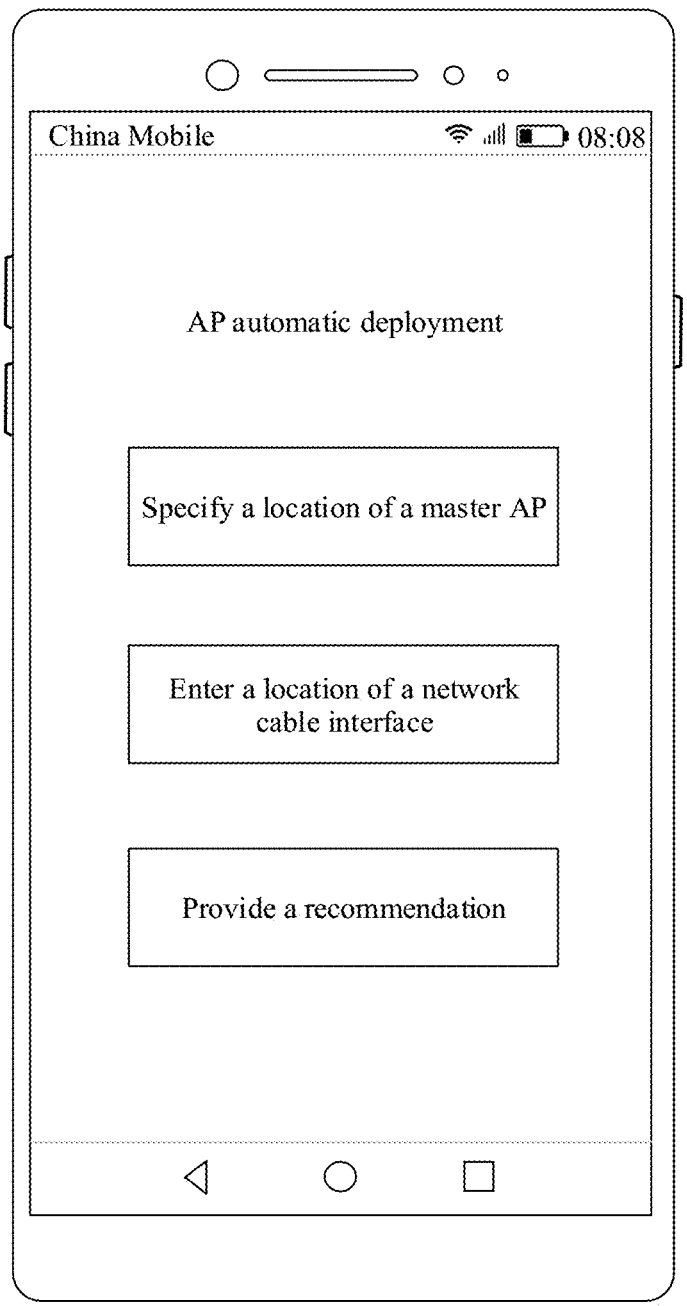
Figure 21C:
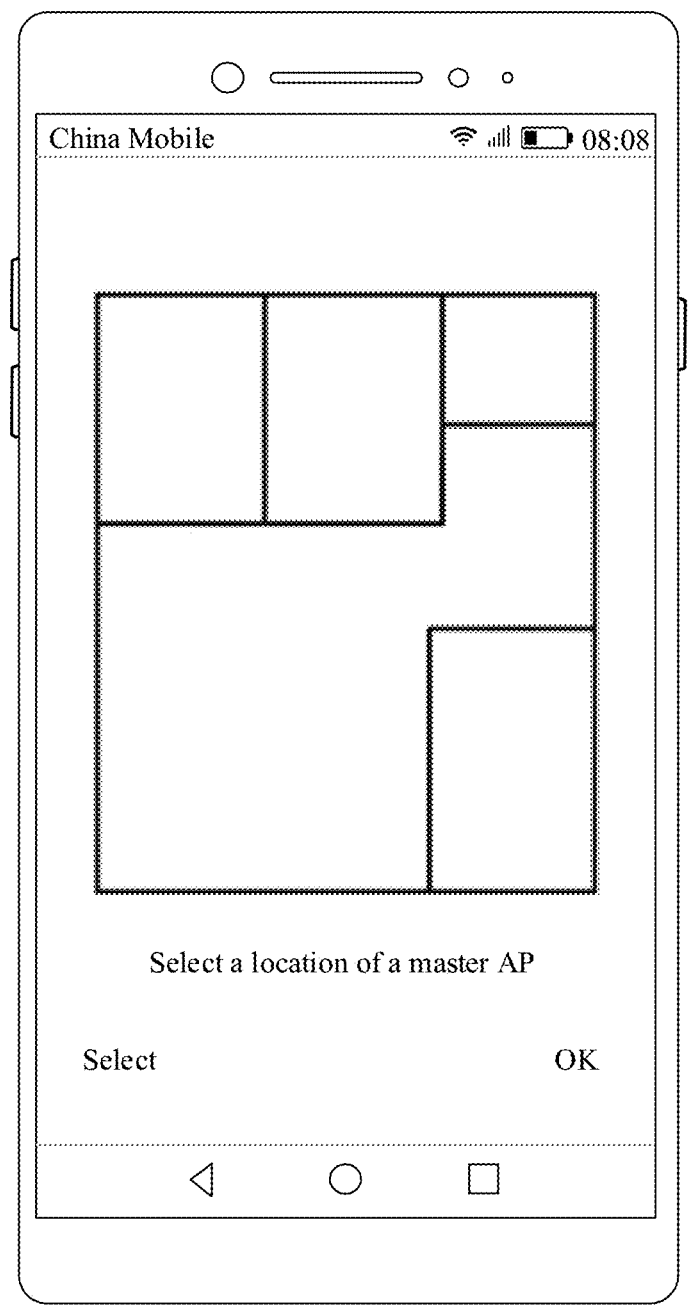
Figure 21D:
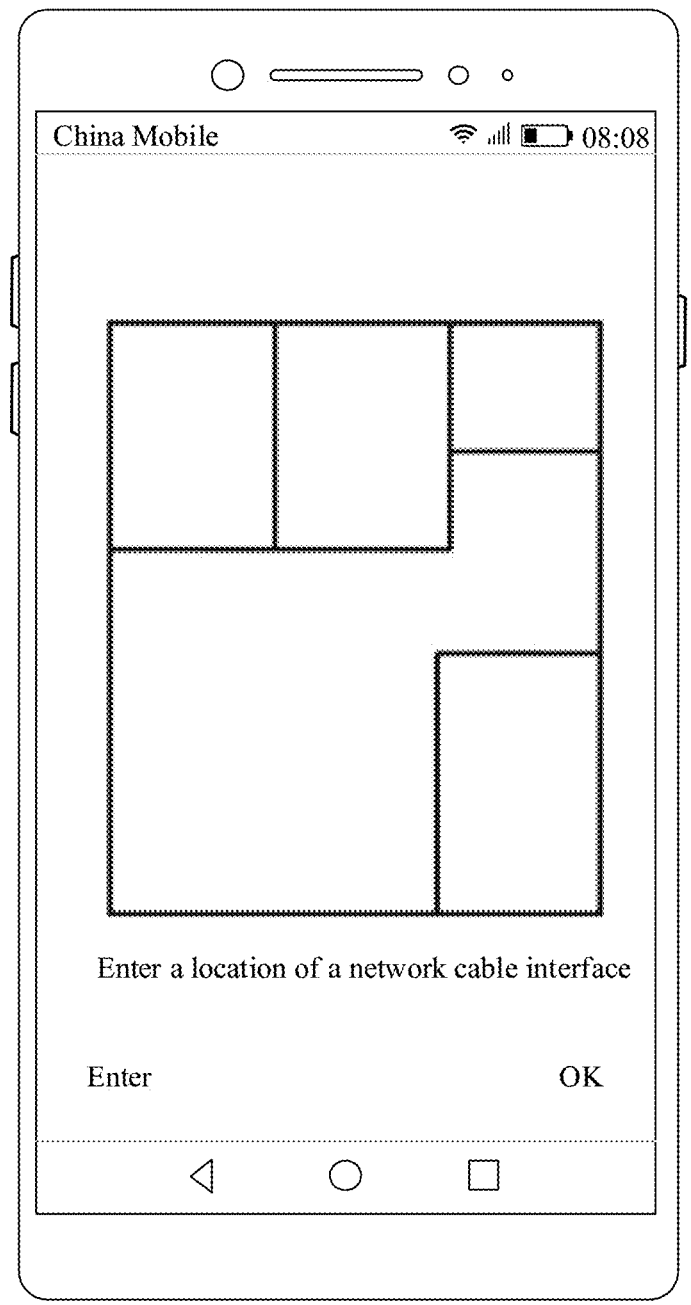

In another embodiment, the terminal device determines, based on a location of a network cable interface that is entered by the deployment personnel, the area in which the master AP can be deployed. In this case, when the interface shown in FIG. 21(a) is displayed, the deployment personnel may select the option "Enter a location of a network cable interface". Then, the terminal device jumps to an interface shown in FIG. 21(d). On the interface shown in FIG. 21(d), the deployment personnel may perform a tap operation at a location in the first floor plan. After receiving the tap operation, the terminal device uses the location at which the tap operation is performed as a location of a network cable interface, and then determines, based on the location of the network cable interface, the area in which the master AP can be deployed. For example, the terminal device may use, as the area in which the master AP can be deployed, a room with a largest area in rooms in which a network cable interface is disposed.

In this case, the eighth operation includes the operation of selecting the option "Enter a location of a network cable interface" by the deployment personnel and the tap operation at a location in the first floor plan.

In another embodiment, when the interface shown in FIG. 21(a) is displayed, the deployment personnel may select the option "Provide a recommendation". In this case, the terminal device may determine connectivity of rooms based on the first floor plan, and use a room with best connectivity as the area in which the master AP can be deployed. Alternatively, the terminal device determines an area in which a central location of the first floor plan is located. If there is an intersection between the area and a room with best connectivity, the terminal device uses the intersection as the area in which the master AP can be deployed. In addition, if there is no intersection between the area and a room with best connectivity, the terminal device determines an area at a central location of the room with the best connectivity as the area in which the master AP can be deployed.

In this case, the eighth operation includes the operation of selecting the option "Provide a recommendation" by the deployment personnel.

Operation S28: The terminal device determines, based on the overall wireless signal attenuation between the grids, a second grid set including the grids in the first grid set, where a deployment requirement is met when the master AP is deployed in any grid in the second grid set.

That is, in this operation, the terminal device determines, based on the overall wireless signal attenuation between the grids, whether a deployment requirement is met when the master AP is deployed in each grid in the first grid set, and obtains the second grid set including grids that meet the deployment requirement.

If a center point of a grid is located in the area in which the master AP can be deployed, it is determined that the grid is a grid occupied by the area in which the master AP can be deployed. Alternatively, if a majority of a grid is located in the area in which the master AP can be deployed, it is determined that the grid is a grid occupied by the area in which the master AP can be deployed. In addition, after grids occupied by the area in which the master AP can be deployed are determined, a grid set including the grids occupied by the area in which the master AP can be deployed may be denoted as the first grid set M.

In this operation, after the grids occupied by the area in which the master AP can be deployed are determined, the grids in the set M are traversed and selected to determine whether a deployment requirement is met when the master AP is deployed in one of the grids. In addition, the master AP may be denoted as $AP_1$, and the grid in which the master AP is deployed may be denoted as $M_i$.

In addition, it may be determined, by determining whether a condition such as a seamless coverage requirement and/or a minimum rate requirement is met, to determine whether a deployment requirement is met when the master AP is deployed in a grid.

When the strength of a wireless signal received by each grid in the house is greater than a first threshold, it may be determined that the seamless coverage condition is met. When strength of a wireless signal received by each grid in the house is greater than a second threshold, it may be determined that the minimum rate requirement is met. The first threshold is usually less than the second threshold.

When only one AP 1 is deployed in the house, signal strength of an AP 1 received in each grid is strength of a wireless signal received in the grid. If a grid in which the AP 1 is located is set as a target grid, signal strength of an AP 1 received in a grid a is usually a difference between strength of a wireless signal transmitted by the AP 1 and overall wireless signal attenuation between the target grid and the grid a.

In addition, when at least two APs are deployed in the house, a maximum value of signal strength of the at least two APs received in each grid is strength of a wireless signal received in the grid. For example, when strength of a wireless signal finally received in a grid a is calculated, and an AP 1 and an AP 2 are deployed in the house, a difference between strength of a wireless signal transmitted by the AP 1 and overall wireless signal attenuation between a grid in which the AP 1 is located and the grid a is first calculated, and the difference is used as first signal strength; a difference between strength of a wireless signal transmitted by the AP 2 and overall wireless signal attenuation between a grid in which the AP 2 is located and the grid a is calculated, and the difference is used as second signal strength; and the first signal strength is compared with the second signal strength, and a larger value is selected as the strength of the wireless signal finally received in the grid a.

In an embodiment of this application, strength of a wireless signal transmitted by the master AP may be determined based on the AP type determined in operation S14 and a relationship between each AP type and strength of a wireless signal transmitted by the AP, and then signal strength of the wireless signal transmitted by the master AP in another grid in the house is determined based on wireless signal attenuation between a grid in which the master AP is located and the another grid. That is, a difference between the strength of the wireless signal transmitted by the master AP and the wireless signal attenuation between the grid in which the master AP is located and the another grid is used as the strength of the wireless signal finally received in each grid in the house, and it is determined, based on a result of comparing the wireless signal strength finally received in each grid with the first threshold and the second threshold, whether a deployment requirement is met.

In addition, specific values of the first threshold and the second threshold may be preset by the terminal device. In this case, the terminal device determines the specific values of the first threshold and the second threshold based on the preset setting, and determines whether each grid meets a deployment requirement. Further, the specific values of the first threshold and the second threshold may be adjusted in a deployment process based on an actual requirement. In this case, the terminal device may display a requirement level for wireless signal strength, and correspondingly adjust the specific values of the first threshold and the second threshold based on a received selection operation for the requirement level. For example, the terminal device may preset three requirement levels for wireless signal strength, and a correspondence between each requirement level and a first threshold and a second threshold. A higher requirement level for wireless signal strength indicates higher first threshold and second threshold.

In an embodiment, when the terminal device supports adjustment of the specific values of the first threshold and the second threshold, after determining the area in which the master AP can be deployed, the deployment personnel may perform a touch operation on the terminal device to select a requirement level for wireless signal strength. For example, the terminal device may set three option levels for a requirement for wireless signal strength: high signal strength, medium signal strength, and low signal strength. Specific values of the first threshold and the second threshold corresponding to the high signal strength are the highest. Specific values of the first threshold and the second threshold corresponding to the low signal strength are the lowest. When determining, based on a touch operation by the deployment personnel, that the specific values of the first threshold and the second threshold need to be adjusted, the terminal device displays the three options, and after receiving a selection operation for one of the requirement options, the terminal device adjusts the specific values of the first threshold and the second threshold based on a correspondence between the option and the first threshold and the second threshold.

Operation S29: The terminal device determines, based on the first grid set and the second grid set, the quantity of APs recommended to be deployed and the locations of the APs recommended to be deployed.

Operation S30: The terminal device displays the AP deployment interface based on the quantity of APs recommended to be deployed and the locations of the APs recommended to be deployed.

This operation usually includes the following operations: when the second grid set is not empty, the terminal device determines that a grid with a largest deployment indicator in the second grid set is a grid in which the master AP is deployed, and determines not to recommend to deploy a sub-AP. Alternatively, when the second grid set is empty, the terminal device determines a location at which the master AP is deployed, and determines a location at which a sub-AP is deployed and a quantity of sub-APs, where a quantity of master APs is 1.

That is, when the second grid set is not empty, the AP deployment solution determined by the terminal device is deploying one AP in a grid with a largest deployment indicator in the second grid set. When the second grid set is empty, if only one AP is deployed, a user requirement cannot be met, and a quantity of to-be-deployed sub-APs and locations of the sub-APs and a location at which the master AP is deployed need to be further determined.

The deployment indicator may be determined by a capacity indicator and/or a coverage indicator. The capacity indicator may be denoted as Cap, and the coverage indicator may be denoted as Cov.

The capacity indicator is an average value of strength of wireless signals received in all grids in the first floor plan. In an embodiment, the capacity indicator may be determined by using the following formula:

$$Cap_{a,b} = E(\Sigma_{a=1}^{x} \Sigma_{b=1}^{y} \log(1+SNR_{a,b})).$$

$Cap_{a,b}$ represents a capacity indicator of a grid whose coordinates are (a,b), and $SNR_{a,b}$ represents a maximum signal-to-noise ratio (SNR) obtained in the grid whose coordinates are (a,b). The signal-to-noise ratio is used to reflect strength of a wireless signal finally received in the grid whose coordinates are (a,b).

The coverage indicator is an average value of strength of wireless signals received in target grids, and the target grids are n % grids in which strength of a finally received wireless signal is smallest in all grids in the first floor plan. Herein, n is a preset positive number. Generally, n may be set to 5. Certainly, n may alternatively be set to another positive number. This is not limited in this embodiment of this application. For example, if a quantity of grids in the first floor plan is 100, and n is 5, the target grids are five grids in which strength of a finally received wireless signal is smallest in all the grids in the first floor plan.

In this case, when the coverage indicator needs to be determined, strength of wireless signals received in all grids is first determined, n % grids with smallest wireless signal strength are selected, the n % grids with smallest wireless signal strength are used as target grids, and an average value of strength of wireless signals received in the target grids. The average value is the coverage indicator.

In an embodiment, the coverage indicator may be determined by using the following formula:

$$Cov_{a,b} = E(\text{quantile}(\log(1+SNR_{a,b}),0.0n)). \text{ In the formula, } \min(SNR_{a,b}) \geq thr.$$

$Cov_{a,b}$ represents a coverage indicator of the grid whose coordinates are (a,b), and n is a preset positive integer.

$\min(SNR_{a,b}) \geq thr$ indicates that the grid meets a deployment requirement. When the deployment requirement is seamless coverage, thr is the first threshold. When the deployment requirement is the minimum rate requirement, thr is the second threshold. When the deployment requirement is the seamless coverage requirement and the minimum rate requirement, thr is a larger value of the first threshold and the second threshold.

In an embodiment of this application, the deployment indicator may be the capacity indicator or the coverage indicator, or the deployment indicator may be jointly determined by the capacity indicator and the coverage indicator. When the deployment indicator is jointly determined by the capacity indicator and the coverage indicator, the deployment indicator may be denoted as a KPI, and the deployment indicator KPI may be determined by using the following formula:

$$KPI = w_1 Cap + w_2 Cov.$$

In the foregoing formula, $w_1$ and $w_2$ are weighted values of the capacity indicator Cap and the coverage indicator Cov respectively. The terminal device may preset the two weighted values, and adjust the two weighted values based on an actual requirement in a subsequent application process. For example, when the capacity indicator is more important, $w_1$ may be adjusted to a larger value. When the coverage indicator is more important, $w_2$ may be adjusted to a larger value.

In addition, when the second grid set is empty, it indicates that deploying only one master AP cannot meet a user requirement. In this case, in the deployment solution determined by the terminal device, the quantity of APs recommended to be deployed currently is a sum of the quantity of master APs and the quantity of sub-APs, and the locations of the APs recommended to be deployed currently are the locations of the master APs and the locations of the sub-APs.

In an embodiment, when the second grid set is empty, one grid is selected from the first grid set through traversal as the location at which the master AP is deployed. The master AP may be denoted as $AP_1$, and the grid in which the master AP is deployed may be denoted as $M_i$.

Then, a grid set in which a sub-AP can be deployed is determined according to the following conditions when the master AP is deployed in the grid selected from the first grid set through traversal:

(Condition 1): To prevent interference between APs and waste of APs that are caused by excessively dense AP deployment, a distance between each sub-AP and the master AP cannot be less than $D_{min}$, that is, a minimum distance between each sub-AP and the master AP is $D_{min}$.

(Condition 2): To prevent a case in which seamless coverage cannot be implemented because a wireless signal transmitted by an AP is attenuated and ensure an overlapping coverage area of the wireless signal, a distance between each sub-AP and the master AP cannot be greater than $D_{max}$, that is, a maximum distance between each sub-AP and the master AP is $D_{max}$.

A third grid set N including a grid in which a sub-AP that meets the foregoing conditions can be deployed is determined.

When the grid in which the master AP is deployed is denoted as $M_i$, a grid in which a first sub-AP can be deployed is denoted as $N_{i,j}$, where both i and j are natural numbers. The set M and the set N are traversed, to find a set of all grids in which the master AP and the first sub-AP can be deployed, and the set is denoted as $O_i$, where $O_i = \{N_{i,j} | M_i\} \circ$.

A fourth grid set $P_1$ including a grid in which the first sub-AP can be deployed and a grid in which the master AP can be deployed that are in the set $O_i$, and that both meet a deployment requirement is determined. The deployment requirement may be determined by using the seamless coverage requirement and/or the minimum rate requirement. For details, refer to the operation in operation S15. Details are not described herein again.

When the fourth grid set $P_1$ is not empty, the fourth grid set $P_1$ is searched for a combination of $M_i$ and $N_{i,j}$ with a largest deployment indicator. $M_i$ is the grid in which the master AP is deployed, and $N_{i,j}$ is the grid in which the first sub-AP is deployed. In this case, deploying the two APs, that is, the master AP and the first sub-AP, can meet an actual requirement.

When the fourth grid set $P_1$ is empty, it indicates that deploying only the two APs, that is, the master AP and the first sub-AP, cannot meet an actual requirement. In other words, at least two sub-APs are recommended to be deployed. In this case, an area set in which a sub-AP can be deployed is re-determined according to the following conditions:

(Condition 3): To prevent interference between APs and waste of APs that are caused by excessively dense AP deployment, a distance between each sub-AP and the master AP cannot be less than $D_{min}$, that is, a minimum distance between each sub-AP and the master AP is $D_{min}$.

(Condition 4): To prevent a case in which seamless coverage cannot be implemented because a wireless signal transmitted by an AP is attenuated and ensure an overlapping coverage area of the wireless signal, a distance between each sub-AP and the master AP cannot be greater than $D_{max}$, that is, a maximum distance between each sub-AP and the master AP is $D_{max}$.

(Condition 5): When at least two sub-APs are deployed, to prevent interference between sub-APs and waste of sub-APs that are caused by excessively dense sub-AP deployment, a distance between sub-APs cannot be less than $d_{min}$, that is, a minimum distance between sub-APs is $d_{min}$.

A grid set in which a sub-AP can be deployed is re-determined by using the condition 3 to the condition 5. The re-determined grid set in which a sub-AP can be deployed is an updated third grid set N.

When the location at which the master AP is deployed is denoted as $M_i$, an area in which a second sub-AP can be deployed is denoted as $N_{i,l}$, where i is a natural number. The set M and the updated third grid set N are traversed, to find a combination of all grids in which the master AP, the first sub-AP, and the second sub-AP can be deployed, and the combination is denoted as $O_l$, where $O_l = \{N_{i,j}, N_{i,l} | M_i\} \circ$.

A grid set $P_2$ including the first sub-AP, the second sub-AP, and the master AP that are in the set $O_l$ and that all meet a deployment requirement is determined. The deployment requirement may be determined by using the seamless coverage requirement and/or the minimum rate requirement. For details, refer to the operation in operation S15. Details are not described herein again.

When the fourth grid set $P_2$ is not empty, the fourth grid set $P_2$ is searched for a combination of $M_i$, $N_{i,j}$, and $N_{i,l}$ with a largest deployment indicator. $M_i$ is the grid in which the master AP is deployed, $N_{i,j}$ is the grid in which the first sub-AP is deployed, and $N_{i,l}$ is the grid in which the second sub-AP is deployed. In this case, deploying the three APs, that is, the master AP, the first sub-AP, and the second sub-AP, can meet an actual requirement.

When the fourth grid set $P_2$ is empty, it indicates that deploying only the three APs, that is, the master AP, the first sub-AP, and the second sub-AP, cannot meet an actual requirement. In this case, another sub-AP is added, and the foregoing operations are performed until a set of APs meeting a deployment requirement is not empty. Then, deployment locations of the APs are determined based on the set of the APs meeting the deployment requirement, and a quantity of APs is determined based on a quantity of APs included in the set of the APs meeting the deployment requirement.

It can be learned from the foregoing descriptions that, in this embodiment of this application, referring to a schematic diagram of a working process shown in FIG. 22, the location at which the master AP is deployed, and the quantity of to-be-deployed sub-APs and the locations of the sub-APs are determined in the following operations.

Operation S201: Determine a quantity n of sub-APs recommended to be deployed.

In an initial phase of determining a deployment solution of the sub-AP, n=1.

Operation S202: Sequentially traverse the first grid set to select a grid as a target location of the master AP, and when it is determined that the master AP is deployed at the target location, determine a third grid set including a sub-grid in which the sub-AP is deployed.

When the quantity of sub-APs recommended to be deployed is 1 (that is, n=1), the third grid set needs to be determined based on the condition 1 and the condition 2. In addition, when the quantity of sub-APs recommended to be deployed is greater than 1, the third grid set needs to be determined based on the condition 3 and the condition 5.

Operation S203: Traverse the first grid set and the third grid set, and determine a set $O_i$ of a grid in which the master AP can be deployed and a grid in which the sub-AP can be deployed.

Operation S204: Determine a fourth grid set including a grid in which the master AP can be deployed and a grid in which the sub-AP can be deployed that are in the set $O_i$, and that both meet a deployment requirement.

For a manner of determining whether the deployment requirement is met, refer to the foregoing embodiment. Details are not described herein again.

Operation S205: Determine whether the fourth grid set is empty; and if no, perform an operation in operation S206, or if yes, perform an operation in operation S207.

Operation S206: When the fourth grid set is not empty, search the fourth grid set for a combination of a grid in which a master AP with a largest deployment indicator can be deployed and a grid in which a sub-AP can be deployed, and determine, based on the combination, the location at which the master AP is deployed and the location at which the sub-AP is deployed.

When the fourth grid set is not empty, the fourth grid set is searched for the combination of the grid in which the master AP with the largest deployment indicator can be deployed and the grid in which the sub-AP can be deployed. A location indicated by the grid in which the master AP can be deployed in the combination is the location at which the master AP is deployed, a location indicated by the grid in which the sub-AP can be deployed in the combination is the location at which the sub-AP is deployed, and a quantity of grids in which the sub-AP can be deployed in the combination is the quantity of to-be-deployed sub-APs. In addition, when a total quantity of grids included in the fourth grid set is NUM, the quantity of APs recommended to be deployed currently is NUM.

Operation S207: When the fourth grid set is empty, adjust the quantity n of sub-APs recommended to be deployed, and return to perform the operation in operation S202. A quantity n of sub-APs recommended to be deployed after adjustment is usually 1 plus the quantity of sub-APs recommended to be deployed before adjustment.

Through the operations of operation S201 to operation S207, when one master AP cannot meet a deployment requirement, the quantity of APs recommended to be deployed and the locations of the APs recommended to be deployed can be determined, so that the terminal device can generate and display the corresponding AP deployment interface based on the quantity of APs and the locations of the APs.

Apparatus embodiments of the present invention are provided in the following, and may be used to execute the method embodiments of the present invention. For details that are not disclosed in the apparatus embodiments of the present invention, refer to the method embodiments of the present invention.

Correspondingly, another embodiment of this application further discloses a wireless access point deployment apparatus. The wireless access point deployment method may be applied to a plurality of terminal devices. The plurality of terminal devices may determine, based on related information of a house in which an AP needs to be deployed (for example, a floor plan and an area of the house) and types of various APs, a quantity of APs recommended to be deployed in the house and locations of the APs recommended to be deployed in the house, and display, by using a display interface of the terminal device, the quantity of APs recommended to be deployed and the locations of the APs recommended to be deployed.

In some embodiments, the terminal device may be a device such as a mobile phone, a tablet computer, a desktop computer, a laptop computer, a notebook computer, an ultra-mobile personal computer (UMPC), a handheld computer, a netbook, a personal digital assistant (PDA), a wearable terminal device, or a smartwatch. Specific forms of the foregoing smart household device, server, and terminal device are not particularly limited in this application.

Figure 23:
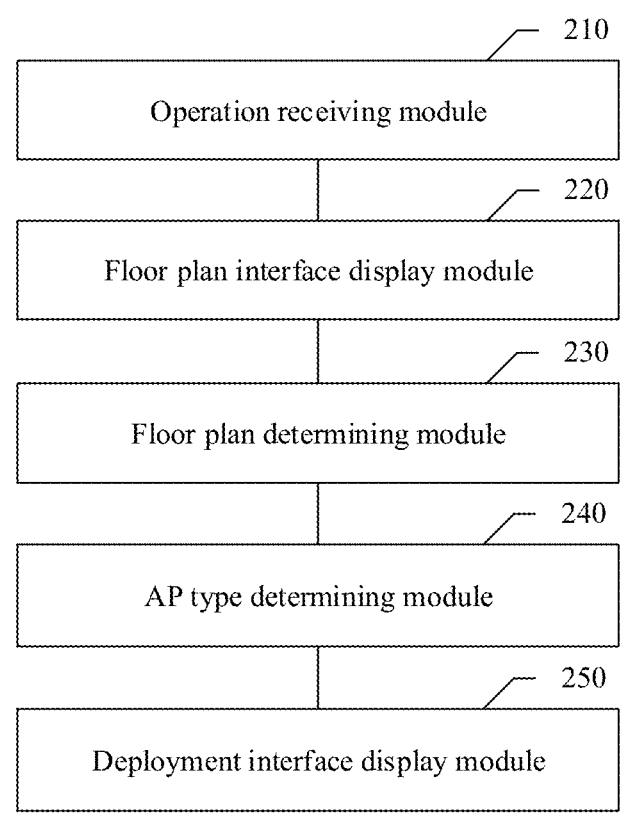
FIG. 23 is a schematic diagram of a structure of a wireless access point deployment apparatus according to an embodiment of this application.

Refer to a schematic diagram of a structure shown in FIG. 23. The wireless access point deployment apparatus includes an operation receiving module 210, a floor plan display module 220, a floor plan determining module 230, an AP type determining module 240, and a deployment interface display module 250.

The operation receiving module 210 is configured to receive a first operation, where the first operation is used to start wireless access point AP deployment.

The floor plan interface display module 220 is configured to display a floor plan determining interface in response to the first operation.

The floor plan determining module 230 is configured to: receive a second operation for the floor plan determining interface, and determine a first floor plan based on the second operation.

The AP type determining module 240 is configured to determine an AP type recommended to be deployed currently.

The deployment interface display module 250 is configured to display an AP deployment interface based on the first floor plan and the AP type, where the AP deployment interface is used to display a quantity of APs recommended to be deployed and locations of the APs recommended to be deployed.

Further, in an embodiment of this application, the floor plan determining module includes:

a first display unit, configured to display at least one prestored floor plan;

a first receiving unit, configured to receive a third operation; and a first determining unit, configured to determine the first floor plan in response to the third operation, where the first floor plan is the prestored floor plan.

Alternatively, in another embodiment, the floor plan determining module includes:

a second display unit, configured to display a floor plan generation method interface in response to the second operation;

a second receiving unit, configured to receive first data; and a first generation unit, configured to generate the first floor plan based on the first data.

In addition, in an embodiment of this application, the AP type determining module includes:

a third display unit, configured to display an AP determining interface; and a second determining unit, configured to: receive a fourth operation for the AP determining interface, and determine the AP type by using the fourth operation.

Alternatively, in another embodiment, the AP type determining module includes:

a fourth display unit, configured to display an AP determining interface;

a third receiving unit, configured to receive a fifth operation for the AP determining interface; and a third determining unit, configured to determine the AP type in response to the fifth operation based on the first floor plan.

Alternatively, in another embodiment, the AP type determining module includes:

a fourth determining unit, configured to determine the AP type based on the first floor plan.

In an embodiment of this application, the AP deployment interface may be presented in a plurality of manners. In one manner, the AP deployment interface includes a second floor plan, and the second floor plan displays, by using a preset symbol mark, a location at which an AP is recommended to be deployed.

Alternatively, the AP deployment interface includes a second floor plan, and the second floor plan displays, by using a preset symbol mark, a location at which the AP is recommended to be deployed.

The AP deployment interface further includes the AP type determined by a terminal device.

Alternatively, the AP deployment interface includes a second floor plan, and the second floor plan displays, by using a preset symbol mark, a location at which the AP is recommended to be deployed.

When the fourth operation is further used to indicate a quantity of APs, and the quantity of APs indicated by the fourth operation is inconsistent with the quantity of APs recommended to be deployed, the AP deployment interface further includes prompt information indicating whether the quantity of APs indicated by the fourth operation is appropriate.

The apparatus disclosed in this embodiment of this application further includes:

a wifi heatmap display module, where the operation receiving module is further configured to receive a sixth operation after the AP deployment interface is displayed; and the wifi heatmap display module is configured to generate and display a wifi heatmap in response to the sixth operation.

In the apparatus disclosed in an embodiment of this application, the AP deployment interface is generated and displayed by using the deployment interface display module. The deployment interface display module includes:

a grid division unit, configured to: perform grid division on the first floor plan, and determine, based on a grid division result, a floor plan parameter between rooms in a house in which the AP is deployed currently, where the floor plan parameter includes wall attenuation and connectivity;

an attenuation determining unit, configured to determine, based on the AP type and the floor plan parameter, overall wireless signal attenuation between grids obtained after division;

a first grid determining unit, configured to determine an area in which a master AP can be deployed, where a set including grids occupied by the area in which the master AP can be deployed is a first grid set;

a second grid determining unit, configured to determine, based on the overall wireless signal attenuation between the grids, a second grid set including the grids in the first grid set, where a deployment requirement is met when the master AP is deployed in any grid in the second grid set;

a deployment recommendation unit, configured to determine, based on the first grid set and the second grid set, the quantity of APs recommended to be deployed and the locations of the APs recommended to be deployed; and a deployment interface display unit, configured to display the AP deployment interface based on the quantity of APs recommended to be deployed and the locations of the APs recommended to be deployed.

When the second grid set is not empty, the deployment recommendation unit is configured to: determine that a grid with a largest deployment indicator in the second grid set is a grid in which the master AP is deployed, and determine not to recommend to deploy a sub-AP.

Alternatively, when the second grid set is empty, the deployment recommendation unit is configured to: determine a location at which the master AP is deployed, and determine a location at which a sub-AP is deployed and a quantity of sub-APs, where a quantity of master APs is 1.

Further, when the second grid set is empty, the deployment recommendation unit performs the following operations:

(11) determining a quantity n of sub-APs recommended to be deployed;

(12) sequentially traversing the first grid set to select a grid as a target location of the master AP, and when it is determined that the master AP is deployed at the target location, determining a third grid set including a sub-grid in which the sub-AP is deployed;

(13) traversing the first grid set and the third grid set, and determining a set $O_i$ of a grid in which the master AP can be deployed and a grid in which the sub-AP can be deployed;

(14) determining a fourth grid set including a grid in which the master AP can be deployed and a grid in which the sub-AP can be deployed that are in the set $O_i$ and that both meet a deployment requirement;

(15) determining whether the fourth grid set is empty; and if no, performing an operation in operation (16), or if yes, performing an operation in operation (17); and

(16) when the fourth grid set is not empty, searching the fourth grid set for a combination of a grid in which a master AP with a largest deployment indicator can be deployed and a grid in which a sub-AP can be deployed, where a location indicated by the grid in which the master AP can be deployed in the combination is a location at which the master AP is deployed, a location indicated by the grid in which the sub-AP can be deployed in the combination is a location at which the sub-AP is deployed, and a quantity of grids in which the sub-AP can be deployed in the combination is a quantity of to-be-deployed sub-APs; or

(17) when the fourth grid set is empty, adjusting the quantity n of sub-APs recommended to be deployed, and returning to perform the operation in operation (12).

In addition, in the apparatus disclosed in this embodiment of this application, the first grid determining unit is configured to: display a master AP deployment interface; receive a seventh operation for the master AP deployment interface; and determine, in response to the seventh operation, that a location specified by the seventh operation is the area in which the master AP can be deployed.

Alternatively, the first grid determining unit is configured to: display a master AP deployment interface; and receive an eighth operation for the master AP deployment interface, and determine, based on the eighth operation, the area in which the master AP can be deployed.

In addition, in the apparatus disclosed in this embodiment of this application, the first data includes depth data between a target object and a terminal device.

The target object includes a wall of a house in which an AP is recommended to be deployed currently.

According to the apparatus disclosed in this embodiment of this application, the terminal device can generate and display an AP deployment interface based on a floor plan of a house in which an AP needs to be deployed. The deployment personnel can determine, by viewing the AP deployment interface, a quantity of APs recommended to be deployed currently and locations of the APs recommended to be deployed currently, to resolve a problem in the conventional technology that it is difficult to determine an appropriate quantity of to-be-deployed APs and locations of the APs.

Figure 24:
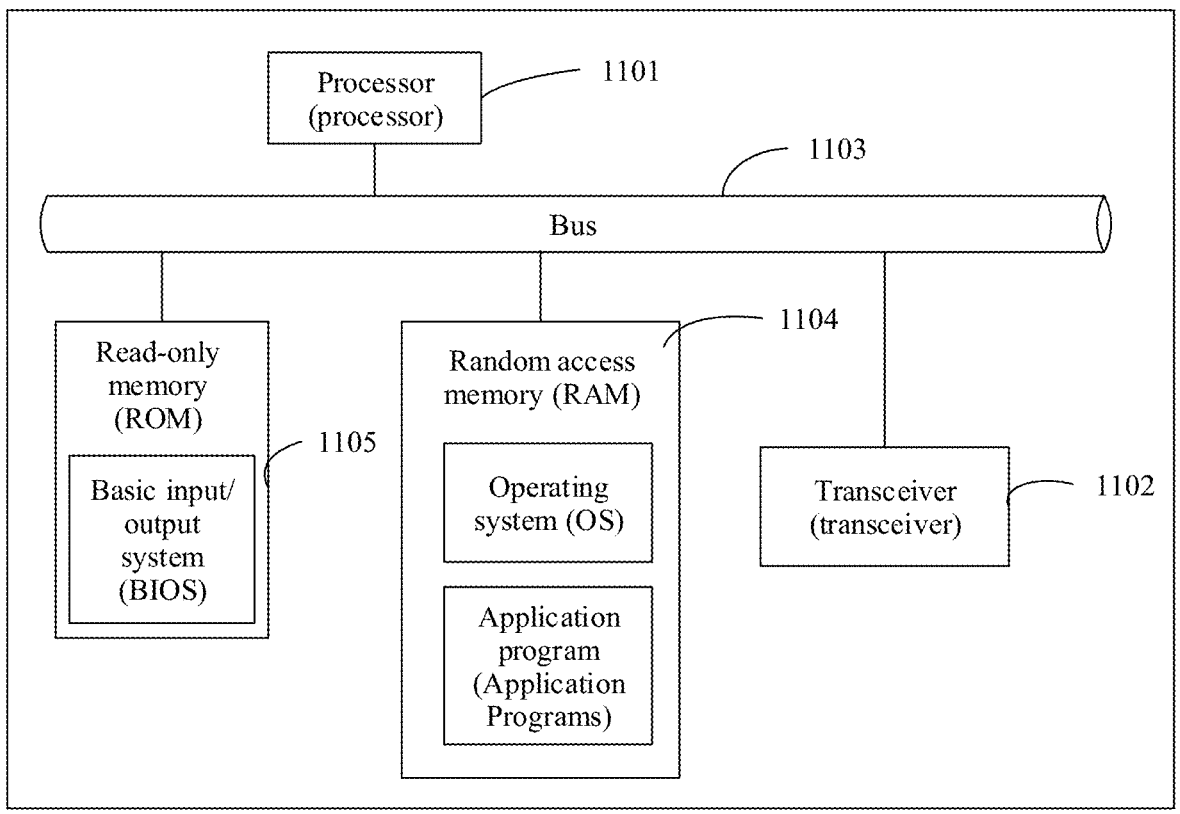
FIG. 24 is a schematic diagram of a structure of another wireless access point deployment apparatus according to an embodiment of this application.

Correspondingly, an embodiment of this application discloses a wireless access point deployment apparatus. Refer to a schematic diagram of a structure shown in FIG. 24. The wireless access point deployment apparatus includes:

a processor 1101 and a memory.

The memory is configured to store program instructions.

Figure 22:
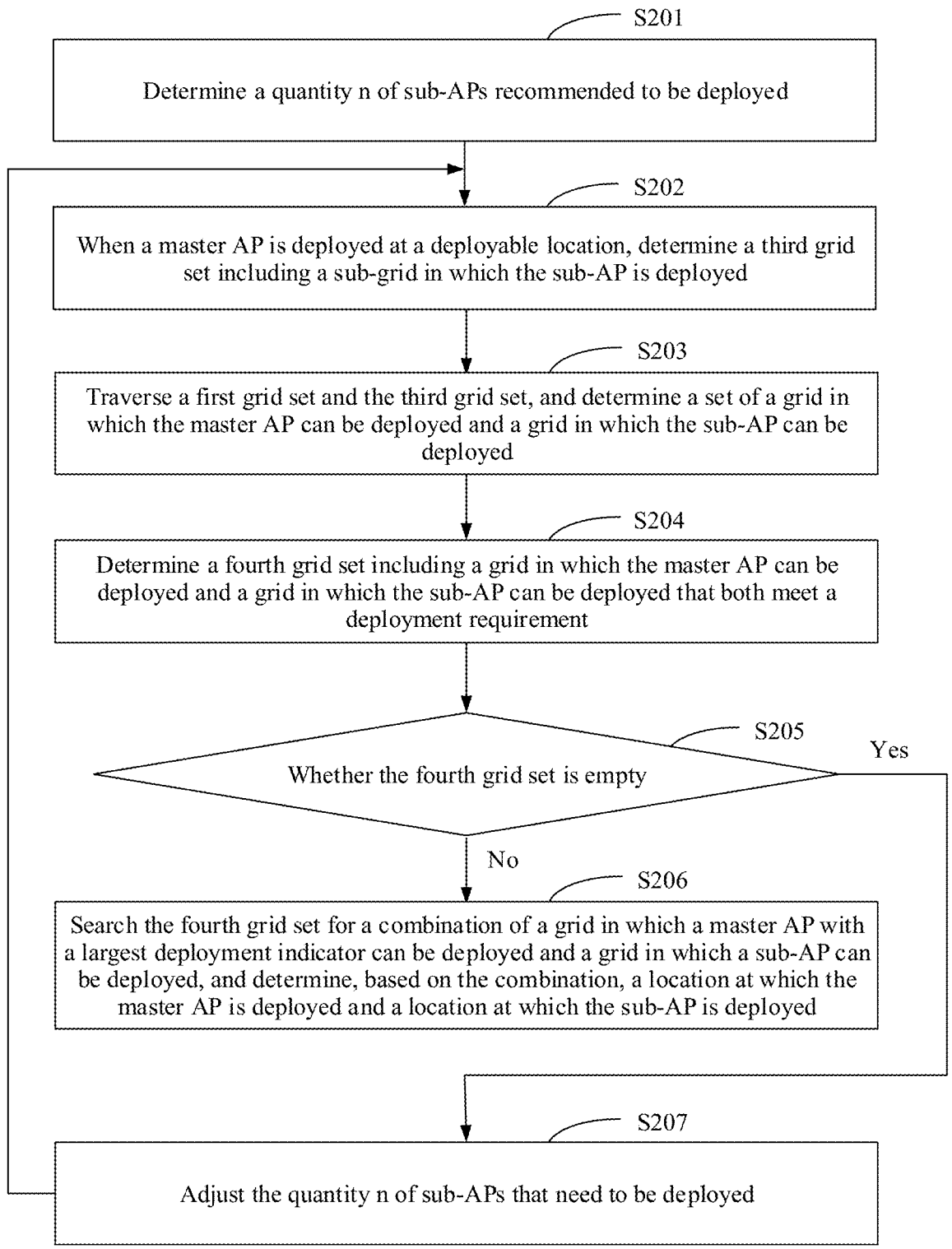
FIG. 22 is a schematic diagram of a working process of another wireless access point deployment method according to an embodiment of this application.

The processor 1101 is configured to invoke and execute the program instructions stored in the memory, so that the beam correspondence capability reporting apparatus performs all or some of the operations in the embodiments corresponding to FIG. 6, FIG. 15, and FIG. 22.

Further, the apparatus may further include a transceiver 1102 and a bus 1103, and the memory includes a random access memory 1104 and a read-only memory 1105.

The processor is separately coupled to the transceiver, the random access memory, and the read-only memory through the bus. When the terminal apparatus needs to run, starting is performed by using a basic input/output system built in the read-only memory or by using a bootloader system in an embedded system, to boot the terminal apparatus to enter a normal running state. After entering the normal running state, the terminal apparatus runs an application program and an operating system in the random access memory, so that the terminal apparatus performs all or some of the operations in the embodiments corresponding to FIG. 6, FIG. 15, and FIG. 22.

The terminal device in this embodiment of the present invention may correspond to the wireless access point deployment apparatus in the embodiments corresponding to FIG. 6, FIG. 15, and FIG. 22, and the processor, the transceiver, and the like in the terminal device may implement functions and/or operations and methods of the wireless access point deployment apparatus in the embodiments corresponding to FIG. 6, FIG. 15, and FIG. 22. For brevity, details are not described herein again.

It should be noted that, in this embodiment, the terminal apparatus may also be implemented based on a general-purpose physical server in combination with a network function virtualization (NFV) technology, and the terminal apparatus is a virtual terminal apparatus (for example, a virtual host, a virtual router, or a virtual switch). The virtual terminal apparatus may be a virtual machine (VM) that runs a program used to send an advertisement packet, and the virtual machine is deployed on a hardware device (for example, a physical server). The virtual machine is a complete software-simulated computer system that has complete hardware system functions and runs in an entirely isolated environment. A person skilled in the art can virtualize a plurality of communications devices having the foregoing functions on a general-purpose physical server by reading this application. Details are not described herein again.

During specific implementation, an embodiment of this application further provides a computer-readable storage medium. The computer-readable storage medium stores instructions, and when the instructions are run on a computer, the computer may be enabled to implement all or some of the operations in the embodiments corresponding to FIG. 6, FIG. 15, and FIG. 22. The computer-readable storage medium is disposed in any device. The any device may be a random access memory (RAM), or the memory may include a nonvolatile memory (non-volatile memory), for example, a read-only memory (ROM), a flash memory (flash memory), a hard disk drive (hard disk drive, HDD), or a solid-state drive (SSD), or the memory may include a combination of the foregoing types of memories, or the like.

A person skilled in the art may further understand that various illustrative logical blocks (illustrative logical block) and operations that are listed in the embodiments of this application may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the scope of the embodiments of this application.

The various illustrative logical units and circuits described in the embodiments of this application may implement or operate the described functions by using a general-purpose processor, a digital information processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital information processor and a microprocessor, a plurality of microprocessors, one or more microprocessors in combination with one digital information processor core, or any other similar configuration.

The operations of the methods or algorithms described in the embodiments of this application may be implemented by directly embedded hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor, so that the processor may read information from the storage medium and write information to the storage medium. Optionally, the storage medium may alternatively be integrated into a processor. The processor and the storage medium may be disposed in an ASIC, and the ASIC may be disposed in UE. Optionally, the processor and the storage medium may be alternatively arranged in different components of the UE.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

All or a part of the foregoing embodiments may be implemented by using software, hardware, firmware, or any combination thereof. When the software is used to implement the embodiments, all or a part of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid-State Drive (SSD)), or the like.

The embodiments in this specification are all described in a progressive manner. For same or similar parts of the embodiments, refer to each other. Each embodiment focuses on a difference from other embodiments. Especially, apparatus and system embodiments are basically similar to a method embodiment, and therefore are described briefly. For related parts, refer to descriptions of the method embodiment.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

A person skilled in the art may clearly understand that, the technologies in the embodiments of the present invention may be implemented by software in addition to a necessary general hardware platform. Based on such an understanding, the technical solutions in the embodiments of the present invention essentially or the part contributing to the conventional technology may be implemented in a form of a software product. The computer software product may be stored in a storage medium, such as a ROM/RAM, a magnetic disk, or an optical disc, and includes several instructions for instructing a computer device (which may be a personal computer, a server, or a network device) to perform the methods described in the embodiments or some parts of the embodiments of the present invention.

For same or similar parts of the embodiments in this specification, refer to these embodiments. Especially, the apparatus embodiment is basically similar to the method embodiment, and therefore is described briefly. For related parts, refer to the descriptions in the method embodiment.

The foregoing described implementations of the present invention are not intended to limit the protection scope of the present invention.

What is claimed is:

1. A method for deploying a wireless access point, comprising:
    receiving, by a terminal device, a first operation to start wireless access point (AP) deployment;
    displaying, by the terminal device, a floor plan determining interface in response to the first operation;
    receiving, by the terminal device, a second operation via the floor plan determining interface, and determining a first floor plan based on the second operation;
    determining, by the terminal device, an AP type recommended to be deployed currently; and
    displaying, by the terminal device, an AP deployment interface based on the first floor plan and the AP type, wherein the AP deployment interface is used to display a quantity of APs recommended to be deployed and locations of the APs recommended to be deployed, the displaying further comprising:
        performing, by the terminal device, a grid division on the first floor plan to obtain a plurality of grids, and determining, based on the grids, a floor plan parameter between rooms in a house in which an AP is being deployed, wherein the floor plan parameter comprises wall attenuation and connectivity.

2. The method according to claim 1, wherein the determining the first floor plan based on the second operation comprises:
    displaying, by the terminal device, at least one prestored floor plan;
    receiving, by the terminal device, a third operation; and
    determining, by the terminal device, the first floor plan in response to the third operation, wherein the first floor plan is the prestored floor plan.

3. The method according to claim 1, wherein the determining, by the terminal device, the first floor plan based on the second operation comprises:
    displaying, by the terminal device, a floor plan generation method interface in response to the second operation;
    receiving, by the terminal device, first data; and generating, by the terminal device, the first floor plan based on the first data.

4. The method according to claim 1, wherein the determining, by the terminal device, the AP type recommended to be deployed currently comprises:
displaying, by the terminal device, an AP determining interface;
receiving, by the terminal device, a fourth operation via the AP determining interface; and
determining the AP type based on the fourth operation.

5. The method according to claim 1, wherein the determining, by the terminal device, the AP type recommended to be deployed currently comprises:
displaying, by the terminal device, an AP determining interface;
receiving, by the terminal device, a fifth operation via the AP determining interface; and
determining, by the terminal device, the AP type based on the first floor plan in response to the fifth operation.

6. The method according to claim 1, wherein the determining, by the terminal device, the AP type recommended to be deployed currently comprises:
determining, by the terminal device, the AP type based on the first floor plan.

7. The method according to claim 1, wherein
the AP deployment interface comprises a second floor plan, and the second floor plan displays, by using a preset symbol mark, a location at which an AP is recommended to be deployed.

8. The method according to claim 5, wherein
the AP deployment interface comprises a second floor plan that displays, using a preset symbol mark, a location at which an AP is recommended to be deployed; and
the AP deployment interface further comprises the AP type determined by the terminal device.

9. The method according to claim 4, wherein
the AP deployment interface comprises a second floor plan that displays, using a preset symbol mark, a location at which an AP is recommended to be deployed; and
when the fourth operation indicates a quantity of APs that is inconsistent with the quantity of APs recommended to be deployed, the AP deployment interface further comprises prompt information indicating whether the quantity of APs indicated by the fourth operation is appropriate.

10. The method according to claim 1, further comprising:
receiving, by the terminal device, a sixth operation; and
generating and displaying, by the terminal device, a wireless fidelity (WiFi) heatmap in response to the sixth operation.

11. The method according to claim 1, wherein the displaying, by the terminal device, the AP deployment interface based on the first floor plan and the AP type comprises:
determining, by the terminal device based on the AP type and the floor plan parameter, overall wireless signal attenuation between the grids;
determining, by the terminal device, an area in which a master AP can be deployed, wherein a set comprising grids occupied by the area in which the master AP can be deployed is a first grid set;
determining, by the terminal device based on the overall wireless signal attenuation between the grids, a second grid set comprising the grids in the first grid set, wherein a deployment requirement is satisfied when the master AP is deployed in any grid in the second grid set;
determining, by the terminal device based on the first grid set and the second grid set, the quantity of APs recommended to be deployed and the locations of the APs recommended to be deployed; and
displaying, by the terminal device, the AP deployment interface based on the quantity of APs recommended to be deployed and the locations of the APs recommended to be deployed.

12. The method according to claim 11, wherein the determining, by the terminal device based on the first grid set and the second grid set, the quantity of APs recommended to be deployed and the locations of the APs recommended to be deployed comprises:
when the second grid set is not empty, determining, by the terminal device, that a grid with a largest deployment indicator in the second grid set is a grid in which the master AP is deployed, and determining not to deploy a sub-AP; or
when the second grid set is empty, determining, by the terminal device, a location at which the master AP is deployed, and determining a location at which a sub-AP is deployed and a quantity of sub-APs, wherein a quantity of master APs is 1.

13. The method according to claim 12, wherein the determining, by the terminal device, a location at which the master AP is deployed, and determining a location at which a sub-AP is deployed and a quantity of sub-APs comprises:
(a) determining a quantity n of sub-APs recommended to be deployed;
(b) sequentially traversing the first grid set to select a grid as a target location of the master AP, and in response to determining that the master AP is deployed at the target location, determining a third grid set comprising a sub-grid in which the sub-AP is deployed;
(c) traversing the first grid set and the third grid set to determine a set $O_i$ of a grid in which the master AP can be deployed and a grid in which the sub-AP can be deployed;
(d) determining a fourth grid set comprising a grid in which the master AP can be deployed and a grid in which the sub-AP can be deployed that are in the set $O_i$ and that both satisfy a deployment requirement;
(e) determining whether the fourth grid set is empty; and
(f) when the fourth grid set is not empty, searching the fourth grid set for a combination of a first grid in which a master AP with a largest deployment indicator can be deployed and a second grid in which a sub-AP can be deployed, wherein a location indicated by the first grid is a location at which the master AP is deployed, a location indicated by the second grid is a location at which the sub-AP is deployed, and a quantity of grids in which the sub-AP can be deployed in the combination is a quantity of to-be-deployed sub-APs; or
(e) when the fourth grid set is empty, adjusting the quantity n of sub-APs recommended to be deployed, and iteratively performing operations (b) to (f).

14. The method according to claim 11, wherein the determining, by the terminal device, an area in which a master AP can be deployed comprises:
displaying, by the terminal device, a master AP deployment interface;
receiving, by the terminal device, a seventh operation via the master AP deployment interface; and
determining, by the terminal device in response to the seventh operation, that a location specified by the seventh operation is the area in which the master AP can be deployed; or determining, based on the seventh operation, the area in which the master AP can be deployed.

15. The method according to claim 3, wherein
the first data comprises depth data between a target object and the terminal device; and
the target object comprises a wall of the house in which an AP is recommended to be deployed currently.

16. An apparatus for deploying a wireless access point, comprising:
a memory configured to store program instructions; and
a processor configured to invoke and execute the program instructions stored in the memory to perform a wireless access point deployment method, the method comprising:
receiving a first operation to start wireless access point (AP) deployment;
displaying a floor plan determining interface in response to the first operation;
receiving a second operation via the floor plan determining interface, and determining a first floor plan based on the second operation;
determining an AP type recommended to be deployed currently; and
displaying an AP deployment interface based on the first floor plan and the AP type, wherein the AP deployment interface is used to display a quantity of APs recommended to be deployed and locations of the APs recommended to be deployed, the displaying further comprising:
performing a grid division on the first floor plan to obtain a plurality of grids, and determining, based on the grids, a floor plan parameter between rooms in a house in which an AP is being deployed, wherein the floor plan parameter comprises wall attenuation and connectivity.

17. A computer-readable storage medium storing instructions therein, which when executed on a computer, cause the computer to perform a wireless access point deployment method, the method comprising:
receiving a first operation to start wireless access point (AP) deployment;
displaying a floor plan determining interface in response to the first operation;
receiving a second operation via the floor plan determining interface, and determining a first floor plan based on the second operation;
determining an AP type recommended to be deployed currently; and
displaying an AP deployment interface based on the first floor plan and the AP type, wherein the AP deployment interface is used to display a quantity of APs recommended to be deployed and locations of the APs recommended to be deployed, the displaying further comprising:
performing a grid division on the first floor plan to obtain a plurality of grids, and determining, based on the grids, a floor plan parameter between rooms in a house in which an AP is being deployed, wherein the floor plan parameter comprises wall attenuation and connectivity.

18. The wireless access point deployment apparatus according to claim 16, wherein the method further comprises:
displaying at least one prestored floor plan;
receiving a third operation; and
determining the first floor plan in response to the third operation, wherein the first floor plan is the prestored floor plan.

19. The wireless access point deployment apparatus according to claim 16, wherein the method further comprises:
displaying a floor plan generation method interface in response to the second operation;
receiving first data; and
generating the first floor plan based on the first data.

20. The wireless access point deployment apparatus according to claim 16, wherein the method further comprises:
displaying an AP determining interface;
receiving a fourth operation via the AP determining interface; and
determining the AP type based on the fourth operation.

* * * * *